INVENTORS
GRANT H. BUSH
JAMES E. CARRINGTON
BY *Sughrue, Rothwell, Mion & Zinn*
ATTORNEYS

FORCED SIGNALS

INTERPRET OP CODE

April 28, 1964 G. H. BUSH ET AL 3,131,293
COMPUTING SYSTEM
Filed July 14, 1960 38 Sheets-Sheet 3
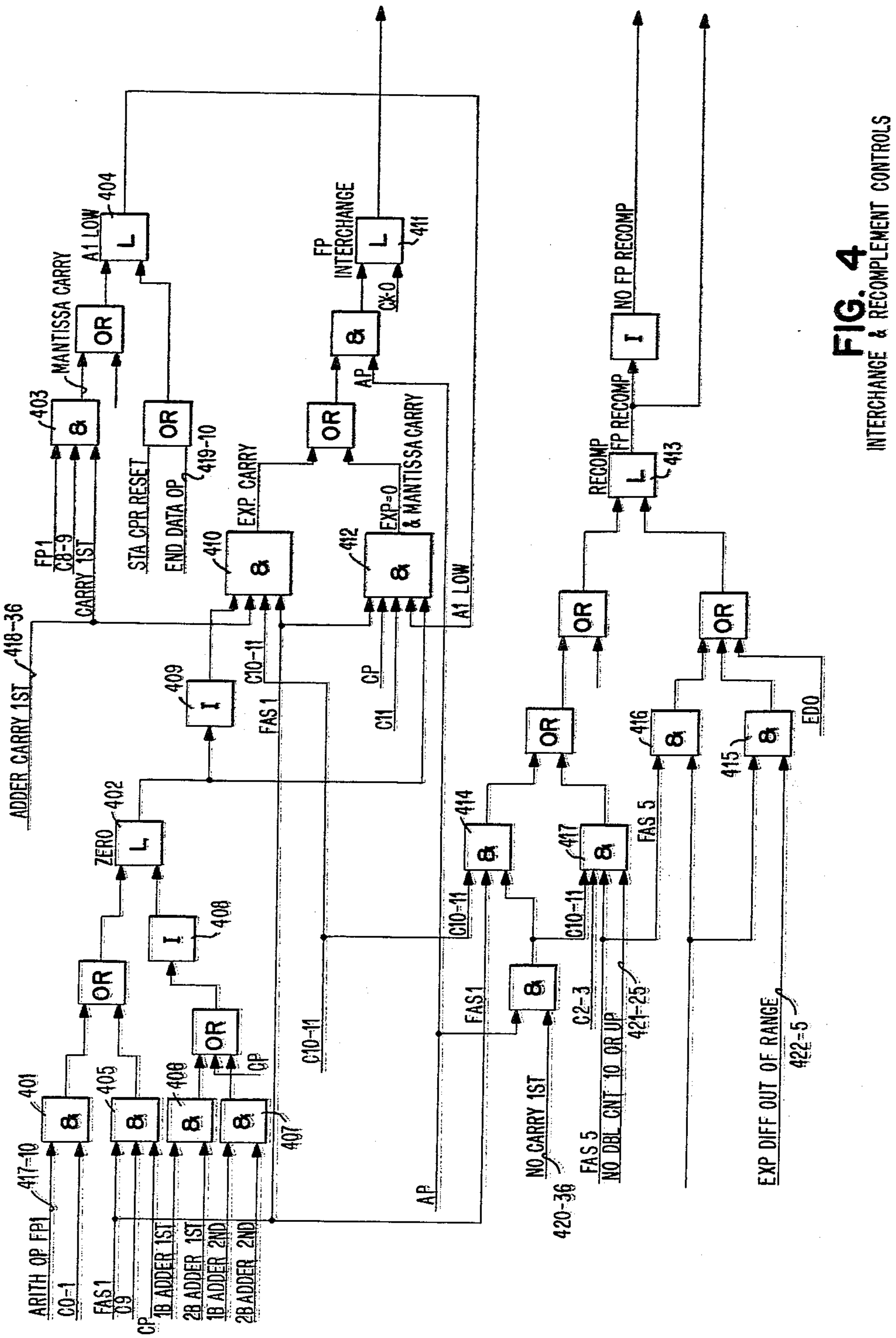
FIG. 4 INTERCHANGE & RECOMPLEMENT CONTROLS

EXPONENT DIFFERENCE RANGE CONTROLS

EXPONENT DIFFERENCE RANGE CONTROL

PROGRAM RING

PROGRAM RING

PROGRAM CYCLE RING

FIELD RING

FIELD RING

FIELD RING

| CLOCK PULSES | AP | BP | CP | DP | AP | BP | CP | DP | AP | BP | CP | DP | AP | BP | CP | DP | AP | BP | CP | DP |
|---|---|---|---|---|---|---|---|---|---|---|---|---|---|---|---|---|---|---|---|---|
| PROGRAM RING | | | | | | | CX-0 | | | | C0-1 | | | | C1-2 | | | | C2-3 | |
| | | | | | CX | | | | C0 | | | | C1 | | | | C2 | | | |
| FIELD RING | | | | | | | F1-9 | | | | F9-8 | | | | F8-7 | | | | F7-6 | |
| | | | | | | | | | F9 | | | | F8 | | | | F7 | | | |

April 28, 1964 G. H. BUSH ET AL 3,131,293

COMPUTING SYSTEM

Filed July 14, 1960 38 Sheets-Sheet 13

FLOATING POINT RING

April 28, 1964 G. H. BUSH ET AL 3,131,293

COMPUTING SYSTEM

Filed July 14, 1960 38 Sheets-Sheet 14

FLOATING POINT RING

FLOATING POINT CYCLE RING

ARITHMETIC REGISTER CONTROLS

ARITHMETIC REGISTER SERIAL
READ OUT CONTROL

ARITHMETIC REGISTER SERIAL READ OUT CONTROLS

ARITHMETIC REGISTER ZERO INSERT

AUXILIARY REGISTER
2 CONTROLS

ENTIRE AUXILIARY REGISTER CONTROLS

April 28, 1964 G. H. BUSH ET AL 3,131,293

COMPUTING SYSTEM

Filed July 14, 1960 38 Sheets-Sheet 21

AUXILARY REGISTER #3 OUTPUT CONTROLS

ACCUMULATOR REGISTER 1 CONTROLS

ACCUMULATOR REGISTER 1 CONTROLS

ACCUMULATOR REGISTER 2 CONTROLS

WORD BUFFER REGISTER CONTROLS

ACCUMULATOR REGISTER 3 CONTROLS

April 28, 1964 G. H. BUSH ET AL 3,131,293
COMPUTING SYSTEM
Filed July 14, 1960 38 Sheets-Sheet 26
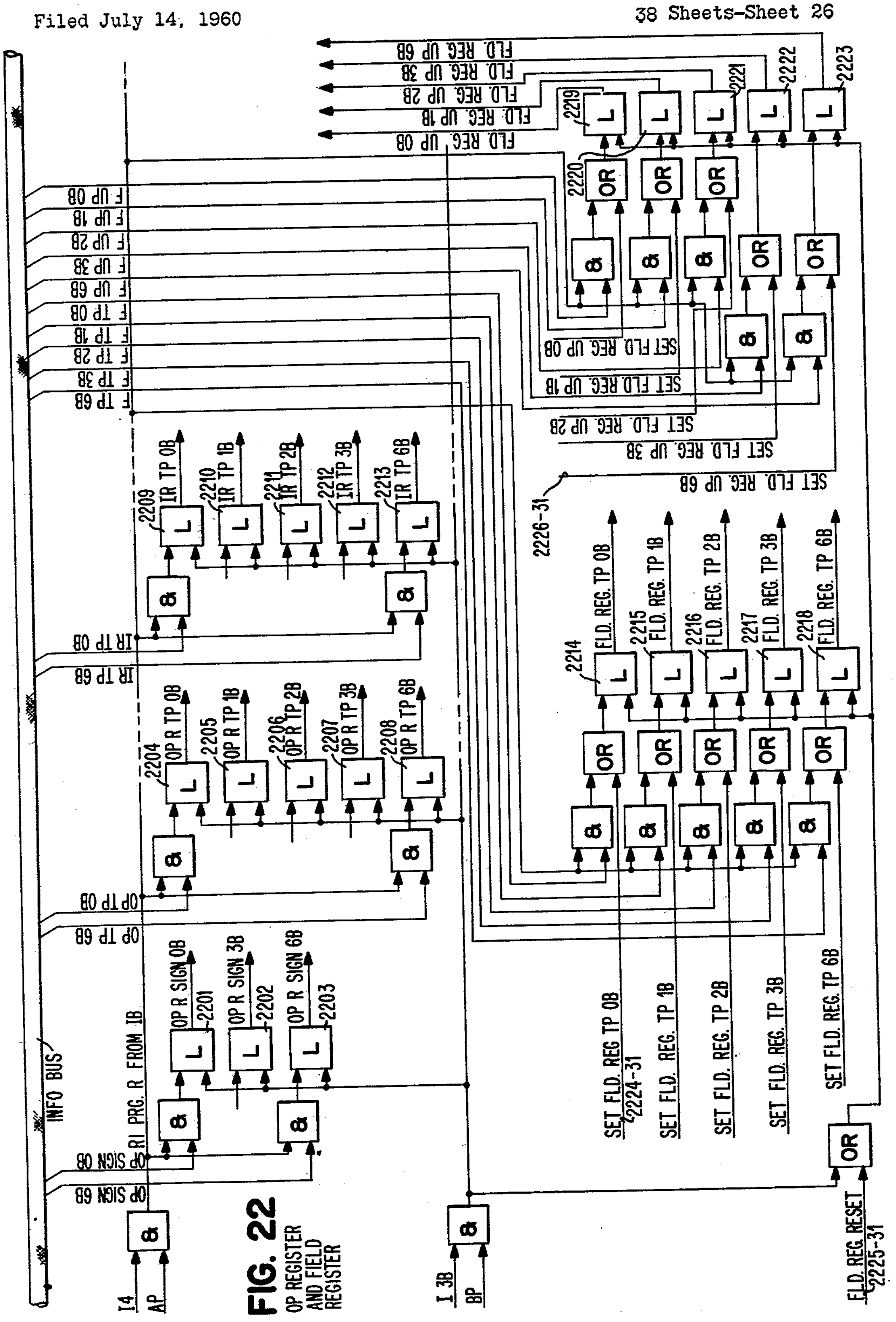
FIG. 22 OP REGISTER AND FIELD REGISTER

PROGRAM REGISTER ADDRESS CONTROLS

PROGRAM REGISTER ADDRESS OUTPUT CONTROLS

SIGNIFICANT DIGIT SCANNER CONTROL

SINGLE CORE SHIFT REGISTER CONTROLS

April 28, 1964 G. H. BUSH ET AL 3,131,293

COMPUTING SYSTEM

Filed July 14, 1960 38 Sheets-Sheet 30

April 28, 1964 G. H. BUSH ET AL 3,131,293

COMPUTING SYSTEM

Filed July 14, 1960 38 Sheets-Sheet 31

FIELD REGISTER INSERT

FIELD REGISTER INSERT CONTROLS

SIGN ANALYSIS

TRUE AND COMP ADD CONTROLS

ADDER OUTPUT CONTROLS

United States Patent Office 3,131,293

Patented Apr. 28, 1964

3,131,293

COMPUTING SYSTEM

Grant H. Bush, Poughkeepsie, and James E. Carrington, Vestal, N.Y., assignors to International Business Machines Corporation, New York, N.Y., a corporation of New York Filed July 14, 1960, Ser. No. 42,892
5 Claims. (Cl. 235—156)

This invention relates to a system for automatically locating the decimal point of numbers as they are manipulated through arithmetic operations and more particularly to such a system in which the results of the operation appear in serial fashion in two accumulators, one for the high digit orders and one for the low digit orders. The embodiment of this invention disclosed herein utilizes much of the circuitry disclosed and claimed in a copending application entitled Computer Program System, U.S. application Serial No. 17,422, filed March 24, 1960, by Elliott R. Marsh, and assigned to the assignee of the instant application, hereafter identified as application A.

In fixed point arithmetic data processing machines, the programmer must be careful to keep track of the decimal point on all arithmetic program steps, especially during add or subtract operations where all factors must have their decimal points aligned before being arithmetically combined. The use of floating point numbers, however, allows the computer to automatically ascertain the true location of the decimal point without need for extra caution during the programming operation.

Floating point numbers in the present embodiment are composed of two parts (1) the mantissa, a numerical value for which a decimal point location is inferred, and (2) the exponent, a number indicating the power of ten by which the mantissa is to be multiplied in order to move the decimal point from its inferred position to that which actually specifies the value represented by the entire floating point number. In the present system, data words are represented by ten alpha numeric positions plus sign. A character in each position is expressed in a 2 out of 5 code. The two high order digits contain the exponent value and the eight low order digits contain the mantissa with the decimal point inferred to be immediately to the left of the high order digit. A number meeting this definition is called a normalized number. Since powers of ten may be plus or minus, the sign of the exponent must be indicated in floating point numbers. This is done in the present system by expressing the exponent values on a base of 50 (MOD 50). $10^2$ is represented by 52 and $10^{-3}$ by 47. Therefore, the sign position of the floating point number indicates the sign of the mantissa, not the sign of the exponent. Exponents between 00 and 99 may be handled by this system. Means are provided for overflow indication (exponents greater than 99) and underflow indication (less than 00).

The system accommodates eight position numeric digits for the mantissa of each operand and sixteen numeric positions for the result. The result is stored in two accumulator registers which are identified as A1 and A2. The eight high order digits are stored in A1 and the eight lower digits in A2. Each register has the following positional significance:

Position S—sign
Position 0—tens digit of exponent
Position 1—units digit of exponent
Position 2—most significant digit of mantissa
Position 9—least significant position of mantissa.

In accumulator A1 the exponent of the result is stored. In accumulator A2 the value of the exponent stored therein is eight less than that in accumulator A1. Therefore, double precision results are obtained.

To perform a floating point add or subtract operation (FAS), with which this invention is particularly concerned, the data cycle is divided into seven sub-cycles. Depending upon the relative values of the exponents of the two operands, up to seven of the sub-cycles may be used during the execution of the FAS instruction.

An object of the present invention is therefore to provide means to add or subtract two floating point factors, each expressed by exponent and mantissa digits, such that a double precision result is obtained which is correctly normalized.

A further object of the invention is to provide means for calculating the true difference between the factor exponents and determining its range so as to govern the future conduct of the operation.

Another object of the invention is to determine the larger of the two factors in order to insure the formation of a true answer during their arithmetic combination.

A yet further object of the invention is to generate two exponent numbers, one for each mantissa of a double precision result.

Another object of the invention is to detect for overflow and/or underflow conditions in the two result exponent numbers.

A further object of the invention is to provide means for preventing the arithmetic combination of the factors upon detecting that their exponent difference is out of range.

Other objects and advantages of the invention will become apparent during the course of the following detailed description to be read in view of the drawings, in which.

Figure 5A:
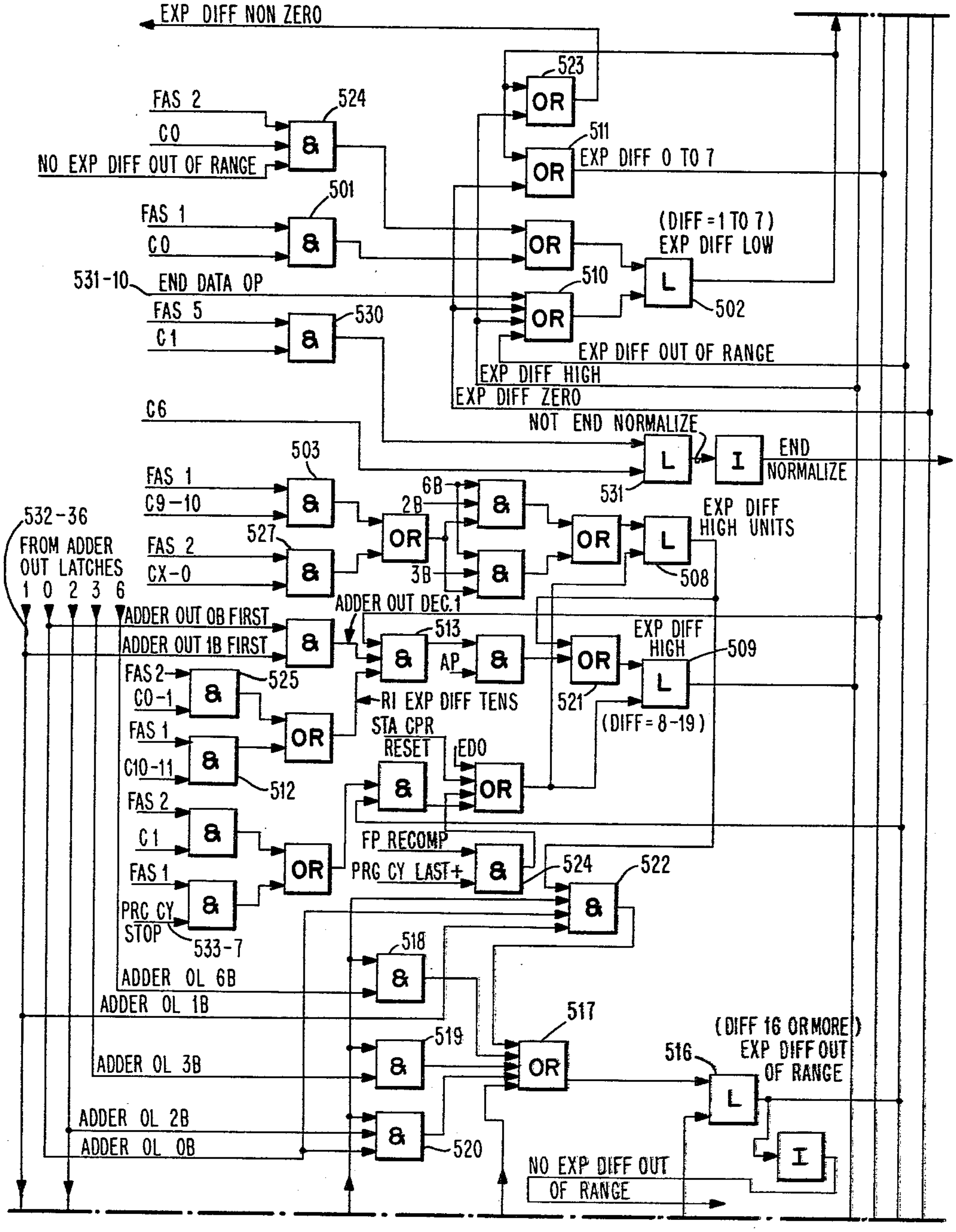
Figure 5B:
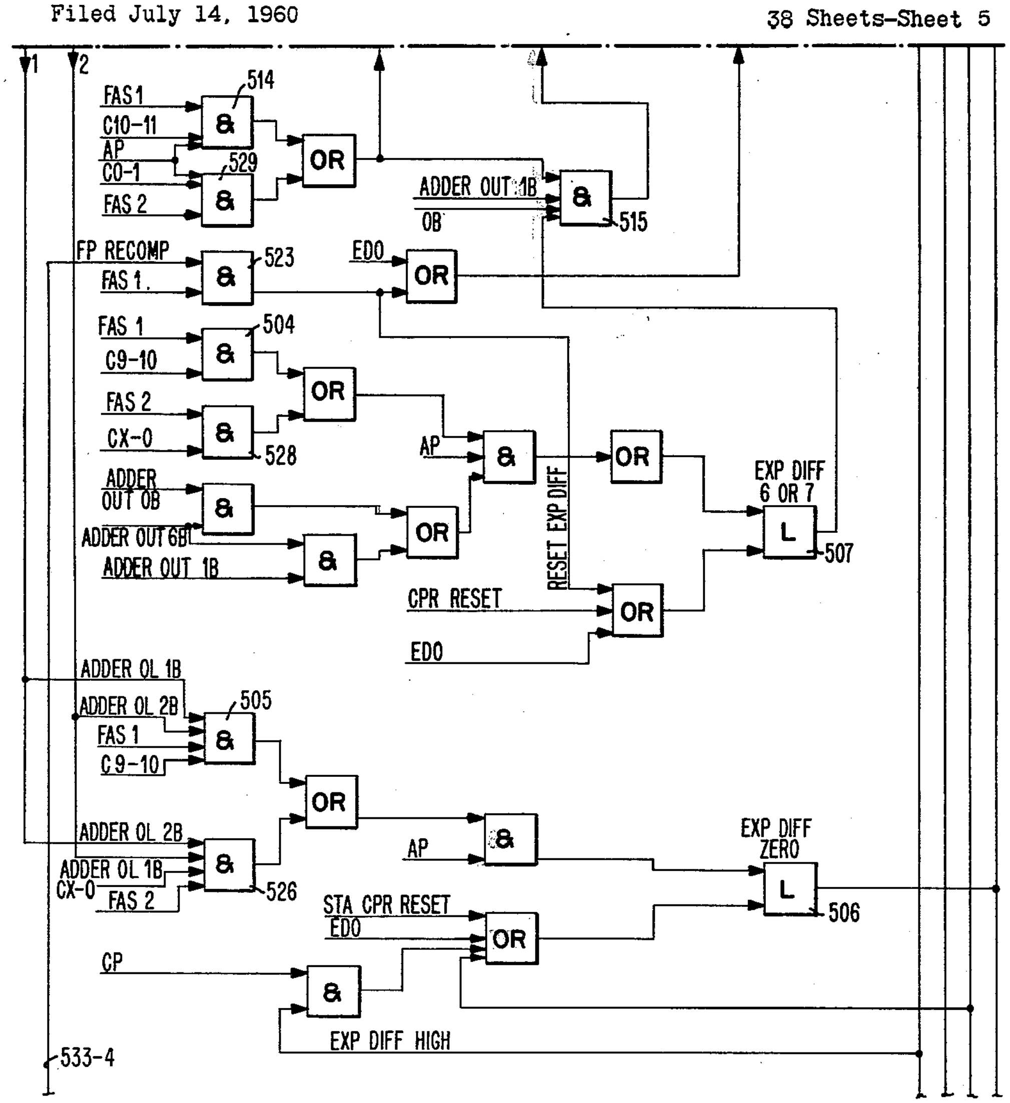
Figure 6A:
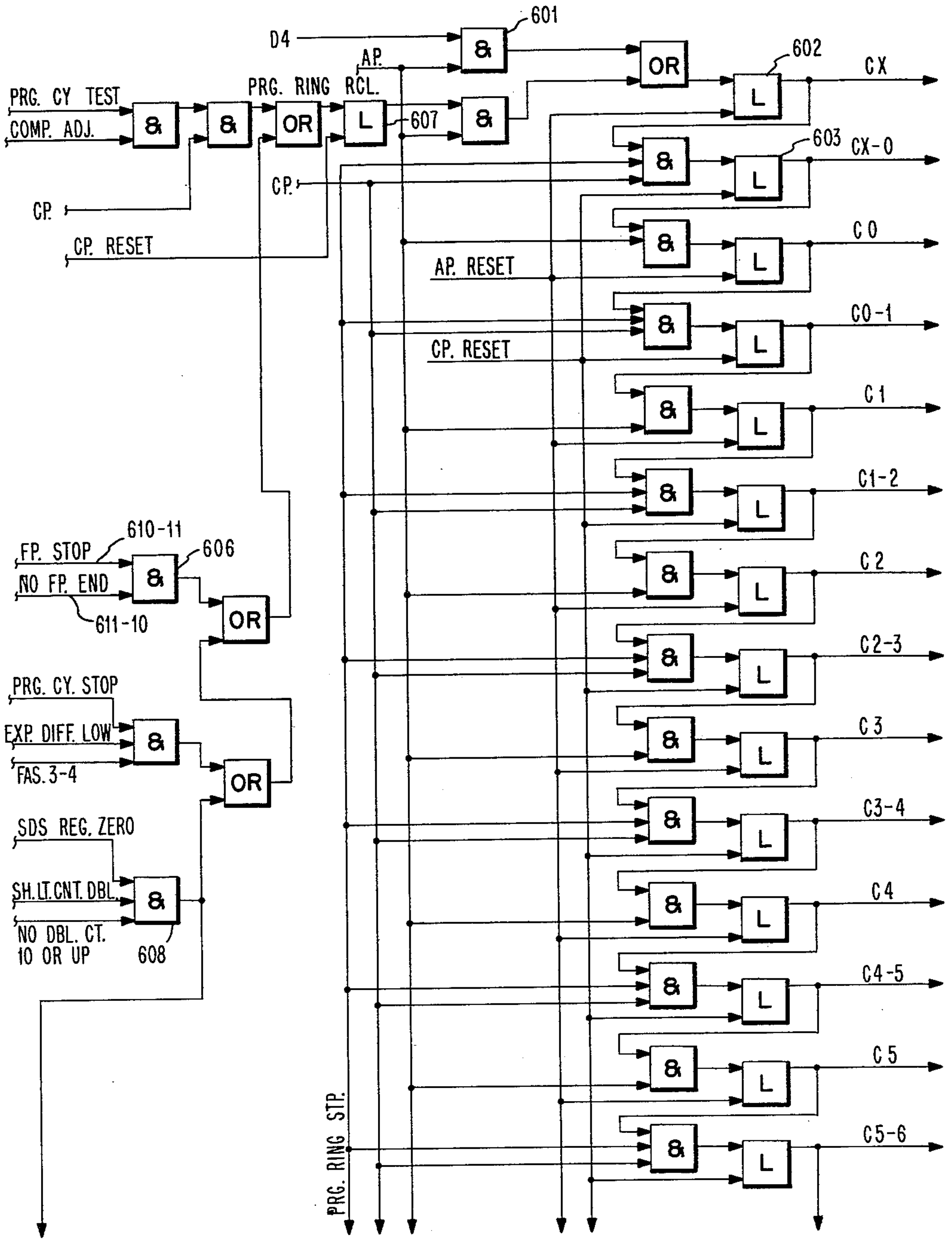
Figure 6B:
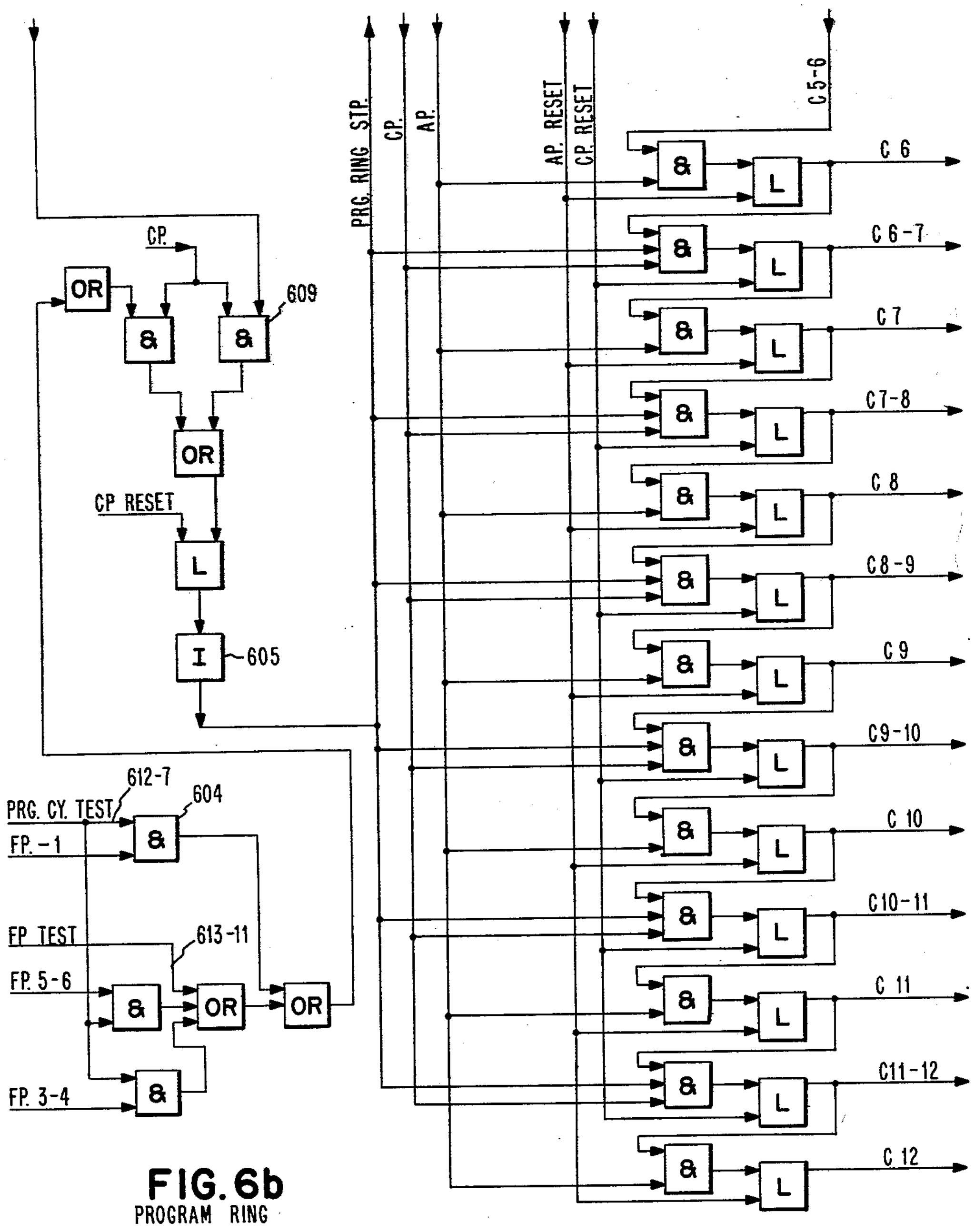
Figure 7:
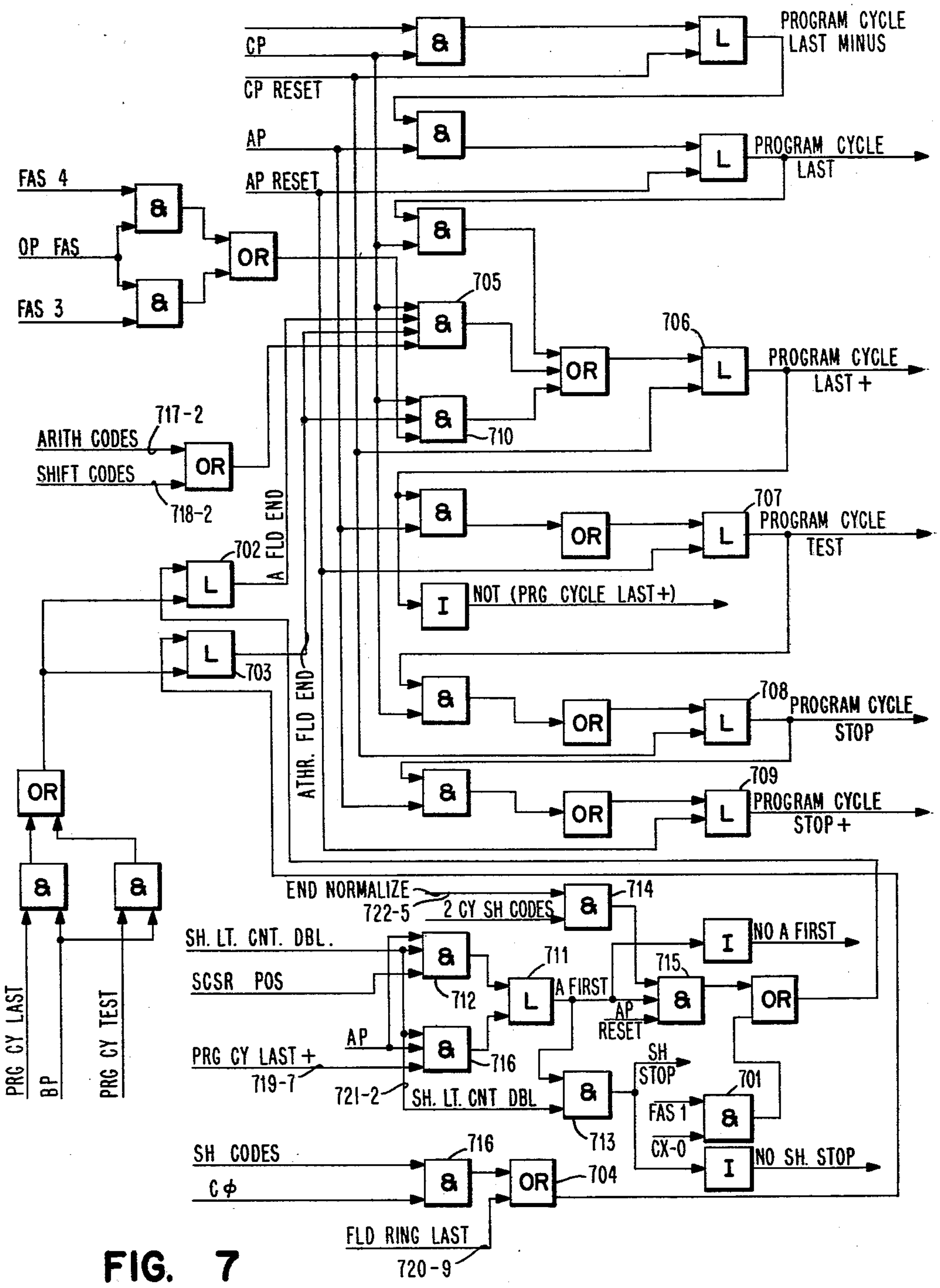
Figure 8A:
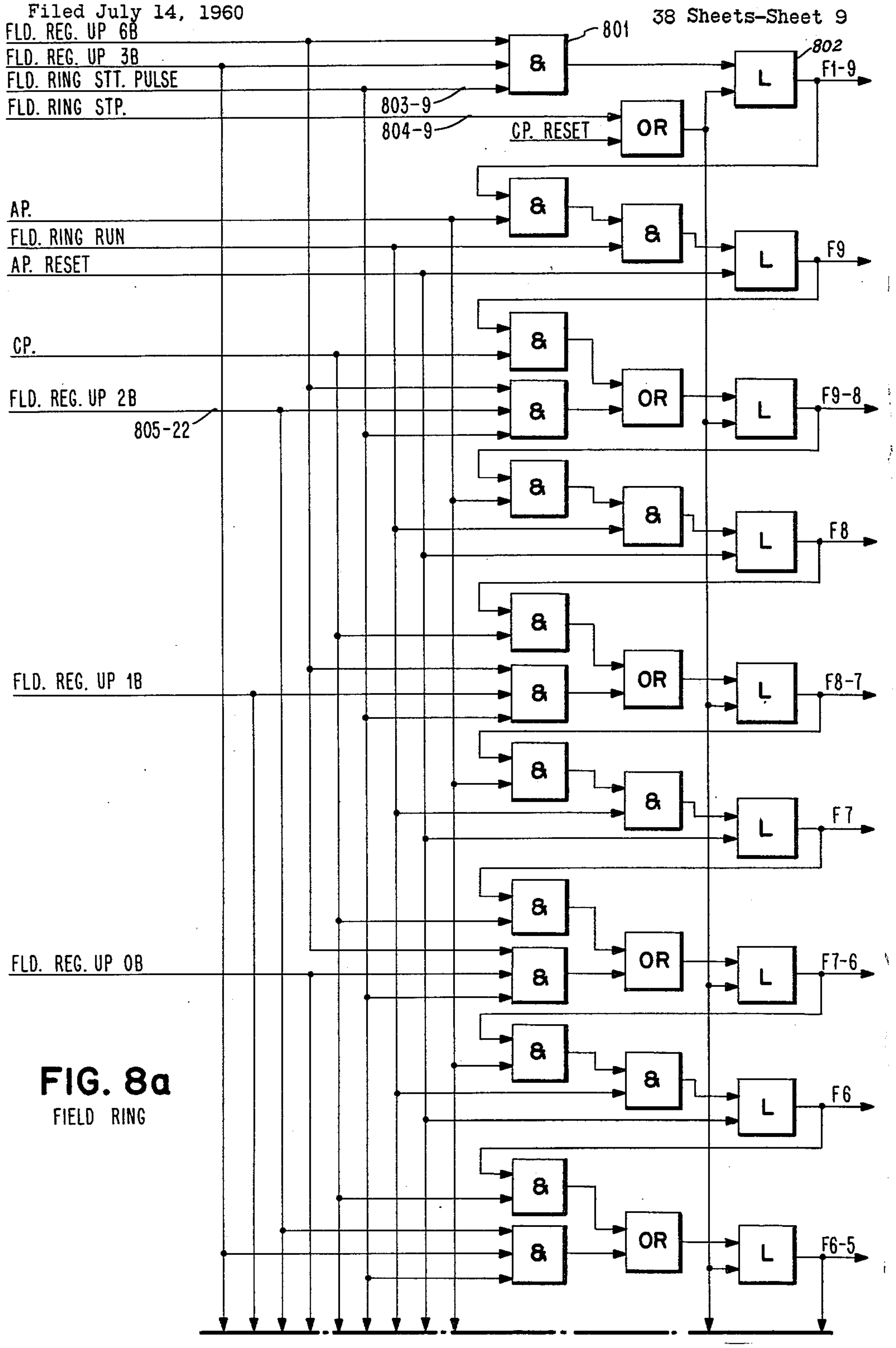
Figure 8B:
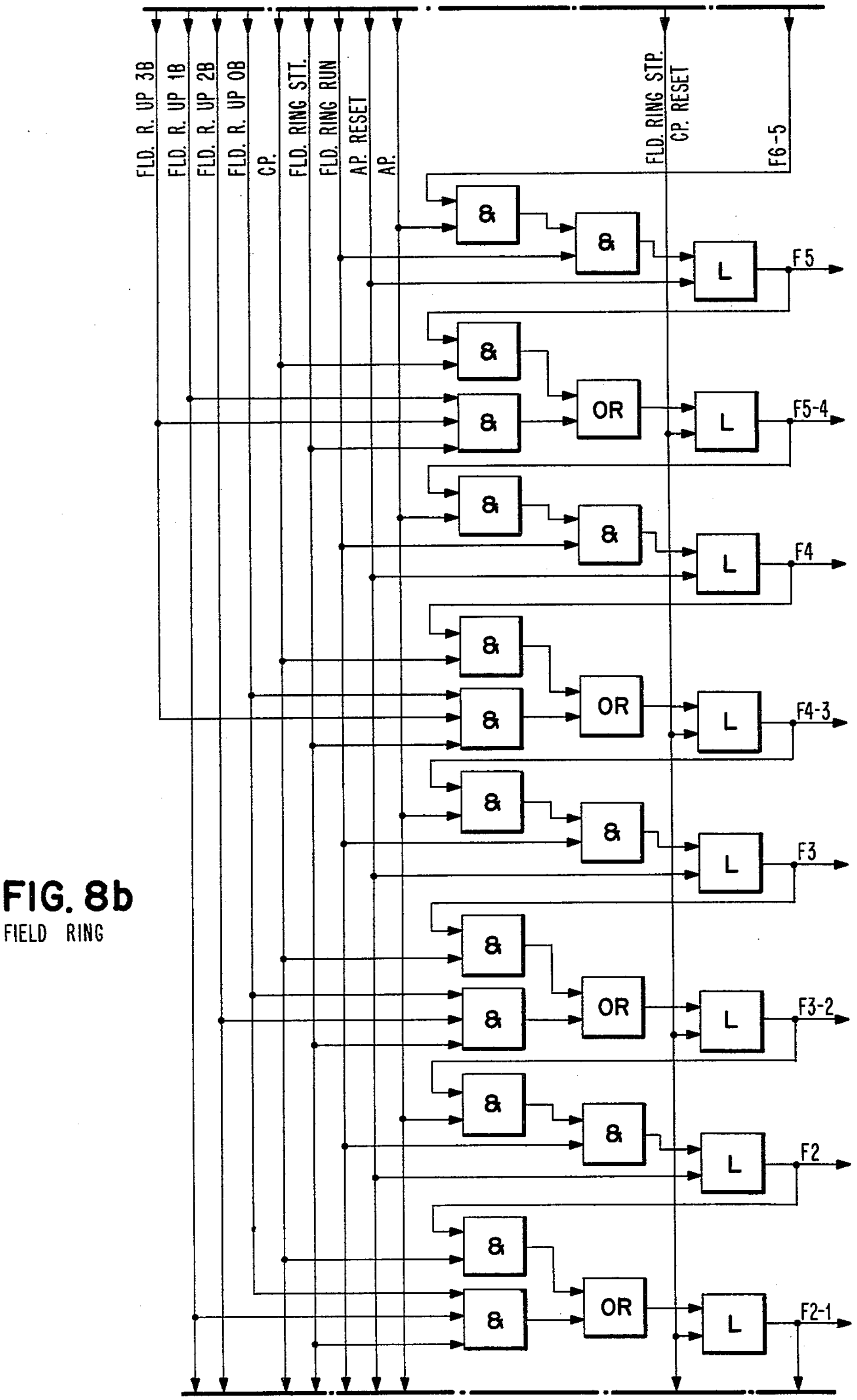
Figures 8C, 37:
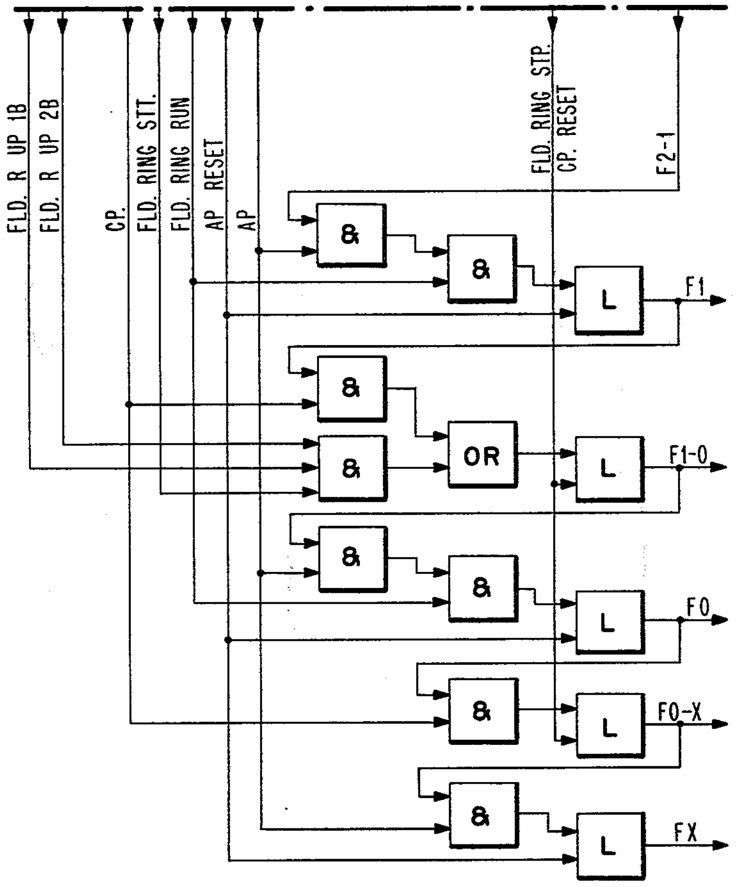
Figure 9:
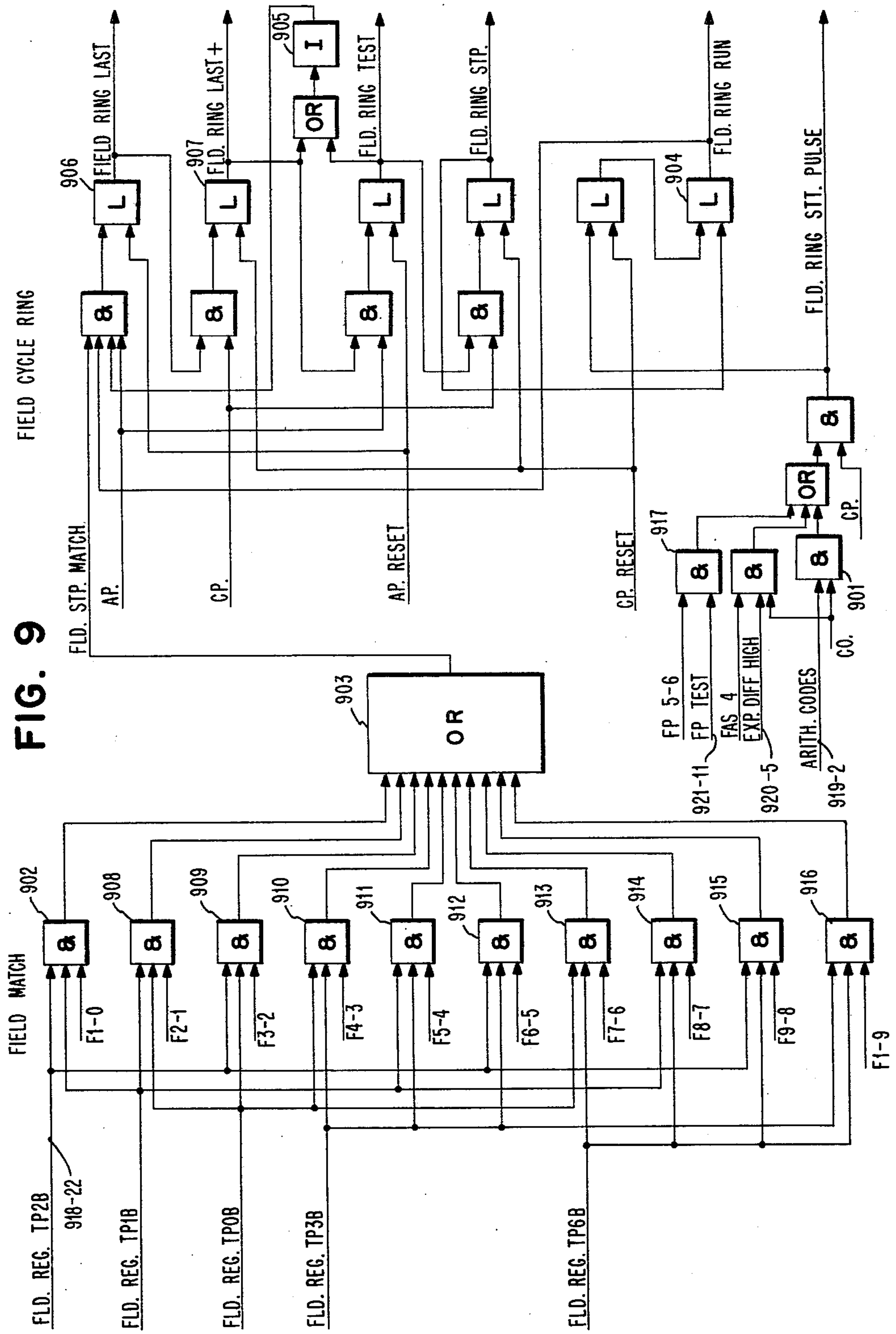
Figure 10A:
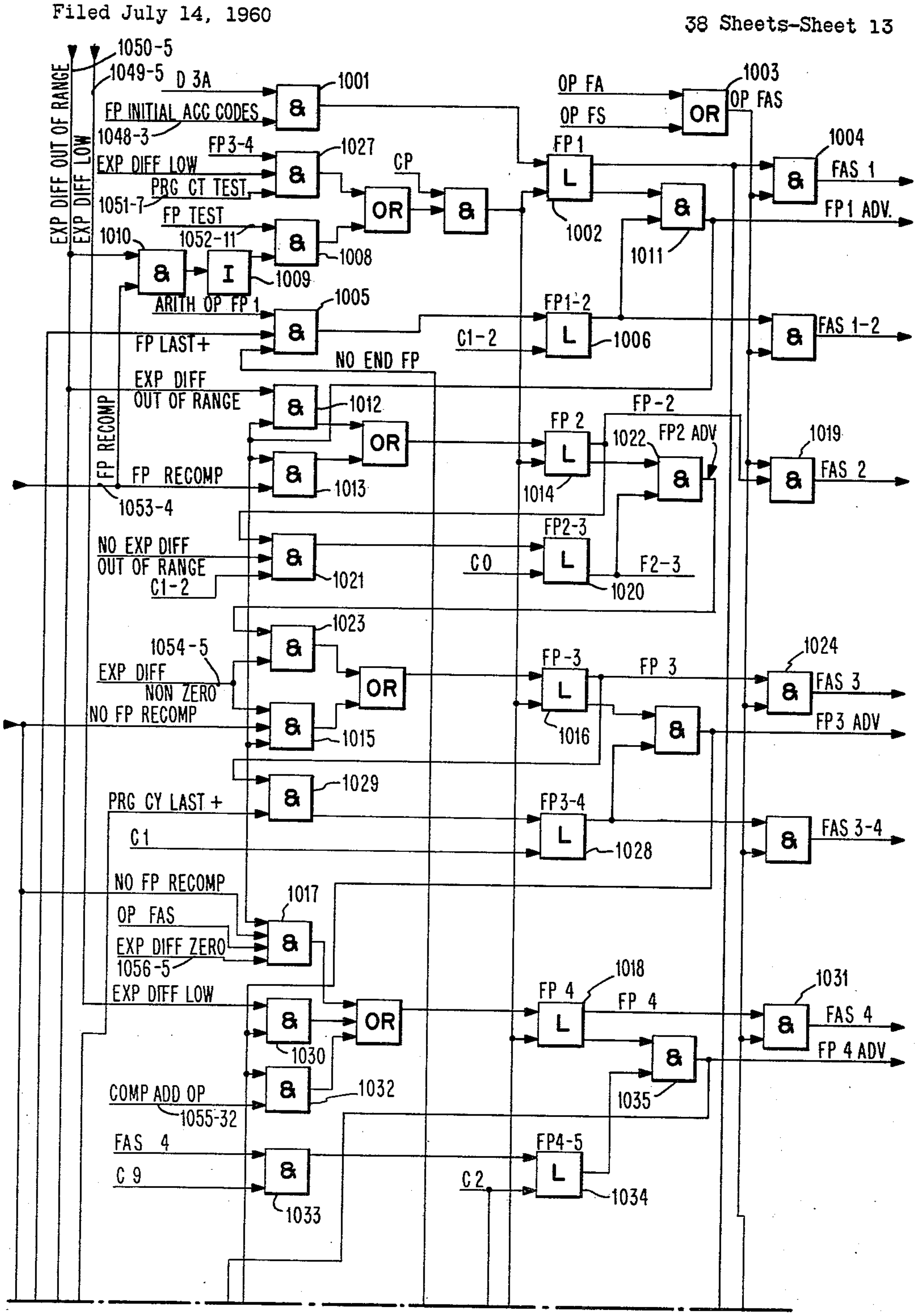
Figure 10B:
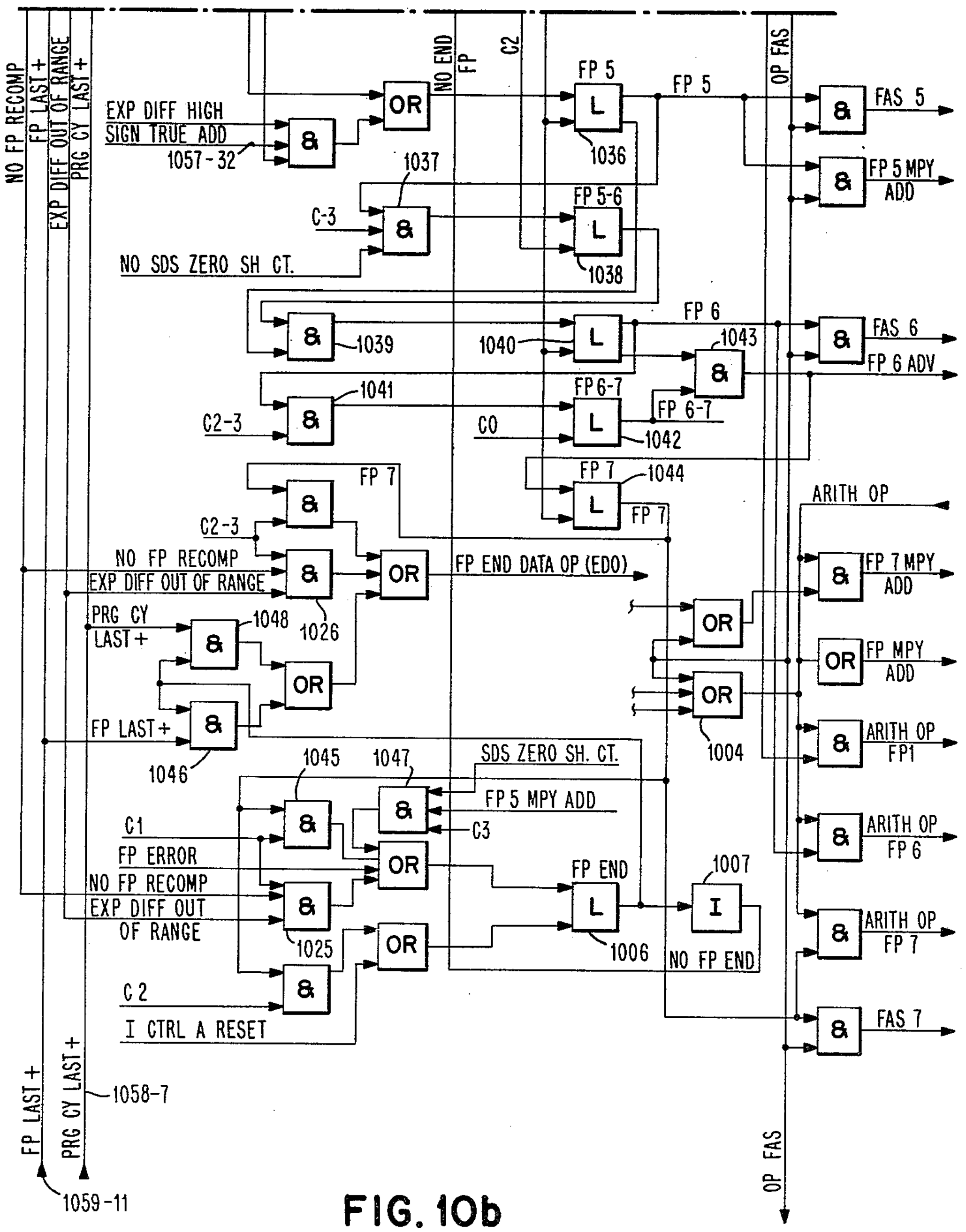
Figure 11:
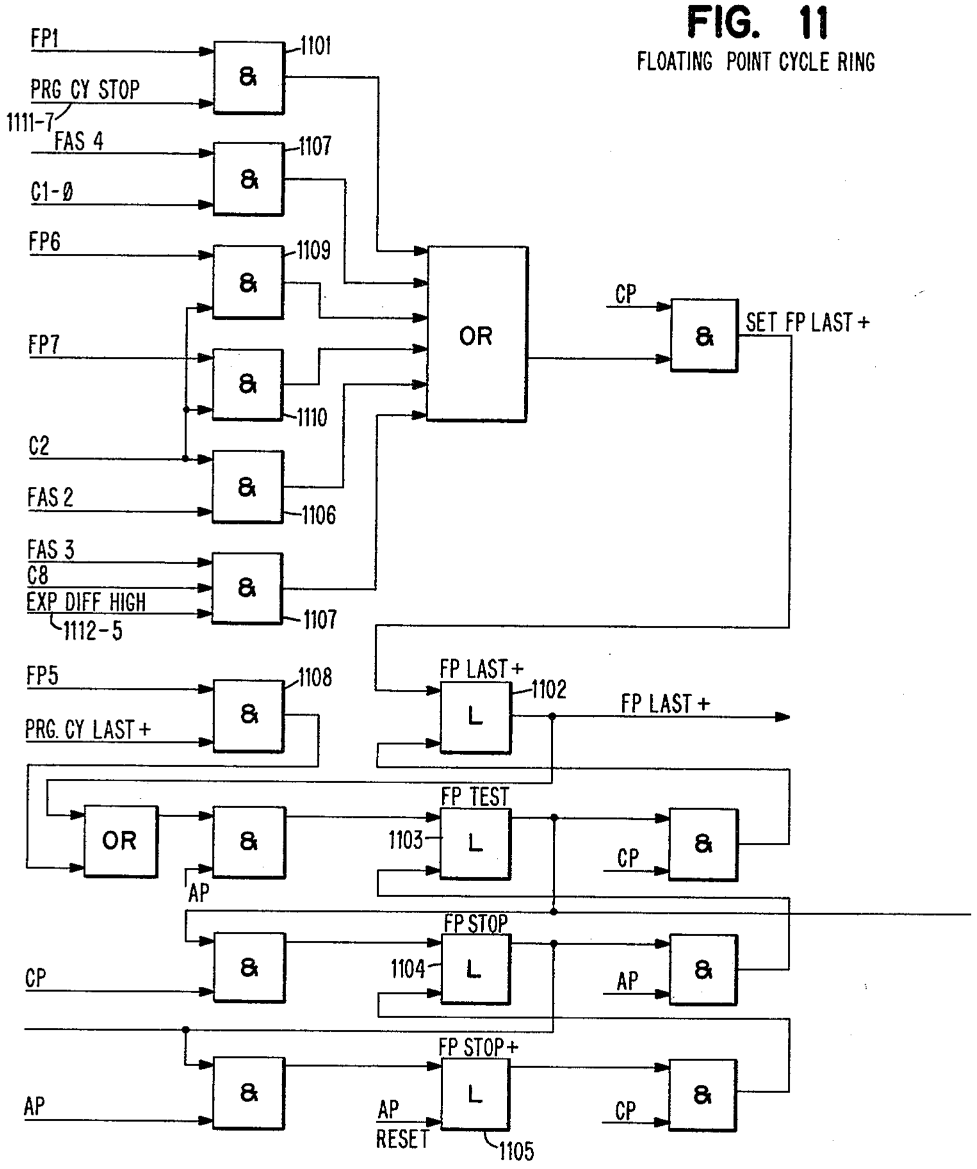
Figure 12:
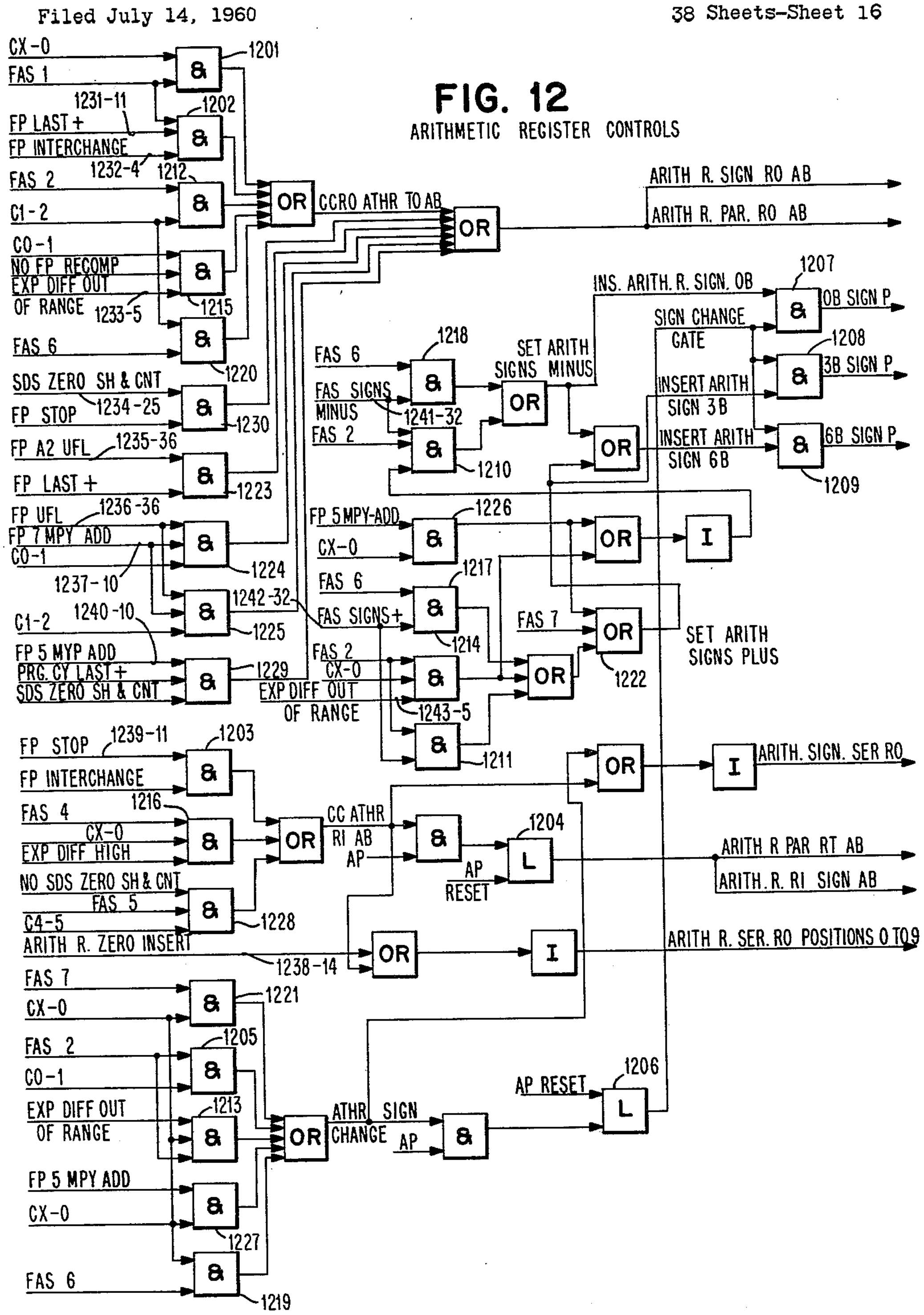
Figure 13A:
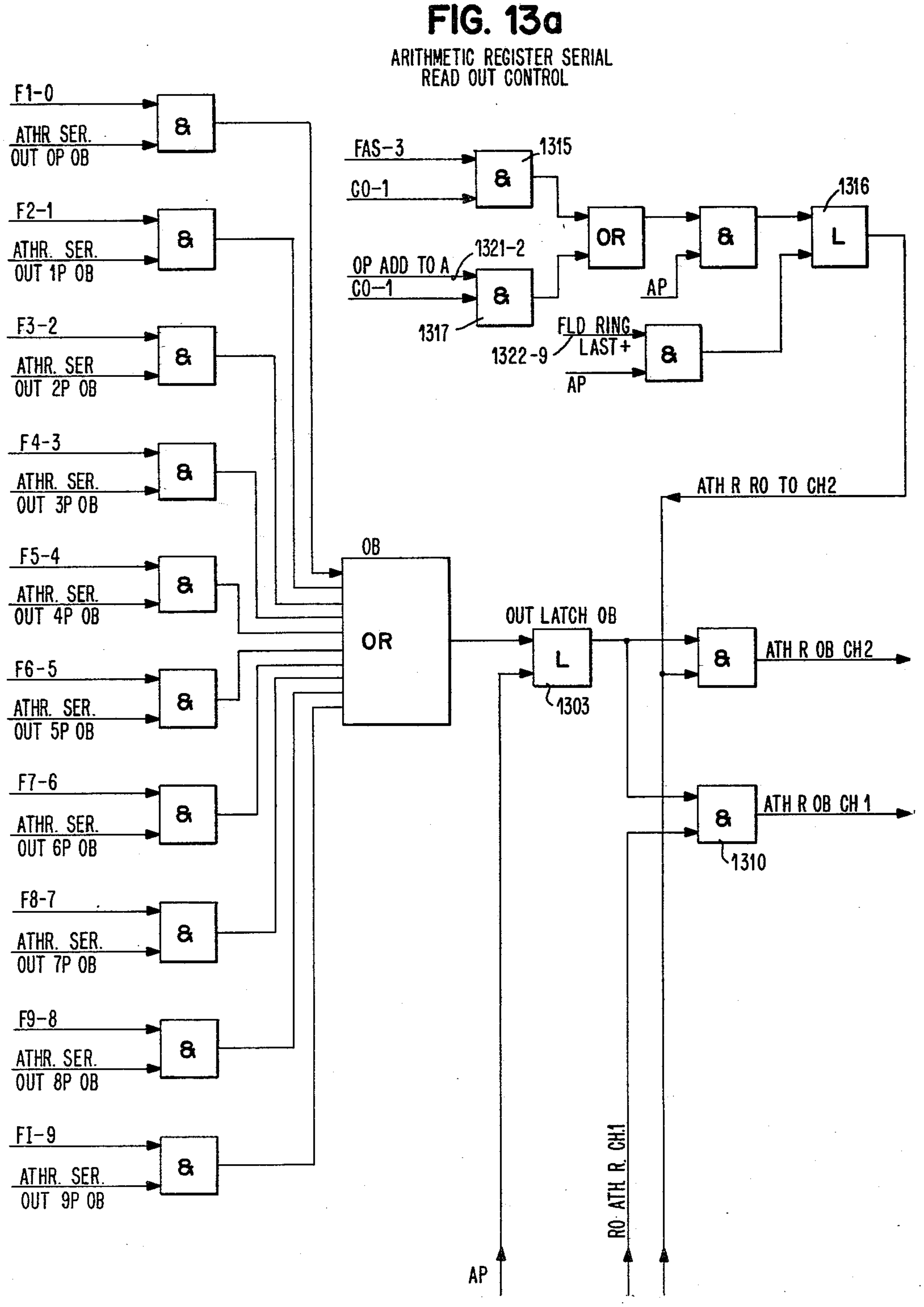
Figure 13B:
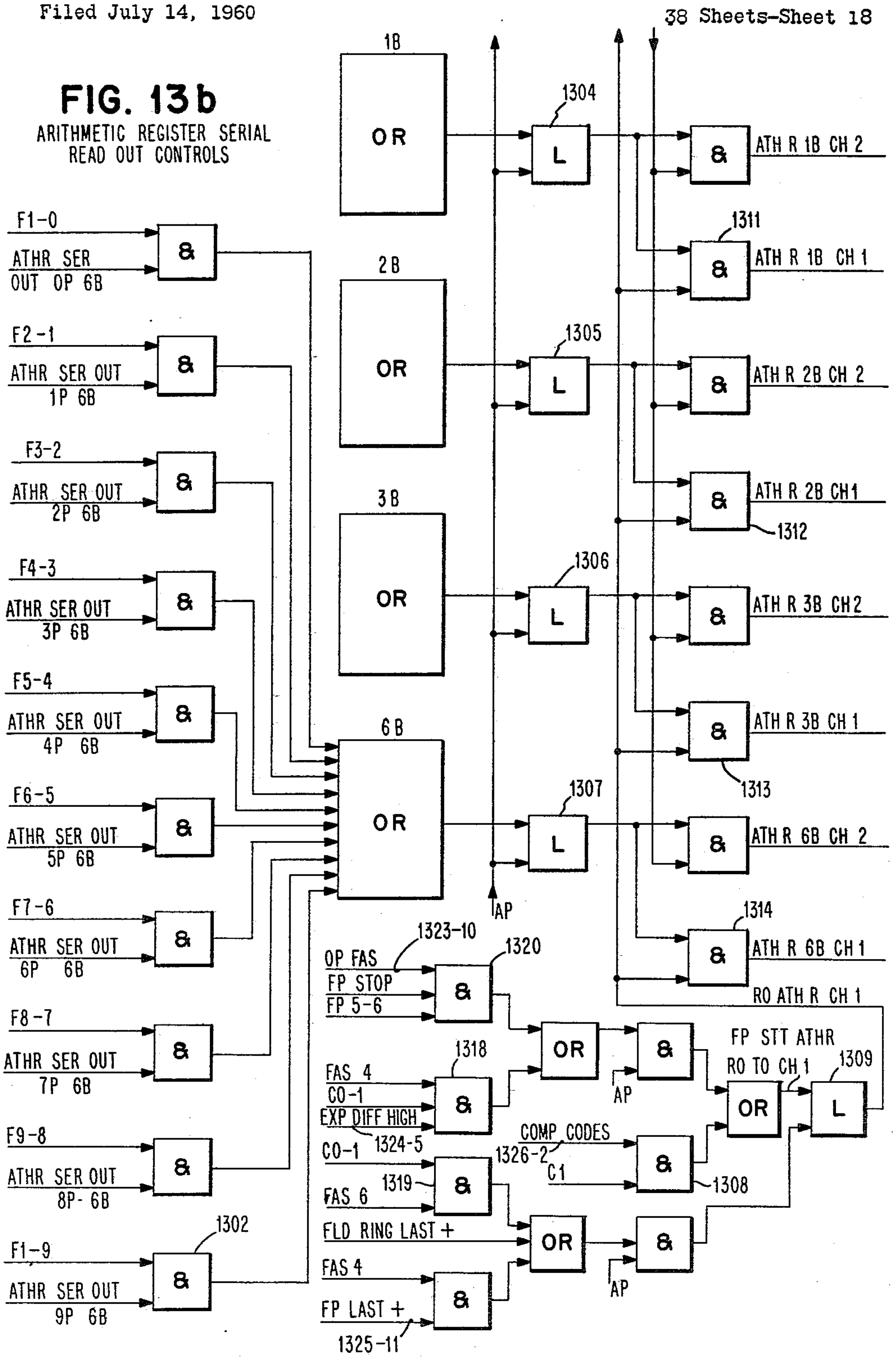
Figure 14:
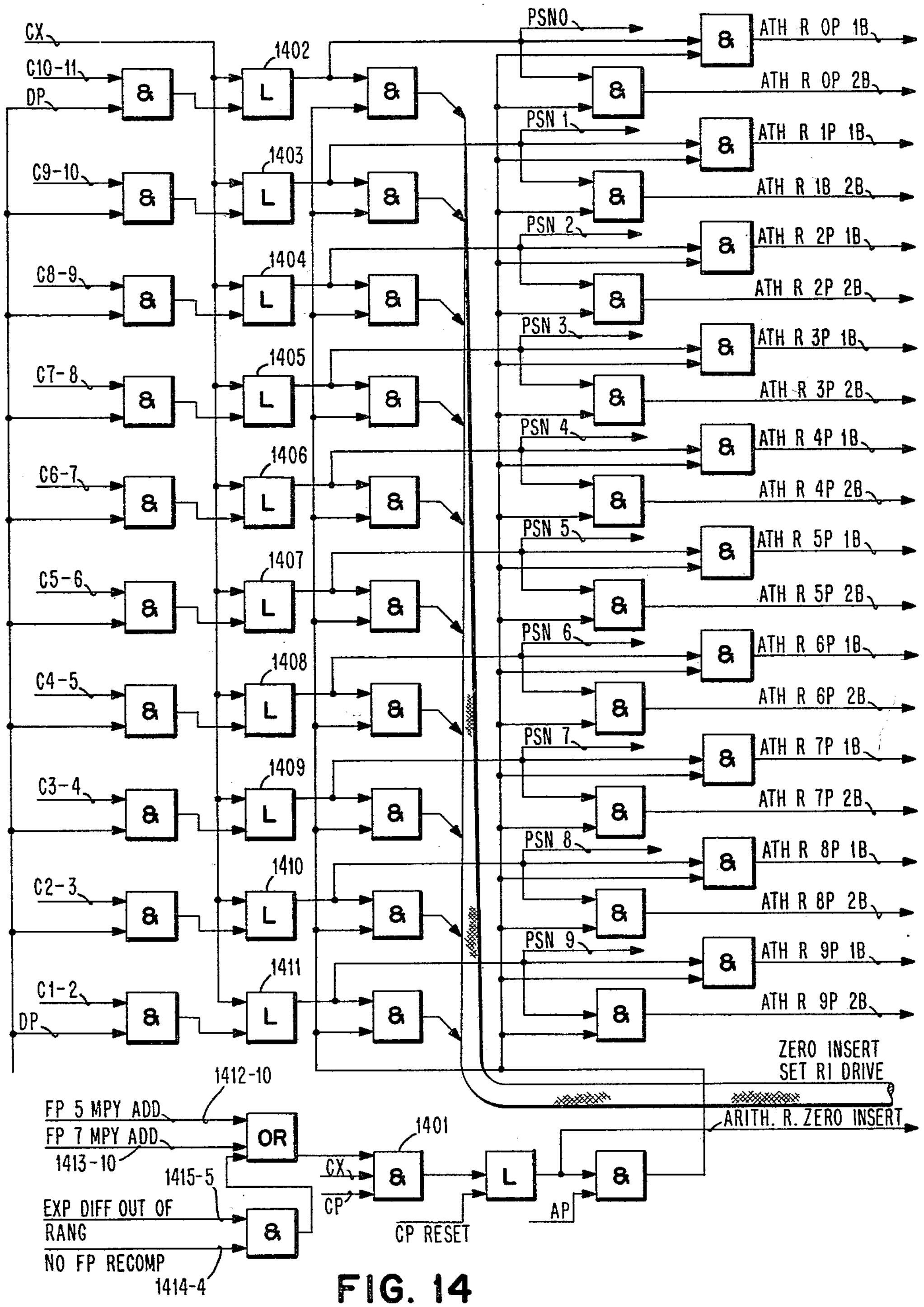
Figure 15:
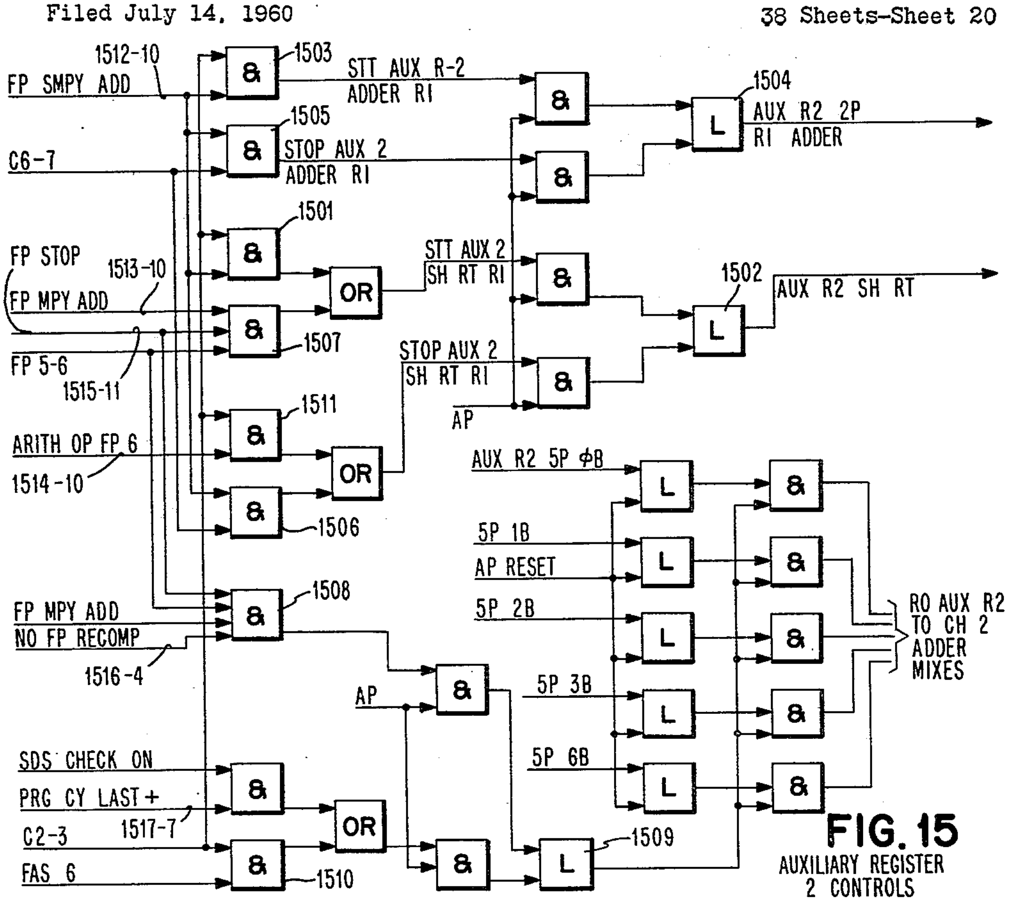
Figure 16:
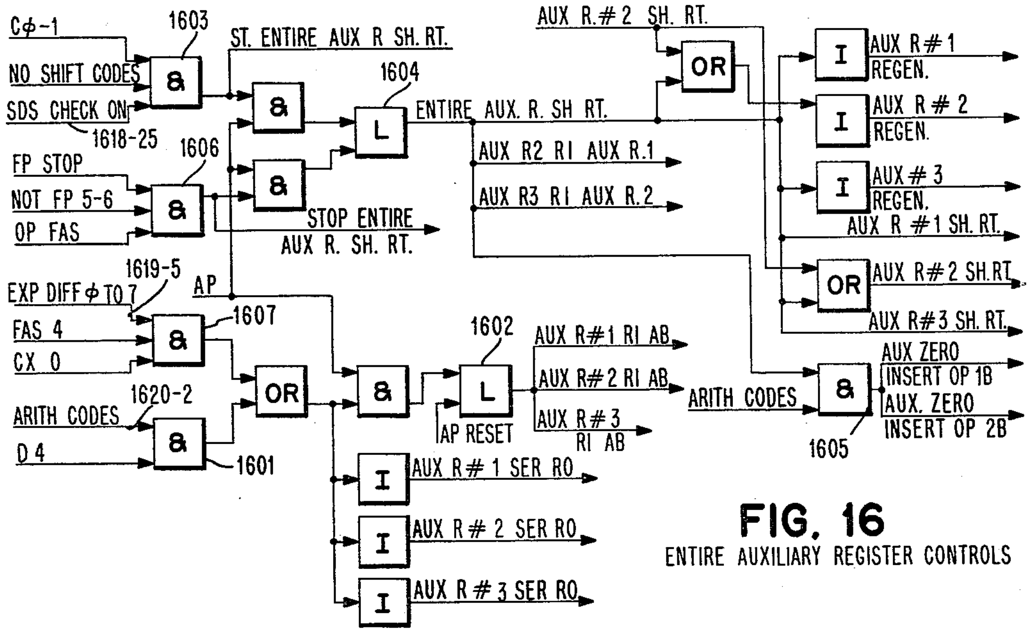
Figure 17:
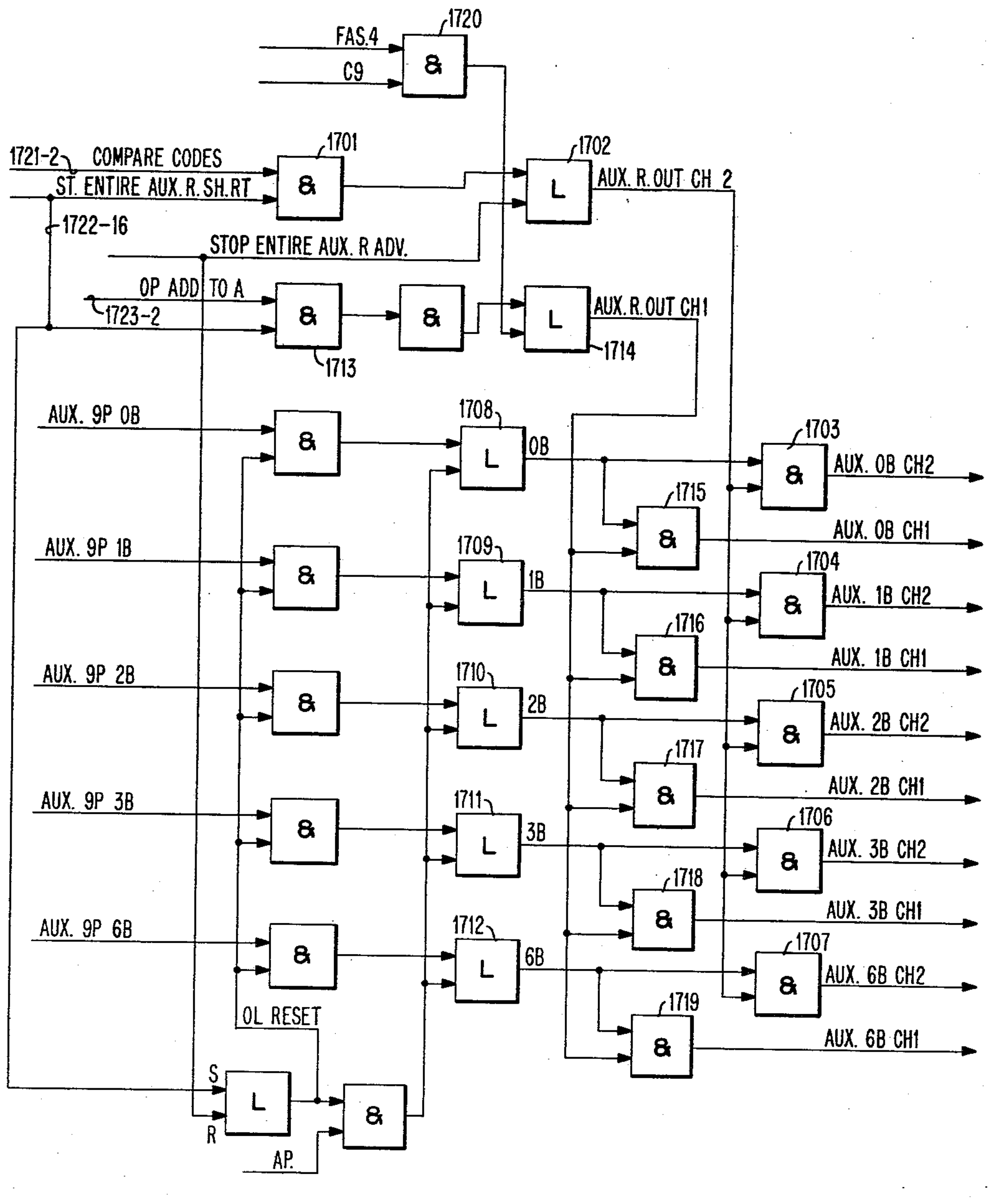
Figure 18A:
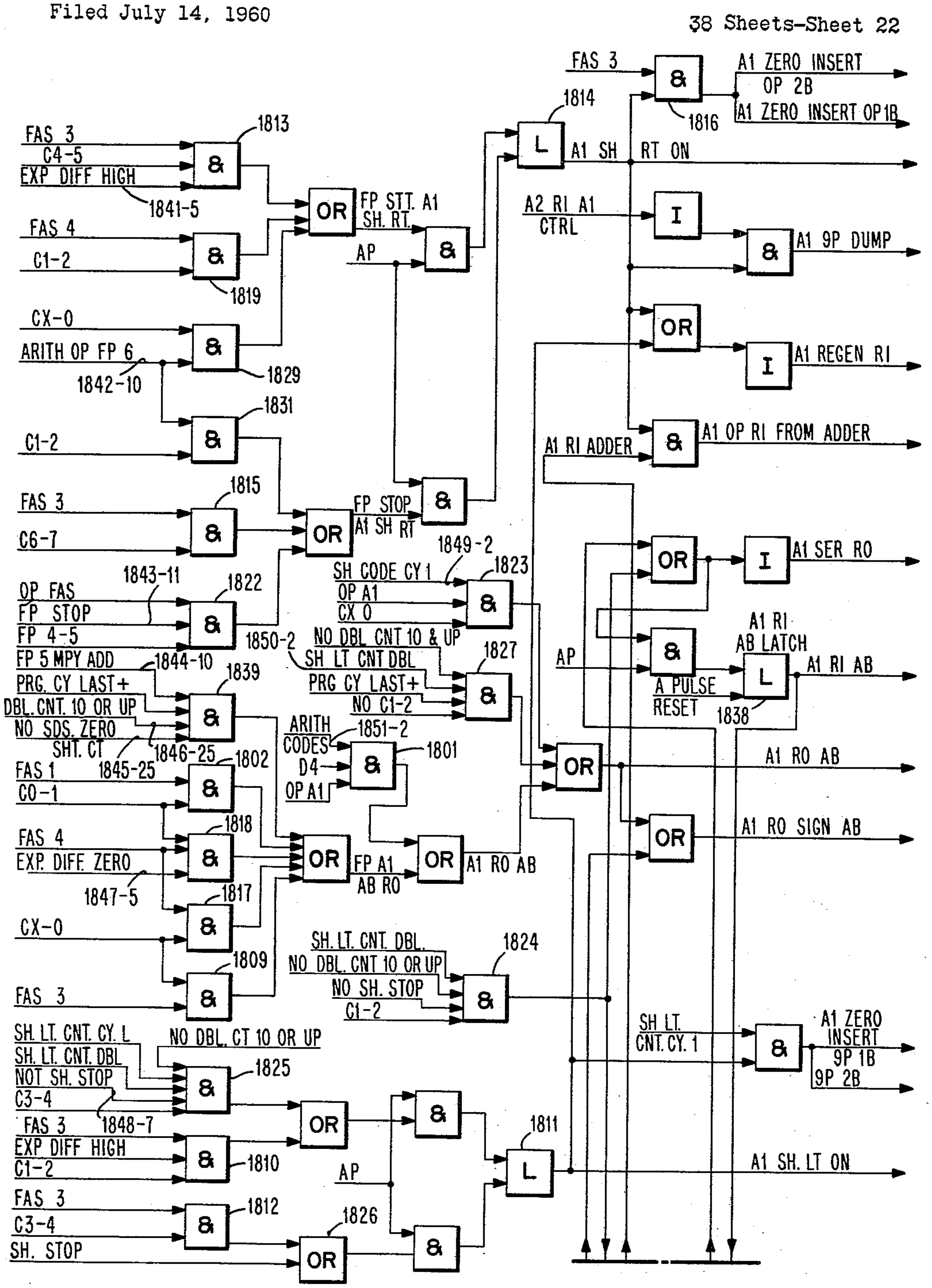
Figure 18B:
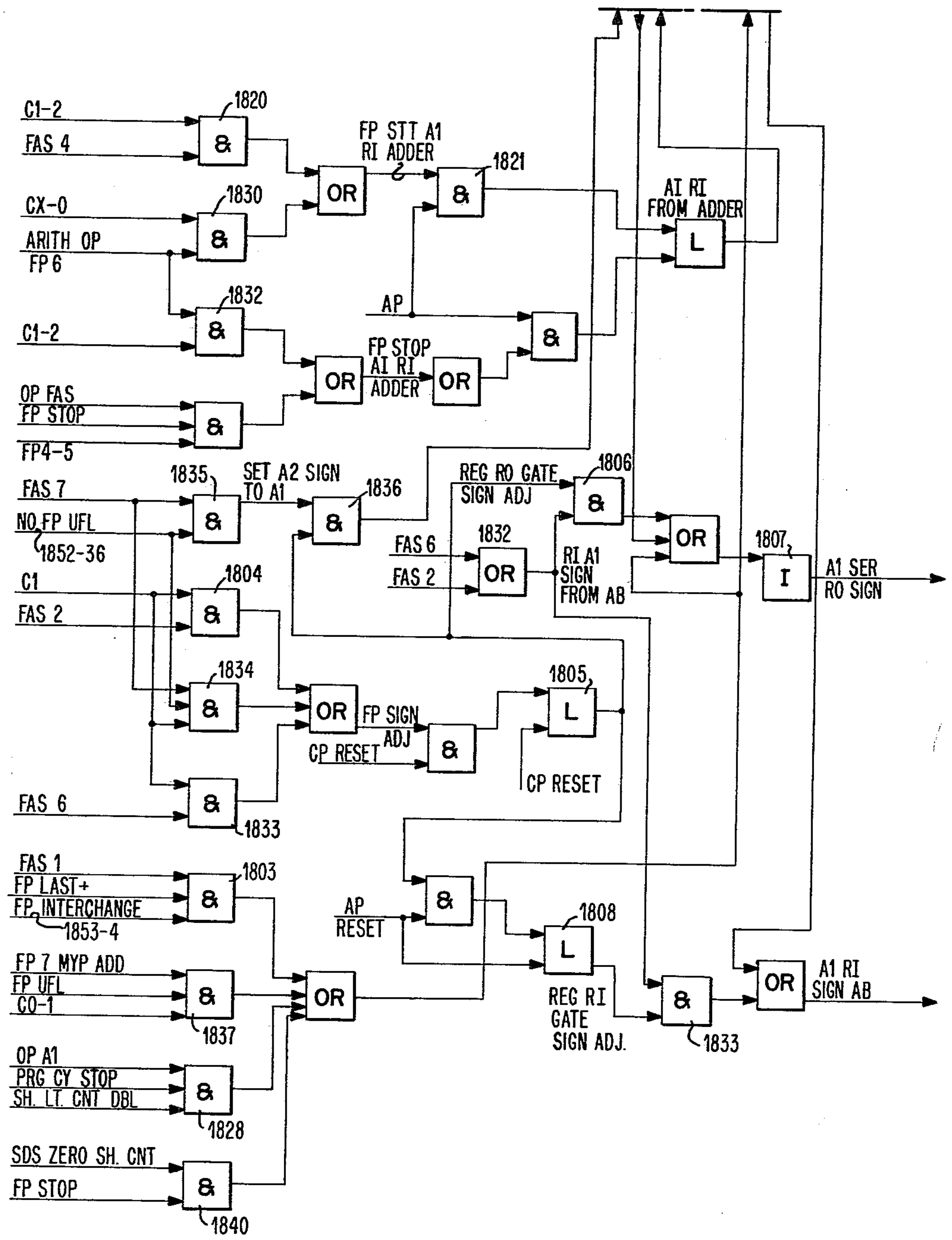
Figure 19:
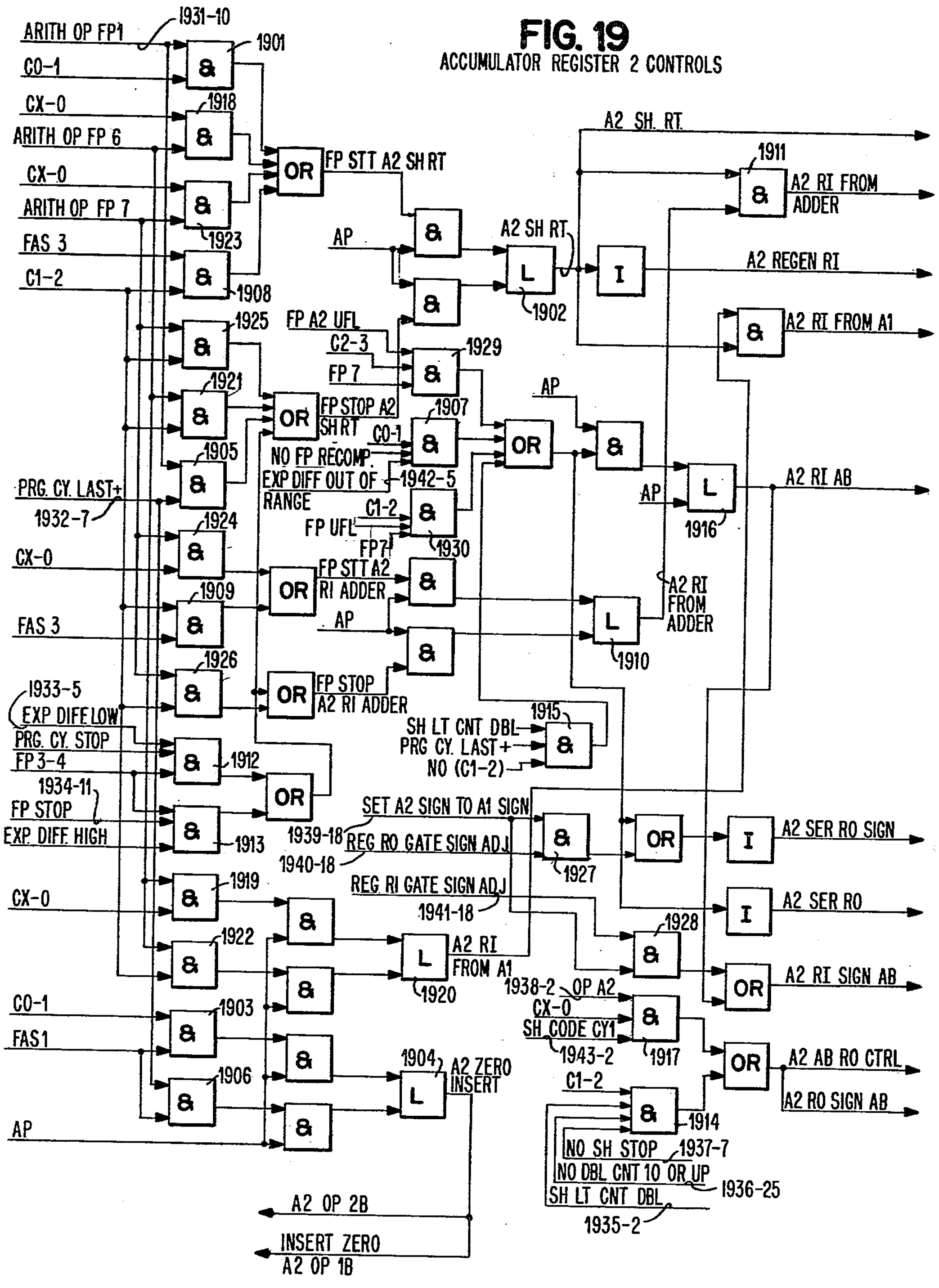
Figure 21:
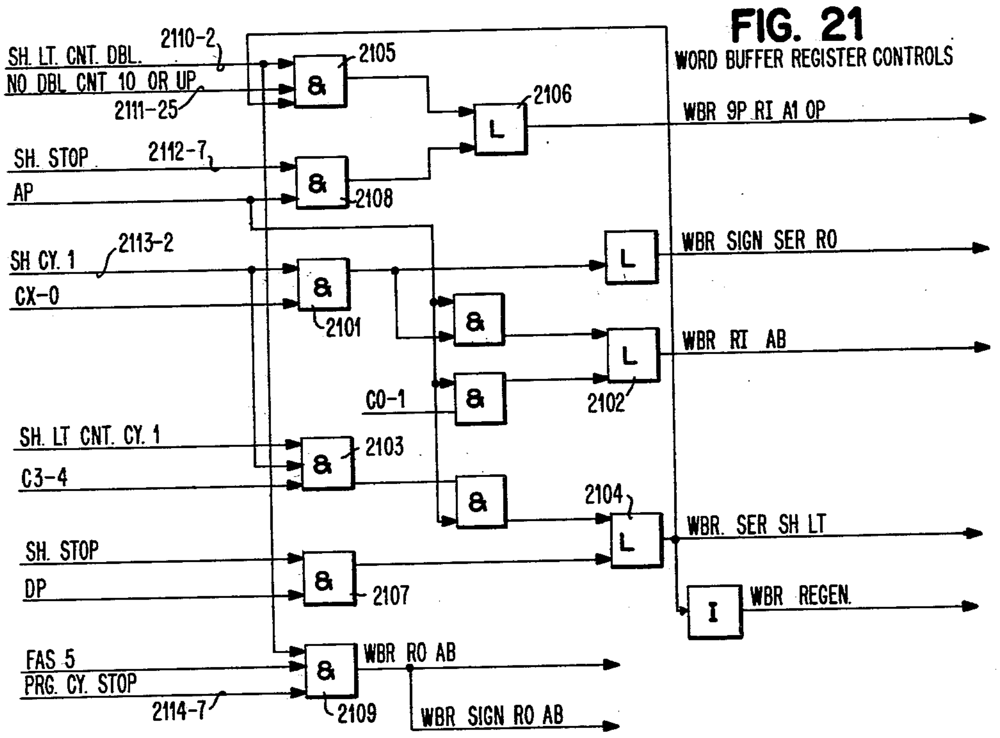
Figure 20:
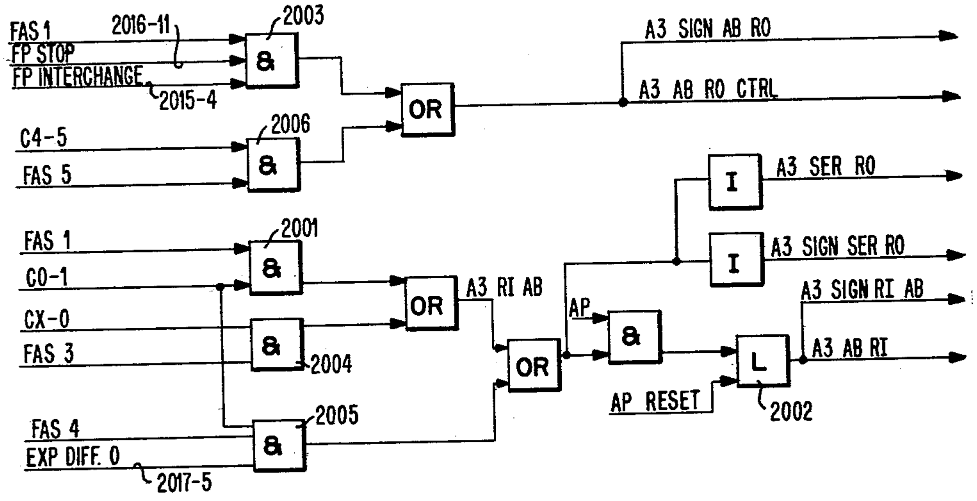
Figure 23:
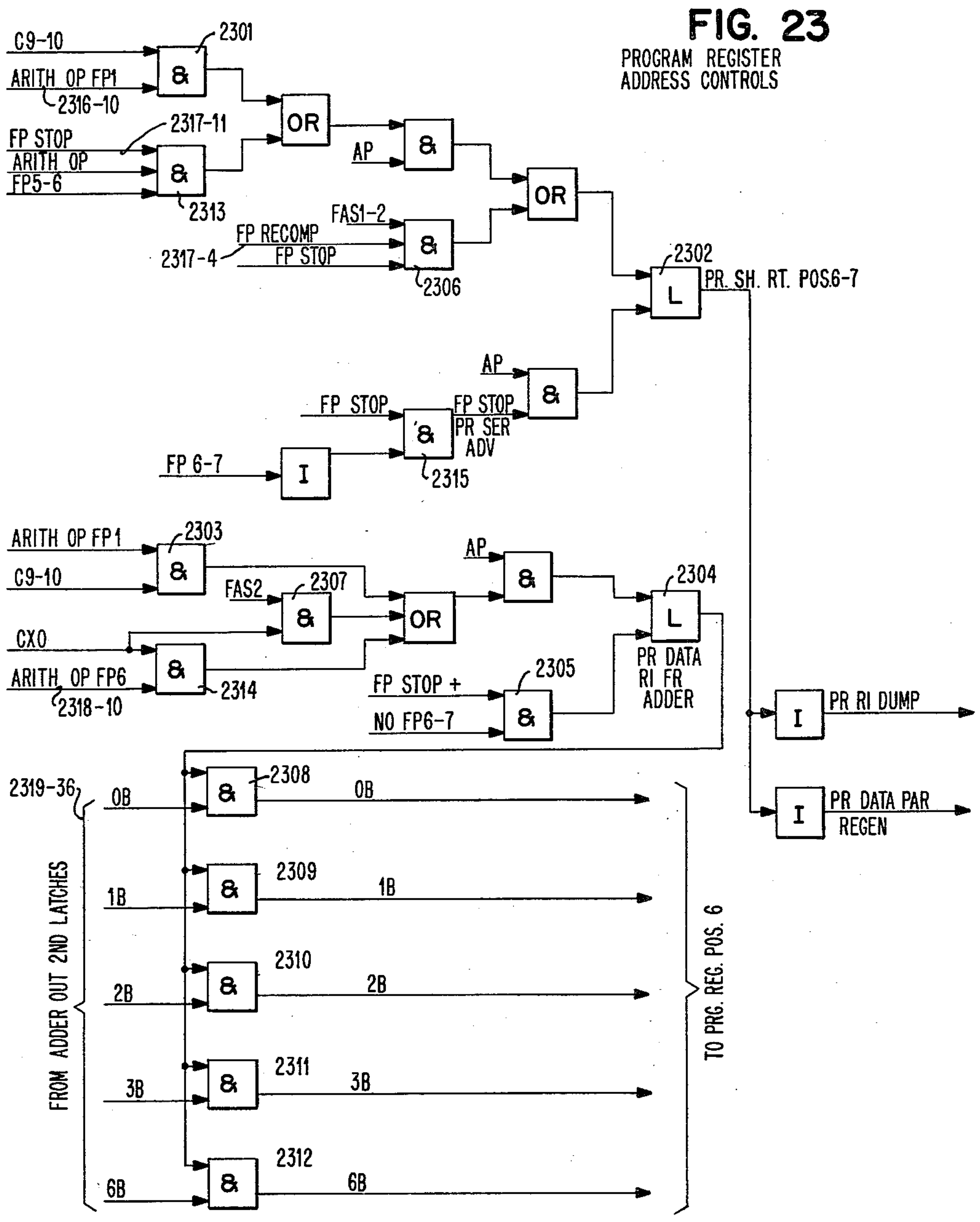
Figure 24:
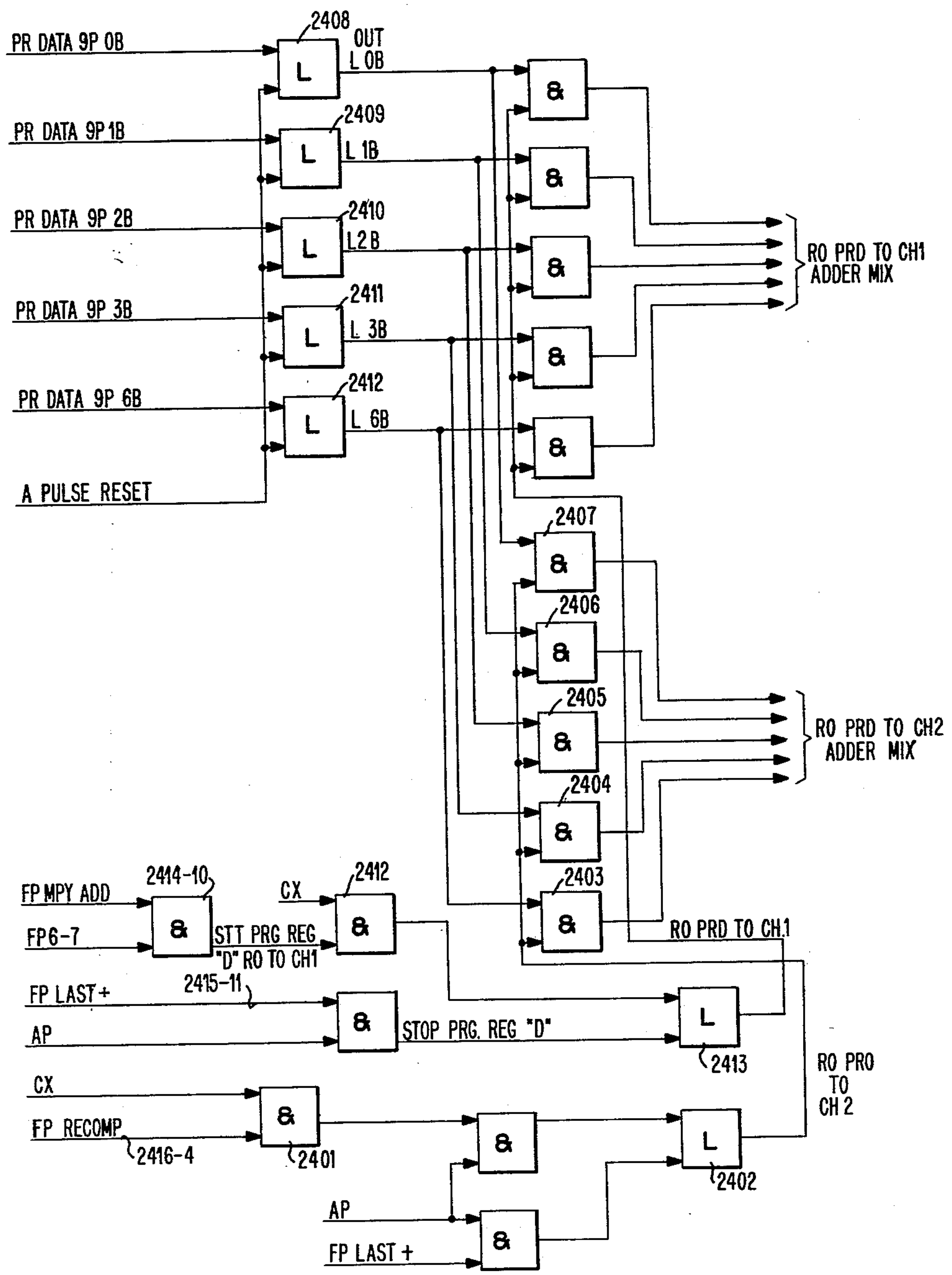
Figure 25:
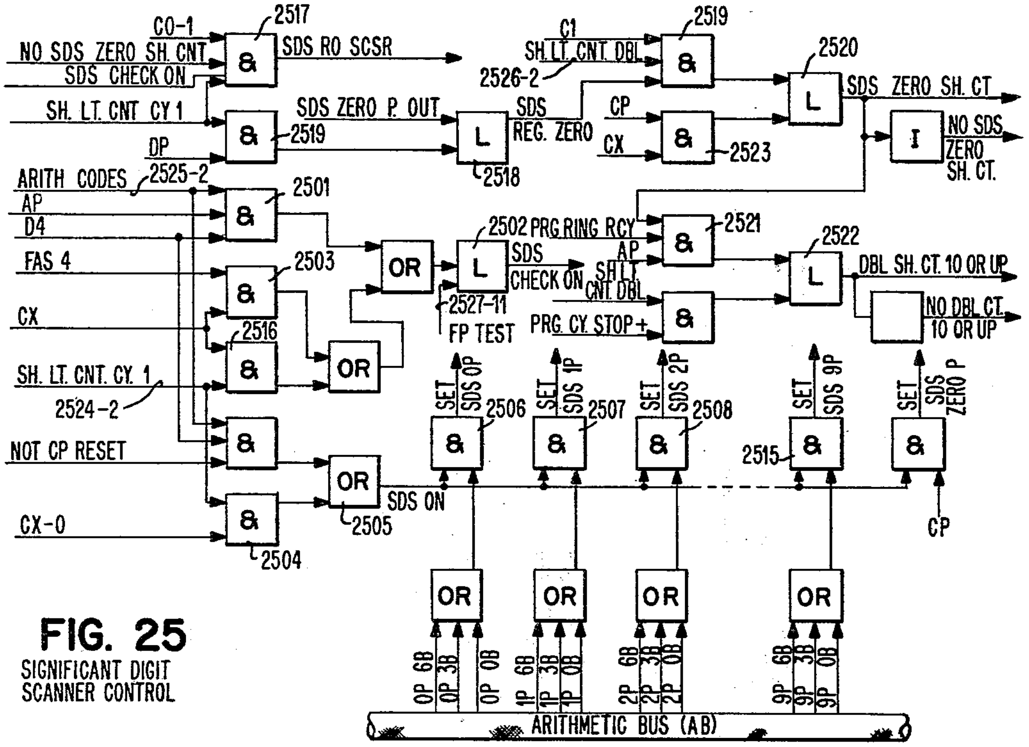
Figure 26:
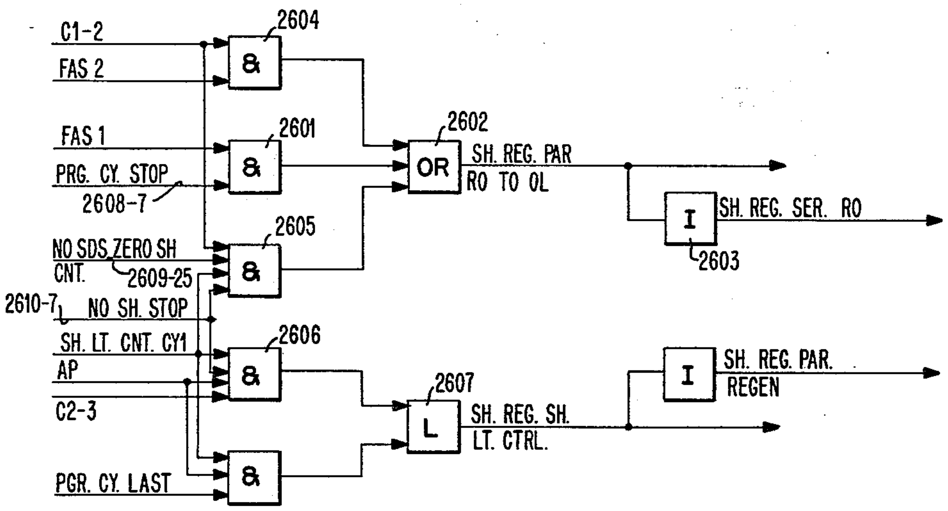
Figures 27, 28:
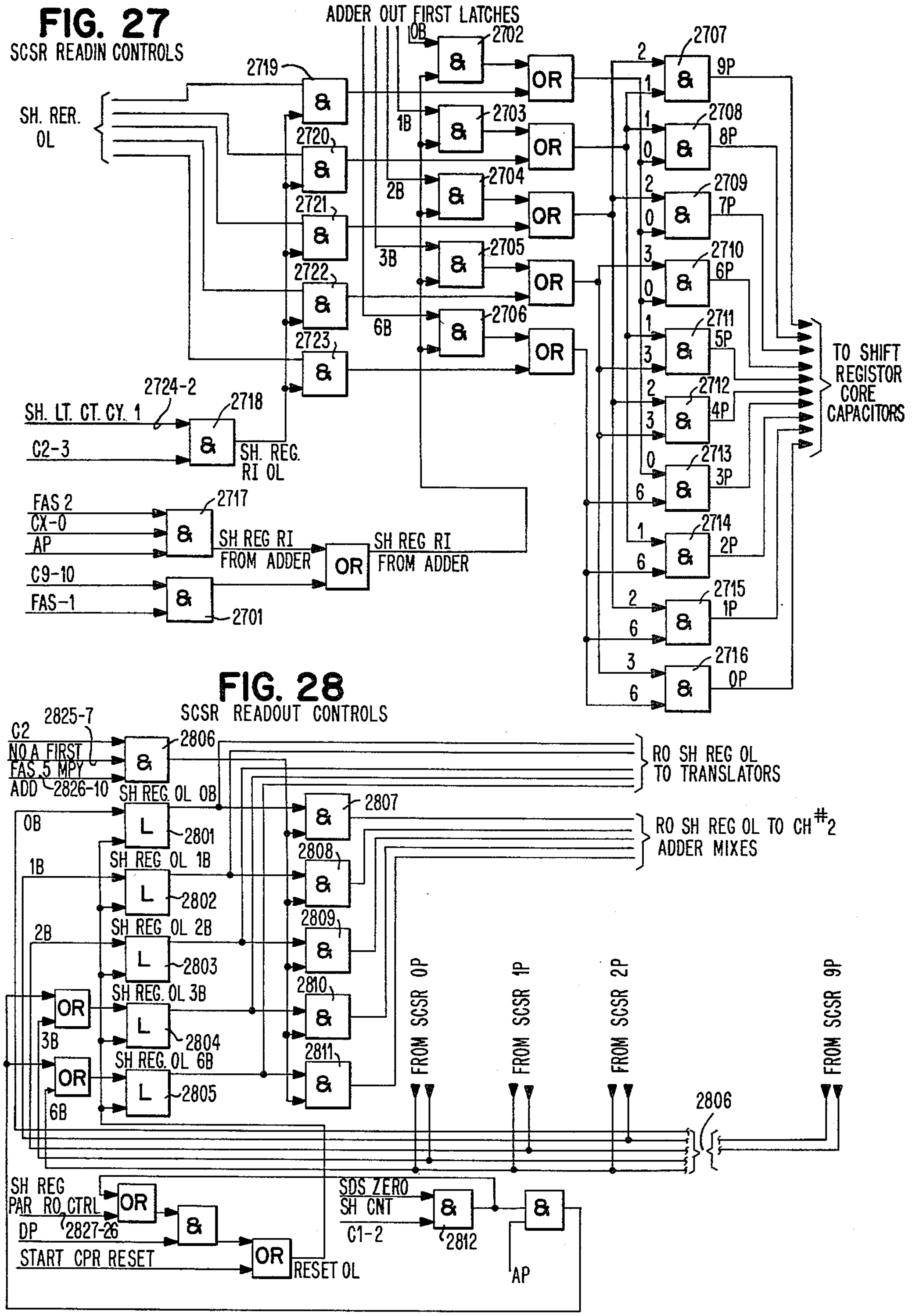
Figure 29:
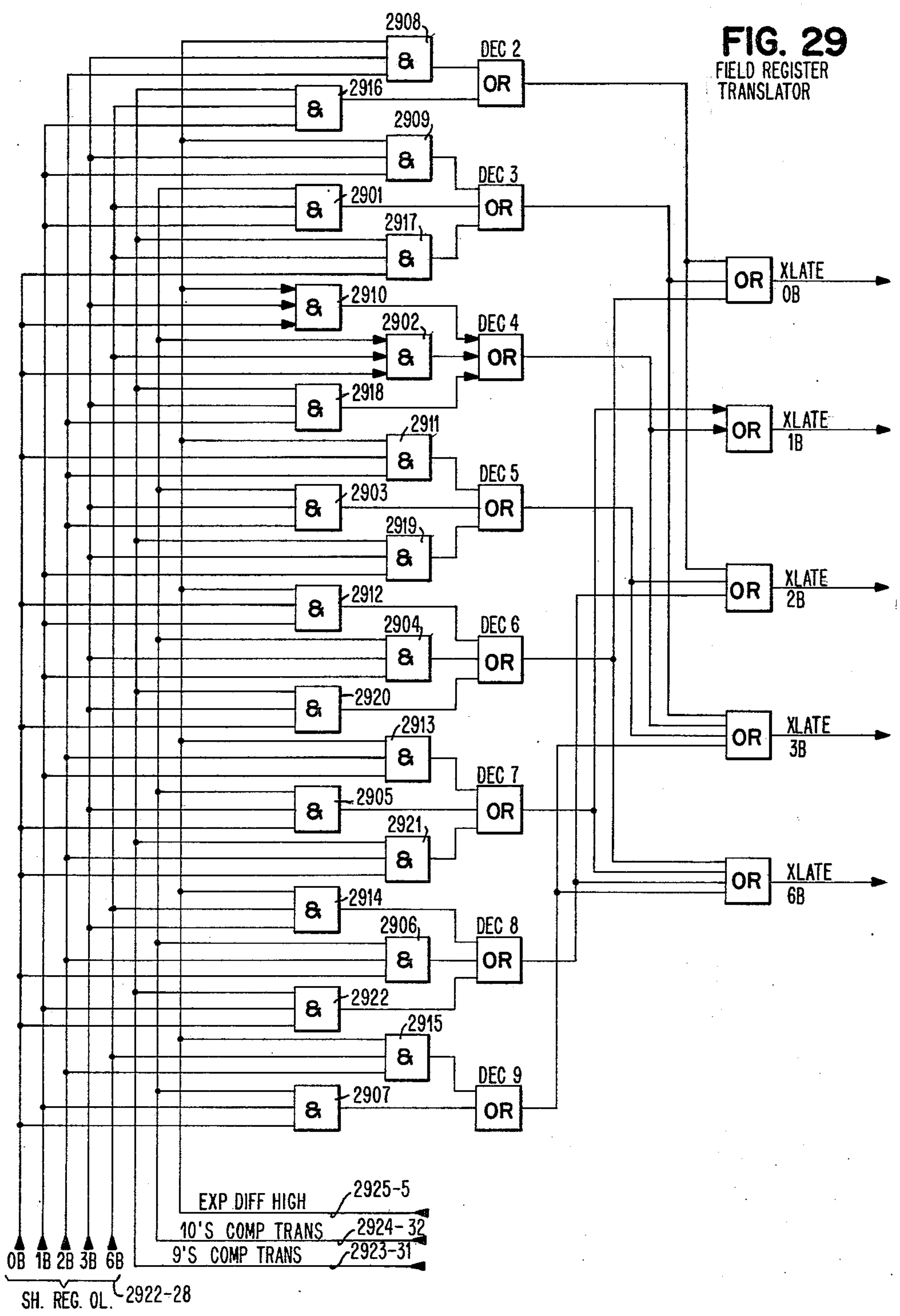
Figure 30:
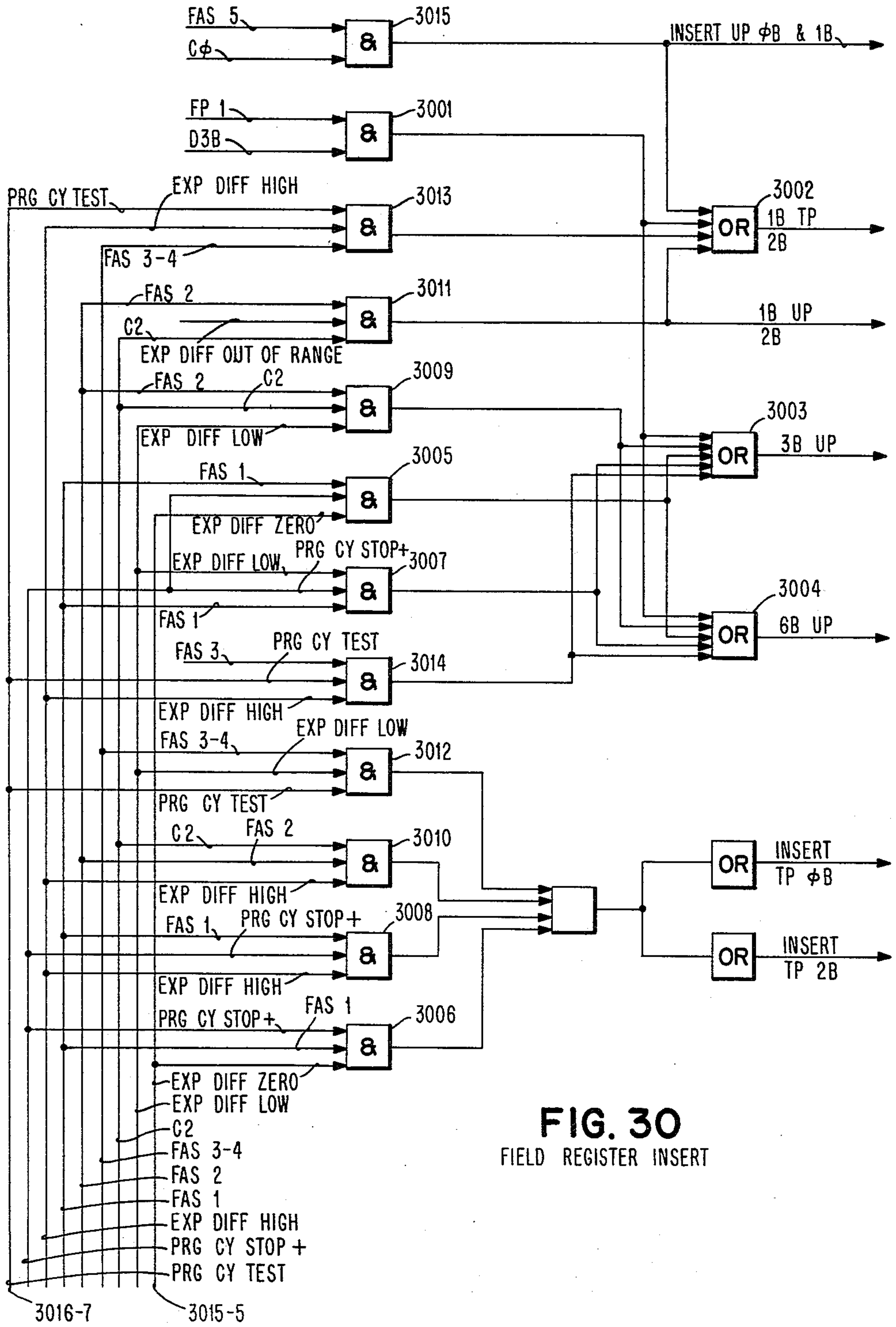
Figure 31A:
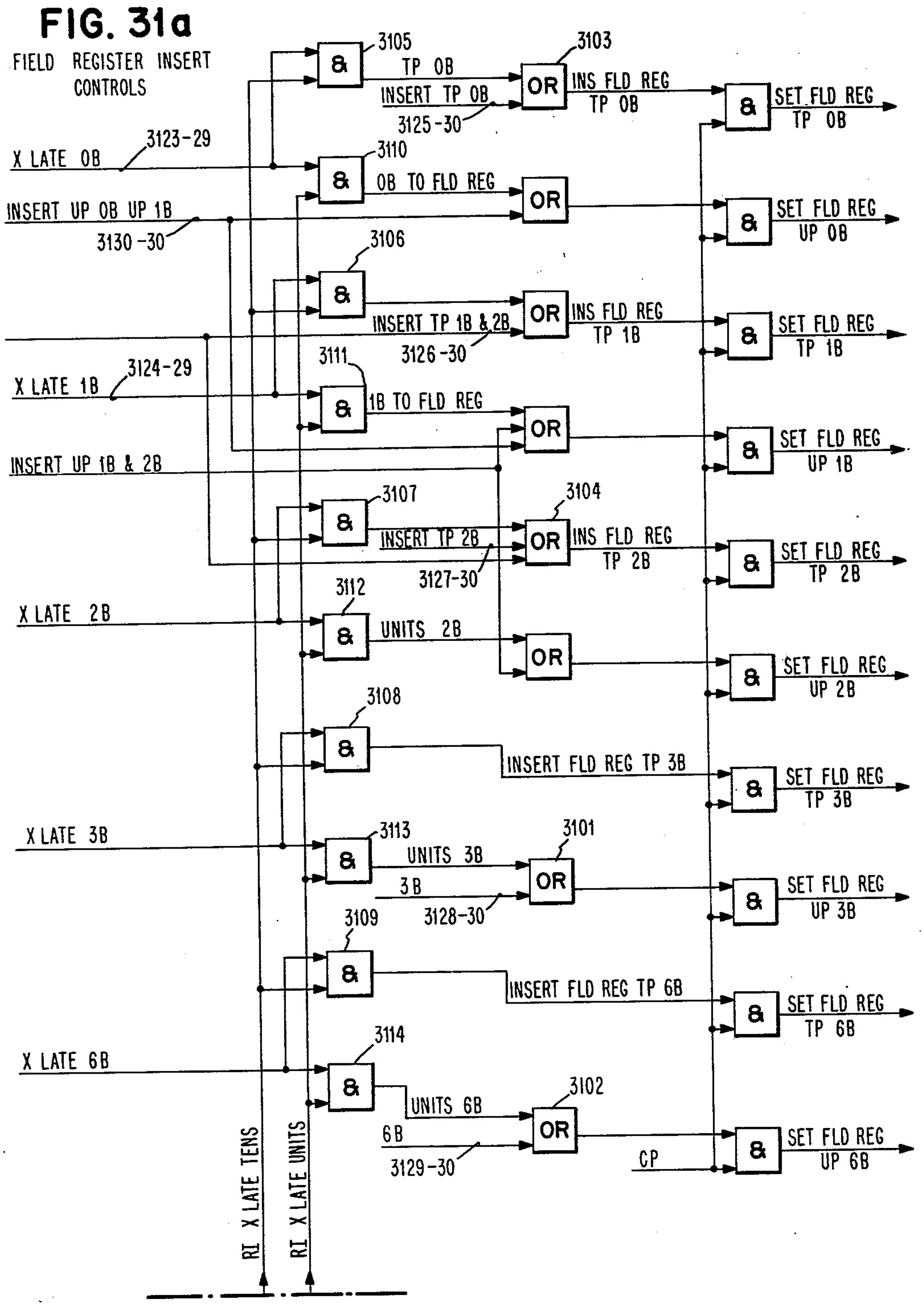
Figure 31B:
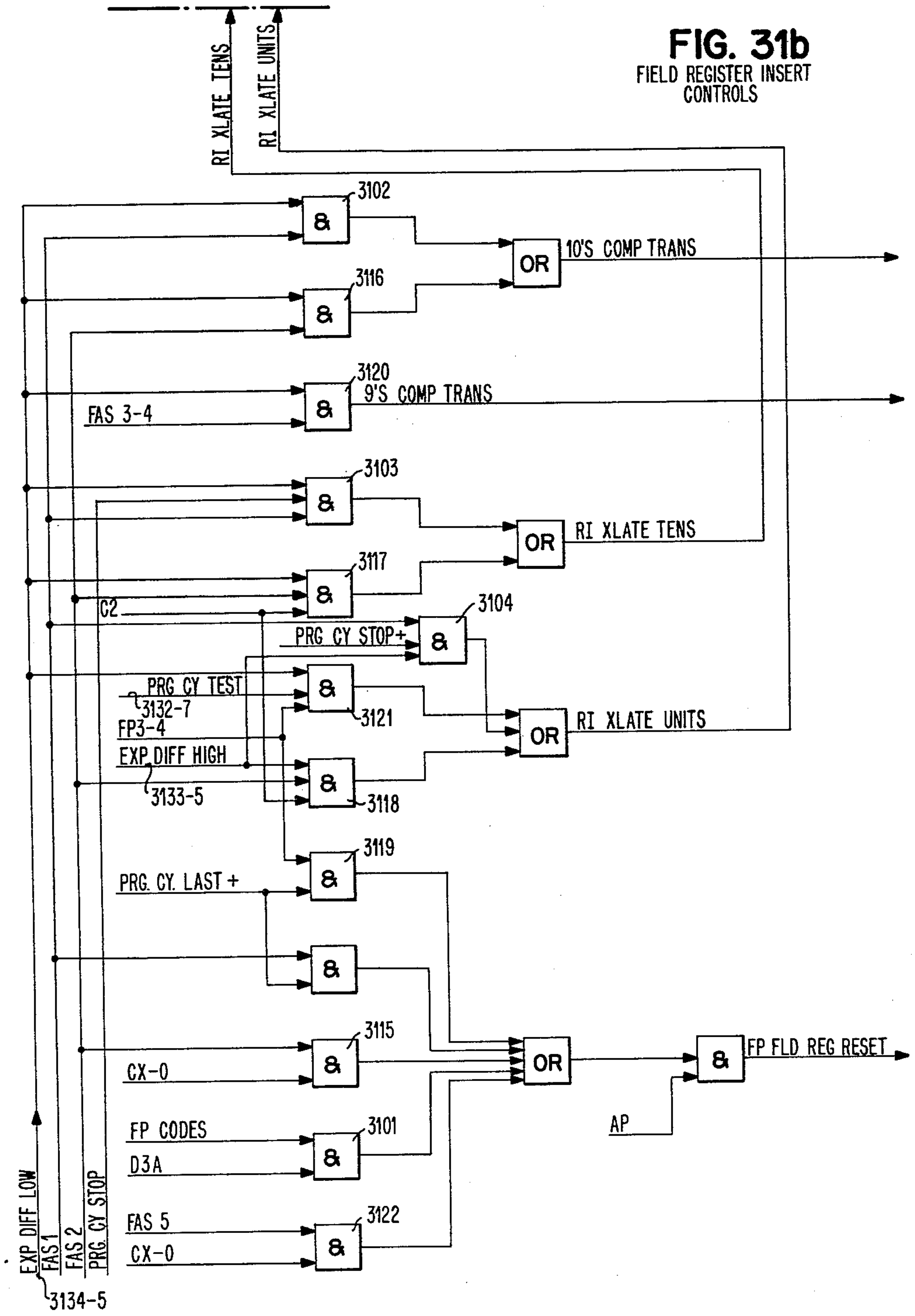
Figure 32:
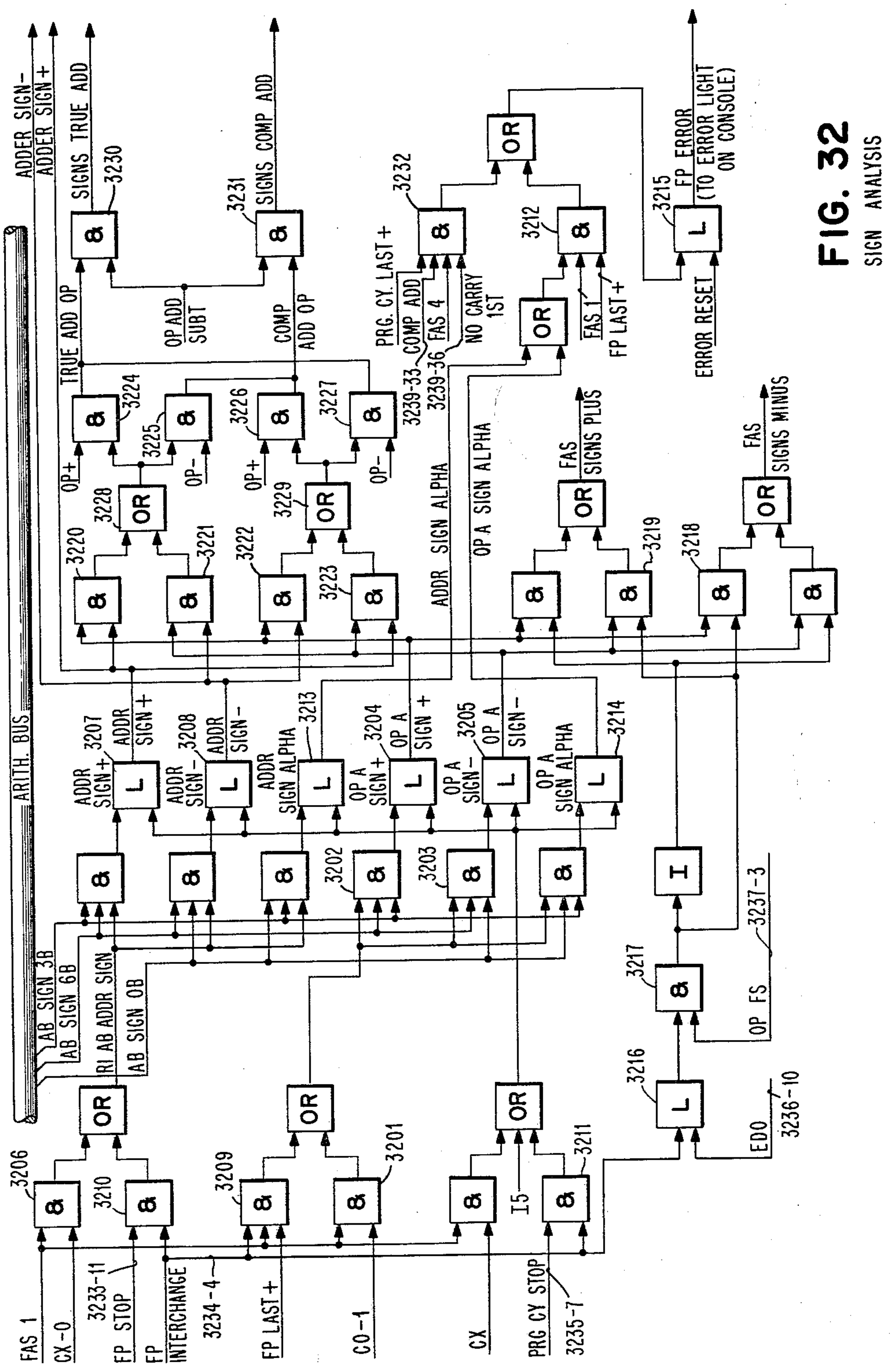
Figure 33:
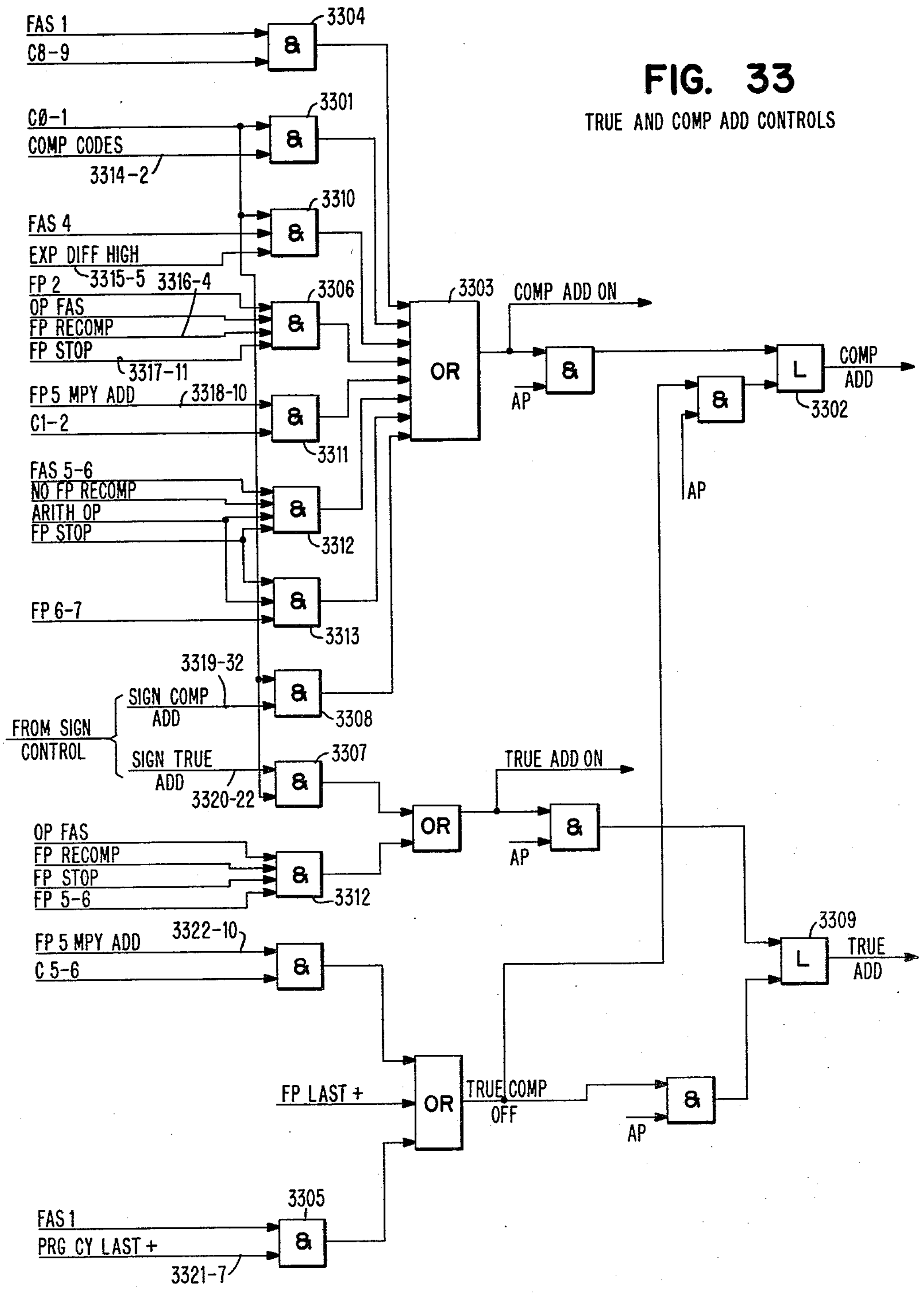
Figures 34, 35:
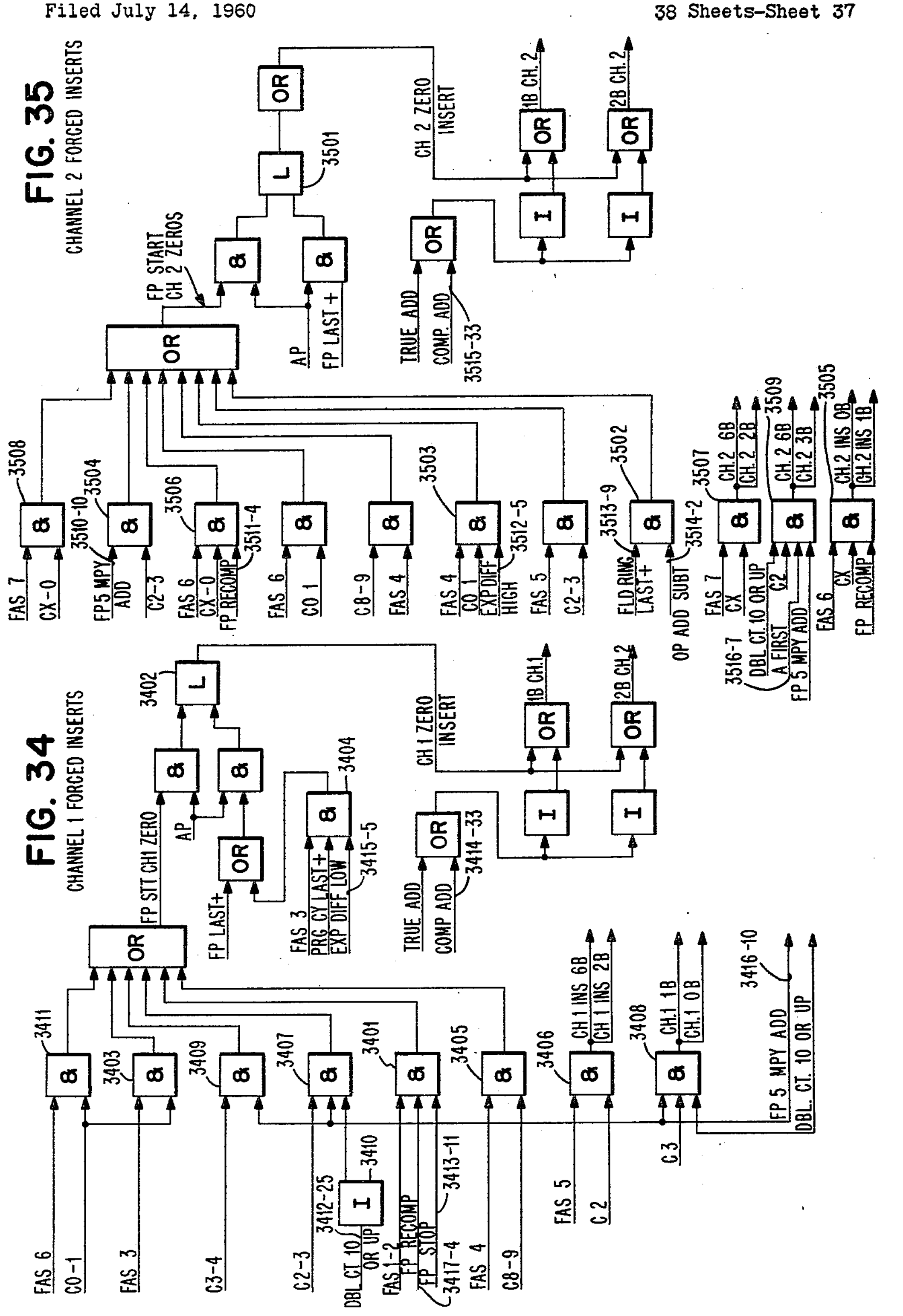
Figure 36:
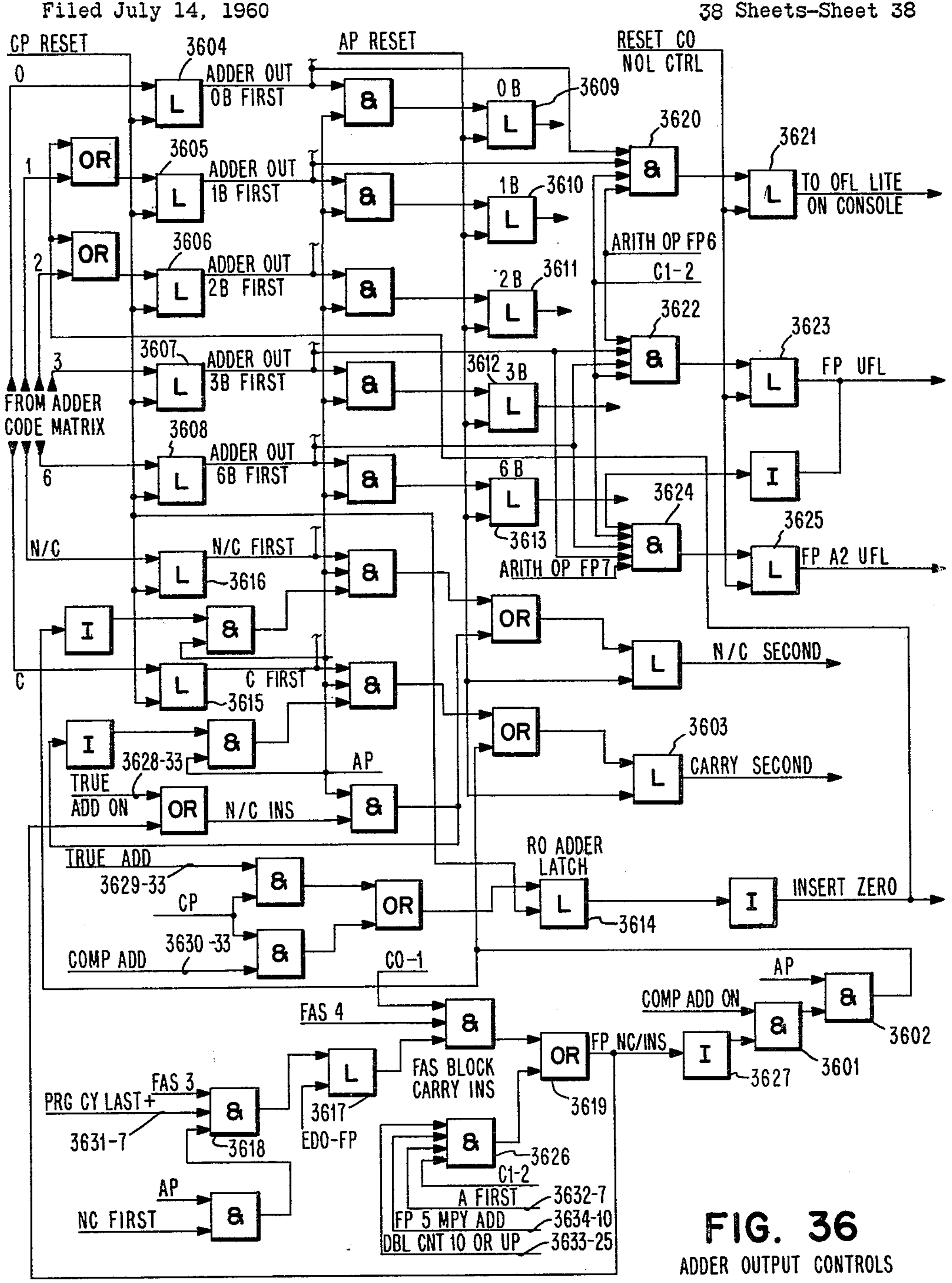

FIGURE 4 discloses the interchange and recomplement controls;

FIGURE 5 shows the exponent difference range controls;

FIGURES 6*a* and 6*b* show the program ring;

FIGURE 7 shows the program cycle ring;

FIGURES 8*a*, 8*b*, and 8*c* show the field ring;

FIGURE 9 discloses the field stop match and field cycle ring;

FIGURES 10*a* and 10*b* show the floating point ring;

FIGURE 11 shows the floating point cycle ring;

FIGURE 12 shows certain of the arithmetic register controls;

FIGURES 13*a* and 13*b* show the arithmetic register serial readout controls;

FIGURE 14 discloses the arithmetic register zero insert;

FIGURES 15 and 16 show the auxiliary register controls;

FIGURE 17 shows the auxiliary register serial readout controls;

FIGURES 18*a* and 18*b* show the accumulator register 1 controls;

FIGURE 19 shows the accumulator register 2 controls;

FIGURE 20 shows the accumulator register 3 controls;

FIGURE 21 shows the word buffer register controls;

FIGURE 22 shows the Op register and field register portions of the program register;

FIGURE 23 shows the program register address controls;

FIGURE 24 discloses the program register address output controls;

FIGURE 25 shows the significant digit scanner controls;

FIGURE 26 shows the single core shift register controls;

FIGURE 27 shows the single core shift register readin controls;

FIGURE 28 shows the single core shift register readout controls;

FIGURE 29 shows the field register translator;

FIGURE 30 discloses the field register inserts;

FIGURE 31*a* and 31*b* show the field register insert controls;

FIGURE 32 shows the sign analysis circuits;

FIGURE 33 discloses the true and complement add circuits;

FIGURES 34 and 35 show the adder channel 1 and channel 2 forced inserts, respectively;

FIGURE 36 shows the adder output controls; and

FIGURE 37 illustrates certain basic timing relationships of the various rings.

Each circuit component in the figures of the drawings is numbered beginning with a digit or digits corresponding to the number of the figure in which it appears. Furthermore, the digit or digits to the right of a hyphen in a number indicate the figure in which a signal is generated.

Figure 1:
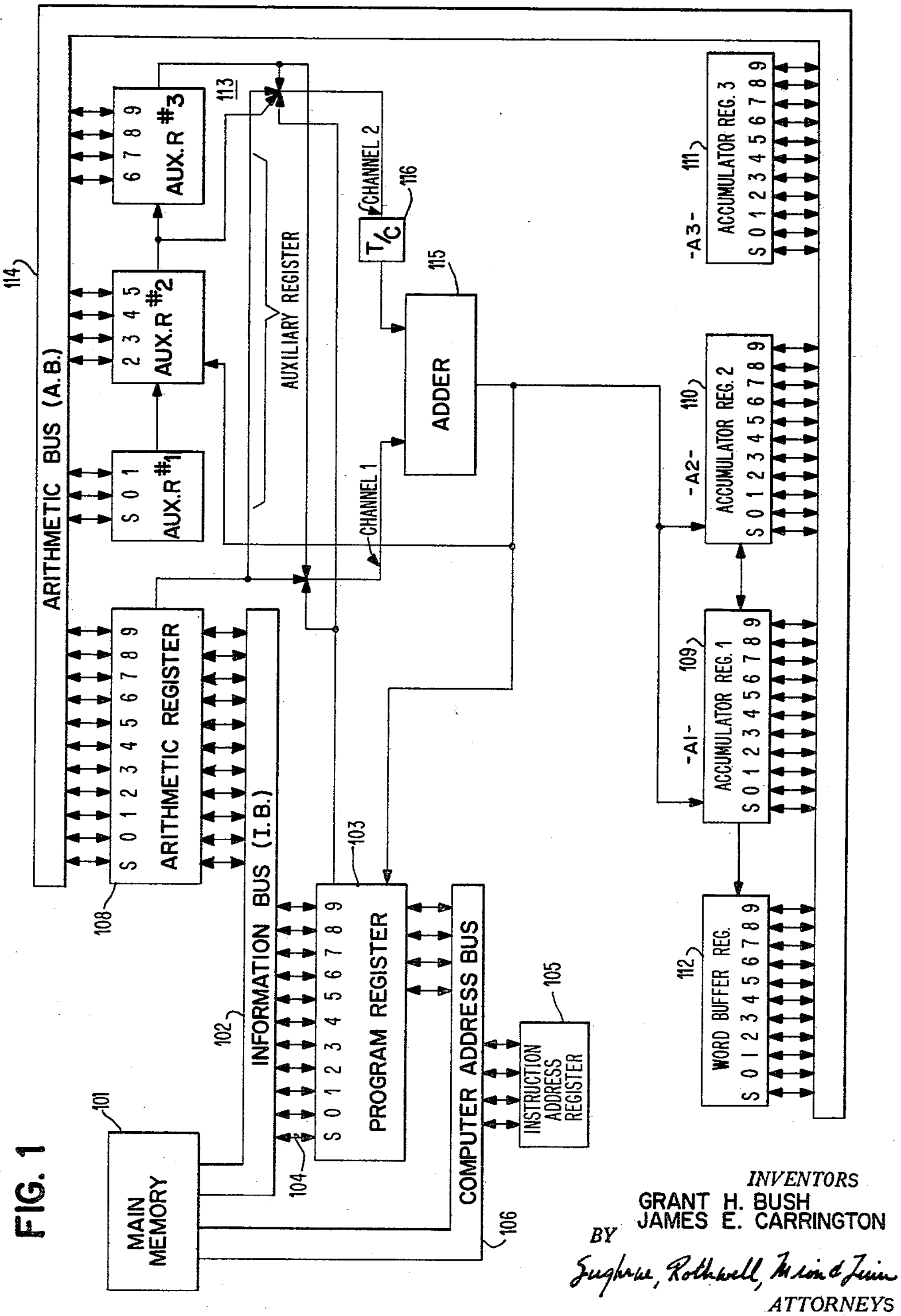
FIGURE 1 is a block diagram showing the information flow within the data processing system of the present invention.

Referring first to FIGURE 1, the data information flow throughout the system of the present invention will now be described. The present embodiment utilizes a "2 out of 5" code to represent decimal and sign characters of both data and instruction words. This means that only two bits out of five bits available are used to represent each of ten decimal digits and three sign characters. This code has the advantage that the presence of other than two bits per character indicates that an error has occurred. Table I below shows the 2 out of 5 code combinations which are used to signify each of these thirteen characters.

*Table I*

| | 0 | 1 | 2 | 3 | 6 |
|---|---|---|---|---|---|
| 0 | -- | X | X | -- | -- |
| 1 | X | X | -- | -- | -- |
| 2 | X | -- | X | -- | -- |
| 3 | X | -- | -- | X | -- |
| 4 | -- | X | -- | X | -- |
| 5 | -- | -- | X | X | -- |
| 6 | X | -- | -- | -- | X |
| 7 | -- | X | -- | -- | X |
| 8 | -- | -- | X | -- | X |
| 9 | -- | -- | -- | X | X |
| + | -- | -- | -- | X | X |
| − | X | -- | -- | -- | X |
| a | X | -- | -- | X | -- |

It will be noted in Table I above that "zero" is represented by two coded bits 1 and 2, and not by the absence of bits completely. Furthermore, the sign character causes the system to interpret the decimal digits in pairs, rather than singly, with said pairs of digits representing alphabetic and other special characters. However, the alphabetic operation of the system does not form a part of the present invention.

In the present embodiment, each data word transferred throughout the system is fixed in length and comprises ten decimal characters and a sign character, thus making a total of eleven characters in all. The main MEMORY 101 can store approximately 10,000 of these eleven-digit words therein, with each word at a unique storage address location which is specified by a four-digit address number. Each word is read out of memory or into memory parallel by character and parallel by bit. Thus, since each decimal character position in a word requires five bit conductors, and the sign character position requires three bit conductors, MEMORY 101 must have $10 \times 5 + 1 \times 3 = 53$ input and output bit conductors to perform this completely parallel operation. Thus a random access memory is required in the present embodiment which may be a magnetic core array or the like. Such memories, together with their addressing circuits, are well known in the art and their details do not form a part of this invention.

In the well known manner of digital computing systems, the present embodiment of the invention utilizes a stored program having instruction words which are retrieved from a storage location MEMORY 101 in order to control the computer in its operations. The instruction format of the present system is as given below:

INSTRUCTION WORD FORMAT

| | Sign | OP Code | | Index Mod. | | Field Length | | Data address | | | |
|---|---|---|---|---|---|---|---|---|---|---|---|
| Character Position No. | S | 0 | 1 | 2 | 3 | 4 | 5 | 6 | 7 | 8 | 9 |

As noted above, the instruction word also contains ten decimal character positions plus a sign character. The sign character occupies position S, while positions 0 and 1 of the instruction word specify the operation code, thereinafter referred to as OP code. Positions 2 and 3 are occupied by index modification digits, and positions 4 and 5 contain the field length digits. Positions 6 through 9 are occupied by data address digits. The significance of each character in the instruction word will be subsequently described.

The instruction words are also stored in MEMORY 101 and are transferred therefrom via the INFORMATION BUS 102 to a PROGRAM REGISTER 103. This transfer is done parallel by character and parallel by bit. Thus, the INFORMATION BUS contains 53 conductors so as to be able to transfer simultaneously all eleven digits of an instruction word. The eleven CONDUCTORS 104 shown leading from the INFORMATION BUS to the PROGRAM REGISTER each represents a channel for a decimal character or a sign character which is inserted into positions S, 0 through 9 of the PROGRAM REGISTER. The particular address in MEMORY 101 at which an instruction word is stored is held in the INSTRUCTION ADDRESS REGISTER 105 and comprises a total of four decimal digits. The instruction address at the beginning of each program cycle is transferred from REGISTER 105 via a COMPUTER ADDRESS BUS 106 to MEMORY 101 in order to select this specific word storage position. The instruction address in REGISTER 105 is then changed by means not shown and not part of this invention so as to select a different instruction storage location for the next program operation.

Once an instruction word has been placed within the PROGRAM REGISTER, the four data address digits found in positions 6 through 9 are read out via COMPUTER ADDRESS BUS 106 to MEMORY 101. These digits may select a storage location therein in which one of the eleven-digit data operand words may be found. This operand may be transferred via INFORMATION BUS 102 to an ARITHMETIC REGISTER 108 in completely parallel fashion as was the instruction word. Information may be also transferred from the ARITHMETIC REGISTER in parallel fashion via INFORMATION BUS 102 back into the main memory.

A series of ACCUMULATOR REGISTERS 109, 110, and 111 are provided for holding one of the two factors to be operated upon during the FAS instruction and for also retaining the double precision 16 digit result of such operation. These registers may hereafter be referred to as A1, A2, and A3. A WORD BUFFER REGISTER 112 and an AUXILIARY REGISTER 113 are also included. Each of the registers 108 through 113 can hold a complete eleven digit factor including signs in positions S, 0 through 9. A parallel transfer of eleven digits between any two of these six registers can occur via an ARITHMETIC BUS (AB) 114. During floating point operations, positions 0 and 1 of a register contain the high and low order digits of the exponent, respectively, while positions 2 and 9 hold the highest and lowest order mantissa digits, respectively.

The AUXILIARY REGISTER is actually comprised of three sections designated herein as AUXILIARY REGISTERS 1, 2, and 3. AUXILIARY REGISTER 1 has factor digit positions S, 0, and 1; AUXILIARY REGISTER 2 has factor digit positions 2, 3, 4, 5; and AUXILIARY REGISTER 3 has factor digit positions 6, 7, 8, 9. These three sections may at times be independently controlled so as to act as three distinct registers.

In addition to the parallel transfer of digits via the ARITHMETIC BUS, means are provided to connect A1, A2, A3 and the WORD BUFFER REGISTER in tandem so as to allow the serial shifting of digits from one register to the other, in either direction. Serial shifting of digits in all three sections of the AUXILIARY REGISTER can also be accomplished. Digits may be sequentially withdrawn from positions in the ARITHMETIC REGISTER by means of a scanner.

An ADDER 115 is provided having two input channels 1 and 2. Addition is performed serially by digit, parallel by bit, with the resulting sum digits emerging in sequence. CHANNEL 2 contains a TRUE-COMPLEMENT circuit 116 which allows the generation of the 9's complement of a number presented thereto, for use when subtraction is desired of that number from a number appearing on CHANNEL 1. The adder result may be directed to any one of a number of registers, including A1, A2, AUXILIARY REGISTER 2, and positions 6 through 9 of the PROGRAM REGISTER. Inputs to CHANNEL 1 and CHANNEL 2 may be derived from the ARITHMETIC REGISTER, the AUXILIARY REGISTER, or the PROGRAM REGISTER. Inputs to CHANNEL 1 and CHANNEL 2 may be derived from the ARITHMETIC REGISTER, the AUXILIARY REGISTER, or the PROGRAM REGISTER.

The basic function of the registers in FIGURE 1 will become apparent during the following general description of the data flow during a floating point add or subtract operation.

A FLOATING POINT ADD-SUBT instruction combines two single-precision factors to develop a double-precision result in A1 and A2. Both factors are assumed to be normalized numbers at the beginning of the operation. One of the factors must be in A1 before programming this code. The contents of the memory location specified by the four digit address in positions 6–9 are read into the ARITHMETIC REGISTER via IB from MEMORY. This value is then added to or subtracted from the contents of A1 with the result being normalized and appearing in A1 and A2. The resultant sign will be placed in both A1 and A2 along with the corrected exponents. Overflow and underflow tests are made on these exponents. If, at the start of the operation, the difference between the exponents of the two initial factors is greater than 15, the larger factor will be placed in A1 as the result and A2 will be reset to zero and its sign to plus. Any value that may have been in A2 when this code was programmed will not affect the result.

In order to do a FLOATING POINT ADD-SUBT operation, the exponents of the two factors have to be made equal. When doing an operation of this kind by hand, this is accomplished by shifting the smaller factor to the right the number of places equal to the difference between the exponents of the two initial factors. In the present embodiment, the actual shifting is not done, but the same result is accomplished by placing the smaller starting factor (according to absolute value) in the ARITHMETIC REGISTER and scanning it out as it is needed. FLOATING POINT ADD-SUBT is divided into three cases for this part of the operation according to the value of the exponent difference.

If the exponents are equal (exponent difference zero) no shifting is needed and nothing is added to A2. The entire eight digit mantissa in the ARITHMETIC REGISTER, positions two through nine, are scanned out and added to or subtracted from the eight digit mantissa of A1, with the result placed in A1.

If the exponent difference is one through seven (exponent difference low) the number of low order digits of the mantissa in the ARITHMETIC REGISTER equal to the exponent difference are scanned out, added to or subtracted from zeros and read into A2. Then the remainder of the mantissa in the ARITHMETIC REGISTER is scanned out, added to the complete mantissa in A1, and the result is read into A1.

If the exponent difference is eight through fifteen (exponent difference high) some of the low order mantissa digits from the ARITHMETIC REGISTER may not be used since they would be shifted too far to the right to have any effect on the sixteen digit result. The digits that are needed are scanned out of the ARITHMETIC REGISTER, added to or subtracted from zeros, and read into A2. Since nothing will be left to add to A1, this factor is not altered unless a subtraction has occurred.

A FLOATING POINT ADD-SUBT operation is divided into seven subcycles, however all seven are not always used. If one or more of these subcycles is not needed it will be skipped.

The first cycle is called FAS 1 (Floating Point add-subt subcycle 1) and is primarily a compare cycle. The factor that is in A1 is subtracted from the factor that has been read in from MEMORY to the ARITHMETIC REGISTER. A compare is done on both the mantissas and the exponents. If the factor in the ARITHMETIC REGISTER has the larger exponent, an interchange is performed between A1 and the ARITHMETIC REGISTER in order to place the smaller factor in the ARITHMETIC REGISTER. If the factor in the ARITHMETIC REGISTER has the smaller exponent, the exponent difference, which is a complement number in this case, will be recomplemented during the next cycle. As the A1 factor is subtracted from the ARITHMETIC REGISTER factor, the exponent difference will be read into the PROGRAM REGISTER positions 6–9. If the exponents were equal, the result of the mantissa compare is used to determine if an interchange should take place or not. This operation is generally accomplished by transferring A1 to the AUXILIARY REGISTER and then reading the AUXILIARY REGISTER out to CHANNEL 2 where its complement is taken. The ARITHMETIC REGISTER is read out to CHANNEL 1. A1 is also transferred to A3 during the first part of this cycle in case an interchange is to be done. If an interchange is indicated, the ARITHMETIC REGISTER is transferred to A1 and A3 is then transferred to the ARITHMETIC REGISTER. This is done near the end of FAS 1. This cycle also determines the range of the exponent difference. One of the following four conditions is set during this operation:

(A) EXP DIFF ZERO
(B) EXP DIFF LOW (EXP DIFF 1–7)
(C) EXP DIFF HIGH (EXP DIFF 8–15)
(D) EXP DIFF OUT OF RANGE (EXP DIFF GREATER THAN 15)

Also during FAS 1, A2 is shifted right ten places and zeros are inserted so any information remaining in A2 fiom a previous operation will not affect the result.

The second cycle is called FAS 2 which is used to recomplement the exponent difference if this is necessary due to the A1 exponent being larger than the ARITHMETIC REGISTER exponent. Also, a sign change may take place in order to insert the correct sign into A1. The exponent difference is used to determine how the actual add cycles should be accomplished and the true difference is needed for this. The exponent difference is read into positions 6–9 of the PROGRAM REGISTER during FAS 1 and, this difference will be read out to CHANNEL 2 of the ADDER during FAS 2. The 10's complement of this number is taken and the recomplemented value is sampled to determine the exponent difference range so that one of the four above-described conditions may be ascertained. FAS 2 will normally be skipped if the A1 exponent is equal to or smaller than the ARITHMETIC REGISTER exponent, except for conditions subsequently to be described in greater detail.

FAS 3 is the ADD TO A2 cycle. If the exponent difference is low or high this cycle is used. However, if the exponent difference is zero, this cycle is not needed since neither of the starting factors is to be "shifted." Therefore, with an exponent difference of zero, FAS 3 is skipped and the operation goes from FAS 1 to FAS 4.

The ADD TO A2 cycle, FAS 3, causes some or all of the ARITHMETIC REGISTER mantissa digits to be scannned out onto CHANNEL 2 as in a normal add operation. Zeros are inserted on CHANNEL 1, and the results of the addition or subtraction are read directly into A2 from the ADDER. To have the larger exponent for use in the answer, A1 is read into A3 at the beginning of this cycle.

FAS 4 is the ADD TO A1 cycle. This cycle is always taken if the exponent difference is zero or low. However, on an exponent difference high, doing a true add this cycle will be skipped since there is nothing left from the smaller starting factor to be added. When doing a complement add this cycle is used to borrow one from the low order digit of A1 since the smaller factor was subtracted from zeros during FAS 3. A1 is transferred to the AUXILIARY REGISTER at the beginning of this cycle, and the AUXILIARY REGISTER is then shifted right and read out to CHANNEL 1. The remaining mantissa digits in the ARITHMETIC REGISTER are scanned out to CHANNEL 2. The results is read directly into A1 from the ADDER.

FAS 5 is the normalization cycle. Any high order zeros in A1 are eliminated by coupling A1 and A2 and shifting left until a non-zero digit appears in the high order position of A1, position 0. The number of shifts taken are effectively counted, and this number stored in AUXILIARY REGISTER 2 for use in the updating of the A1 exponent during the succeeding cycle. This operation is actually performed by first transferring A1 to the WORD BUFFER REGISTER and A2 to A1. The WORD BUFFER REGISTER and A1 are connected in tandem and started shifting left with position 9 of the WORD BUFFER REGISTER reading in from position 0 of A1. This shifting will continue until a non-zero digit is detected in position 0 of the WORD BUFFER REGISTER. As A1 is being shifted into the WORD BUFFER REGISTER, zeros are inserted at the low order of A1, which is position 9. A1 is now transferred back to A2 and the WORD BUFFER REGISTER is transferred to A1. If A1 is all zeros, A2 is instead transferred to the WORD BUFFER REGISTER and the shifting will be done the same as in the A1 non-zero case. If both A1 and A2 are zero, the signs of both accumulators are set plus and the operation will end here. Shifting the result to the left will necessitate modifiyng the larger of the two factor exponents by decreasing it by one for each shift taken. However, the positions normally occupied by the exponent (positions 0 and 1) contain zeros so that two extra shifts are taken in the WORD BUFFER REGISTER which should not affect the modification factor.

The modification factor is generated by the ADDER and read therefrom into AUXILIARY REGISTER 2. This factor is stored here until the next cycle.

The next cycle is FAS 6 which is used to insert the corrected sum exponent into A1. The larger starting factor is stored in A3 at the beginning of the ADD-SUBT operation. This factor is transferred to the ARITHMETIC REGISTER during FAS 5. Positions 0—1, the exponent, are scanned out from the ARITHMETIC REGISTER to CHANNEL 1 at the beginning of FAS 6 at the same time the modification factor in AUXILIARY REGISTER 2 is read out to CHANNEL 2 and subtracted from the exponent. A1 is shifted right and the result is read into A1 positions 0—1 directly from the ADDER and also into positions 6–9 of the PROGRAM REGISTER. A2 is shifted also right two places and reads in the two lower order digits out of A1. Exponent overflow and underflow tests are also made as the exponent leaves the ADDER.

FAS 7 cycle is used to generate the exponent for A2. The updated exponent that was placed in the PROGRAM REGISTER during FAS 6 is read out to CHANNEL 1 of the ADDER and reduced by eight. This is done by inserting an eight on CHANNEL 2 and subtracting. The result is read into A2 from the ADDER as A2 is shifted right two places. The exponent tests are made as in FAS 6. If an exponent overflow occurs, it is signaled at the console and the program will stop or continue depending on an Exponent Overflow stop-sense switch.

If an exponent underflow occurs during FAS 6, both A1 and A2 will be set to plus zeros during FAS 7. If an exponent underflow occurs during FAS 7, only A2 will be set to plus zeros. The ARITHMETIC REGISTER is set to plus zeros at the beginning of FAS 7, and if A1 and/or A2 are to be reset, the ARITHMETIC REGISTER is transferred to that accumulator.

Some of the remaining figures will now be briefly described before turning to a detailed description of their operation.

Figure 2:
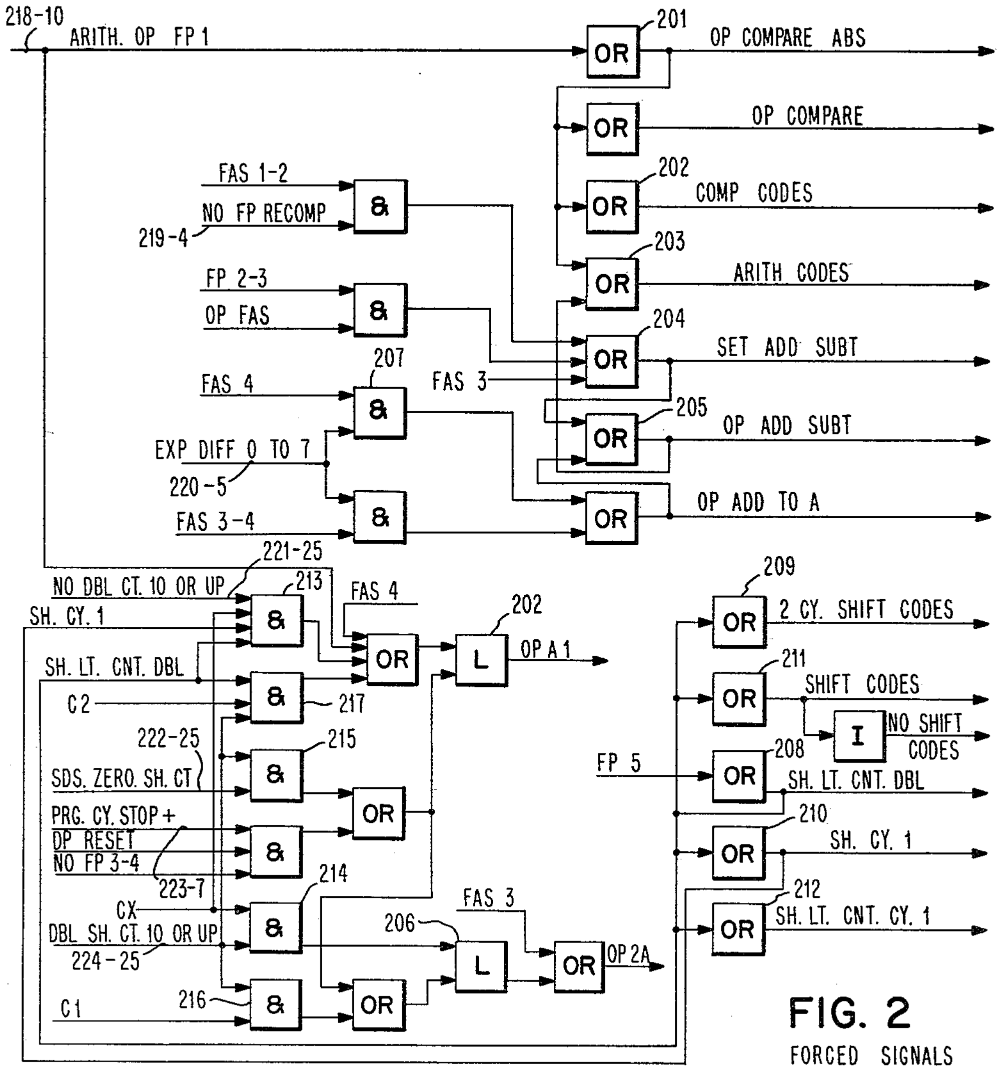
FIGURE 2 shows the generation of certain forced operation signals.

FIGURE 2 shows means whereby certain basic operation signals may be forced on by the floating point add or subject operation codes in order to aid in the execution of the floating point instruction. Since the present invention is an optional feature in a large scale general purpose data processing system, it has been designed to take advantage of a large number of circuits which are utilized in operations other than floating point. Hence, these forced signals may be generated in response to other operation codes as indicated by the use of OR gates. In FIGURE 2 as well as in all other figures, AND logic gates are represented by &, while OR logic gates are as indicated. Bistable latch circuits are represented by L, with their set inputs being the higher of the two inputs. Inverter gates are represented by I.

Figure 3:
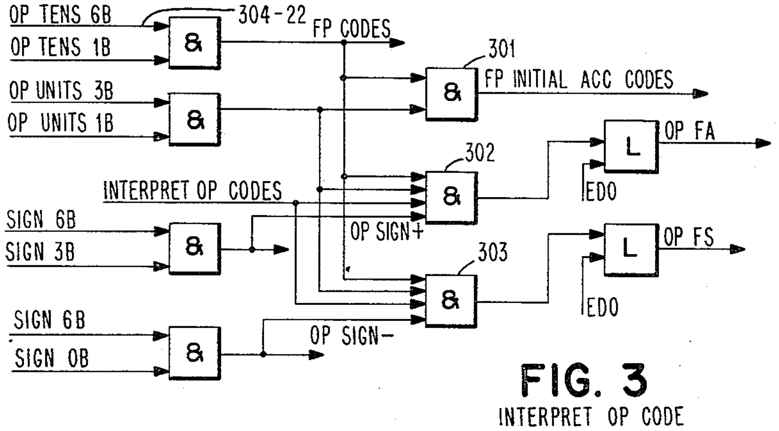
FIGURE 3 shows means for interpreting the operation code portion of the instruction word.

In FIGURE 3, the signal Interpret Op Codes may be generated by means shown in the above-identified APPLICATION A, but which does not form a part of the present invention. The showing in FIGURE 3 is limited to the structure necessary for recognizing only the floating point add or subtract operations, to which this invention particularly relates.

FIGURES 6*a* and 6*b* disclose the PROGRAM RING which is also shown and described in APPLICATION A. The operation of this ring is always initiated with the setting of LATCH 602. The signal D4 is derived from the DATA CONTROL RING not shown herein, but disclosed in APPLICATION A. The C pulses (CP) and A pulses (AP) are clock pulses such as illustrated in FIGURE 37. B pulses (BP) and D pulses (DP) are also provided so as to create a basic four microsecond digit time with the leading edges of the AP, BP, CP, and DP being one microsecond apart. The reset pulses also begin at the same time as their corresponding clock pulses, but do not remain on as long. Thus, LATCH 602 is set at AP time via AND 601 and remains on for four microseconds until the following AP reset pulse occurs. LATCH 603 is set on at CP time following the setting of LATCH 602, so that the set times of LATCHES 602 and 603 overlap for a period of two microseconds. In like fashion, all succeeding stages are set on for a complete digit cycle, and overlap with their adjoining neighbors. This relationship may be observed in FIGURE 37.

In like manner, the FIELD RING of FIGURE 8 operates with the set times of the successive latches overlapping. The FIELD RING operation is initiated at a position indicated by the digit held in the units position of the FIELD REGISTER as described in APPLICATION A.

FIGURES 12 through 21 illustrate controls for the ARITHMETIC, AUXILIARY, ACCUMULATOR, and WORD BUFFER REGISTERS. These registers comprise five bit storage units per decimal order position (with the exception of the sign position having only three bits). Therefore, many of the control signals shown in these figures must be applied to all five storage units in a position since a digit is always transferred parallel by bits. Although the invention is not to be construed as limited to any particular kind of storage unit, the particular embodiment disclosed herein utilizes a basic magnetic core and capacitor storage unit such as is shown in a copending application, IBM docket 6259 which is hereby incorporated by reference. In such a storage unit, the core is reset at every AP time and a charge placed upon the capacitor if a bit had been stored in the core. At the next following CP time, the charge on the capacitor may be reinserted back into the same core, thus setting it, or the charge may be transferred to the storage unit core either to the right or to the left of the core originally containing it. The presence of a REGEN signal, or Shift Right-Shift Left signals, determines the disposition of the charge. In order to insert a new digit into a register position, the readout of the core at AP time to the capacitor is blocked, then new bit charges are applied to the desired cores at the next following CP time from the Arithmetic Bus or the like. Therefore, it is noted that the control signals shown in the figures could also be used, by one skilled in the art, to control any one of a number of dynamic bistable storage units other than the kind used in the present embodiment. Furthermore, storage units other than the dynamic type may be employed, since the present invention is directed to means for controlling data modification and not to any particular type of data storage.

It should also be noted that positions 6 through 9 of the PROGRAM REGISTER employ the same type of storage units as those in the above-described registers.

FIGURE 25 discloses various controls for a SIGNIFICANT DIGIT SCANNER, the complete details of which are disclosed and claimed in a copending application, IBM docket 6259. However, in addition to the scanner positions shown therein, the SIGNIFICANT DIGIT SCANNER in the present embodiment also has a ZERO position stage attached to position 9 which is set on if there are no non-zero digits in any of the positions 0–9 of a number being scanned from the Arithmetic Bus.

FIGURE 26 discloses controls for a SINGLE CORE SHIFT REGISTER which is associated with the SIGNIFICANT DIGIT SCANNER. This register is comprised of one magnetic core-capacitor stage per order position, instead of five stages per position. One of these position stages may be set and this marker shifted either to the right or left. When transferring from the SIGNIFICANT DIGIT SCANNER to the SHIFT REGISTER, the transfer is always to a SCSR position immediately to the left of the corresponding position of the SDS. For example, if position 7 of the SDS has been set, this marker may be transferred to position 6 of the SCSR. A setting of position 0 in the SDS is transferred to an X position in the SCSR which is immediately to the left of position 0 of the SCSR. Thus, the SDS contains positions 0–9, and ZERO, while the SCSR has positions X, 0–9.

FIGURES 32 to 36 are concerned with controls for the ADDER, the details of which do not form a part of the present invention. The forming of the 10's complement of a number on CHANNEL 2 is done by first taking the 9's complement thereof of all its digits, then increasing by one the value of the first digit entering on CHANNEL 1. This is a well known technique. In the present embodiment, one series of gates are conditioned by a COMP ADD signal so as to direct the digits on CHANNEL 2 into a logical translation matrix where the 9's complement is formed and then applied to the ADDER. The ADDER itself may operate in the 2 out of 5 code, or in any other mode, so long as the bits forming a digit are handled in parallel so as to provide but little delay between the adder inputs and output.

FAS 1—COMPARE

The foregoing objectives of the COMPARE FAS 1 cycle are performed by the circuitry of the figures in the following manner. After the floating point instruction has been placed in PROGRAM REGISTER stages S, 0–9 by means shown and described in the above-identified APPLICATION A, the sign position latches 2201–2203 and the 0 and 1 position latches 2204–2208, 2209–2213 of the PROGRAM REGISTER are interrogated in order to determine the nature of the operation. This interrogation occurs when the INTERPRET OP CODE signal is generated. Assuming that either a +74 or a −74 resides in these three positions of the PROGRAM REGISTER, a floating point initial access code signal is generated by AND 301 and either an OP FA or an OP FS is generated by AND gate 301 or AND 302, respectively, in accordance with the value of the instruction sign and the presence of the digits 7 and 4 in positions 0 and 1 of the PROGRAM REGISTER, respectively. The FP INITIAL ACC code signal is switched with a D3A signal from a DATA CONTROL RING (shown and described in APPLICATION A) at AND 1001 to set FP1 latch 1002. At the same time, the OP FA signal or the OP FS signal generates an OP FAS signal at OR 1003. The OP FAS signal comprises an input to OR 1004 whose output is designated as an ARITH OP signal. ARITH OP and FP1 switch at AND to generate ARITH OP FP1. The ARITH OP FP1 signal then causes the OP COMPARE ABS and OP A1 functions to be forced on at OR 201 and LATCH 202, respectively. The OP COMPARE ABS signal generates the COMP CODES signal and the ARITH codes signal at OR 202 and OR 203, respectively, for use during the FAS 1 cycle. Furthermore, FP1 switches with OP FAS at AND 1004 to generate the FAS 1 signal.

At this time it is now assumed that one factor resides in ACCUMULATOR REGISTER 1 (A1) while the other factor resides in the ARITHMETIC REGISTER. Both factors must be normalized numbers; i.e., the highest order non-zero mantissa digit is in position 2. As has been previously described, the factor in A1 will now be subtracted from the factor in the ARITHMETIC REGISTER in order to determine (1) which is larger and (2) the exponent difference range. Before this subtraction can occur, the A1 factor is transferred to the AUXILIARY REGISTER where it will be thereafter shifted one digit at a time to the adder. Also, the mantissa and exponent digits of the factor held in the ARITHMETIC REGISTER must successively be sent to the ADDER beginning with position 9 of the ARITHMETIC REGISTER and ending with position 0. In order to accomplish this readout from the ARITHMETIC REGISTER beginning and ending with these positions, the FIELD REGISTER positions 4 and 5 (latches 2214–2218, 2219–2223, respectively) of the PROGRAM REGISTER must be set to digit 0 in position 4 (tens position of the FIELD REGISTER) and to digit 9 in position 5 (units position of the FIELD REGISTER). This forcing of an 0 and 9 into the FIELD REGISTER is accomplished by switching FP CODES with D3A (from the DATA RING of APPLICATION A) at AND 3101 in order to first generate a field register reset signal which resets the five latches associated with each of the FIELD REGISTER positions in the PROGRAM REGISTER. Thereafter, FP1 switches with D3B at AND 3001 in order to insert a 1 bit and a 2 bit via OR 3002 into the FIELD REGISTER tens position LATCHES 2215 and 2216 which, in the 2 out of 5 code, represents the digit 0. FP1 and D3B also cause a 3 bit and a 6 bit from OR gates 3003 and 3004 to be inserted in the FIELD REGISTER unit position LATCHES 2222 and 2223 which, in the 2 out of 5 code, represents the digit 9. D4 and AP switch at AND 601 to initiate operation of the PROGRAM RING by setting CX LATCH 602.

ARITH CODES OP A1 and D4 switch together at AND 1801 in order to generate A1 RO AB signal which causes the factor residing in A1 to be read out to the ARITHMETIC BUS(AB). Arithmetic codes and D4 also switch at AND 1601 in order to set LATCH 1602 at AP time so as to cause the entire AUXILIARY REGISTER to read-in from the ARITHMETIC BUS this factor from A1. FAS 1 and C01 switch together at AND 1802 in order to generate the A1 RO AB signal again so as to read out the factor in A1 to AB for the second time. In like fashion, FAS 1 and C01 switch at AND 2001 in order to set LATCH 2002 and generate the signal A3 RI AB so that ACCUMULATOR REGISTER 3 also receives the factor from A1. The purpose of transferring A1 to A3 is to provide for the function of interchange at the end of the compare cycle if this be necessary.

It is also necessary for the sign analysis circuit of FIGURE 32 to sample the signs of the factors held in A1 and the ARITHMETIC REGISTER at the beginning of FAS 1. During the transfer of the A1 factor to A3 via the AB bus at C01 time, the signals FAS 1 and C01 switch at AND 3201 in order to generate a gating signal to allow AND gates 3002 and 3203 to sample the sign position of the AB in order to set one of the OP A sign LATCHES 3204 or 3205 to indicate the sign of the factor held in A1. In the 2 out of 5 code, the 6 bit and 3 bit indicates "plus," while the 6 bit and 0 bit indicate "minus." Furthermore, CX0 and FAS 1 previously have switched at AND 1201 in order to read out the factor held in the ARITHMETIC REGISTER to the ARITHMETIC BUS. FAS 1 and CX0 also switch at AND 3206 in order to allow the sign control circuitry to sample the sign of this ARITHMETIC REGISTER factor which is now present on the AB in order to set one of the two plus or minus address sign LATCHES 3207 or 3208 found therein. The presence of the factor from ARITHMETIC REGISTER on the ARITHMETIC BUS occurs between the two times that the factor from A1 is transferred to the bus so that there will be no interference. Therefore, it is seen that provision is made for the sign control circuit to determine the signs of the two factors, which, since we are now dealing exclusively with a numerical operation, are assumed to be either plus or minus.

After the above operations have been terminated, the ARITHMETIC REGISTER now contains one of the factors to be operated upon, while the AUXILIARY REGISTER, A1 and A3 all contain the other factor. It is now necessary to subtract the factor held in the AUXILIARY REGISTER, which is that also held in A1, from the factor held in the ARITHMETIC REGISTER. This latter factor is always assumed to be the larger of the two at the beginning of the FAS 1 compare cycle. Previously, D4 and ARITH CODES have switched at AND 2501 in order to set LATCH 2502 so as to generate the SDS CHECK ON signal. The SDS CHECK ON signal, C01, and NO SHIFT CODES switch at AND 1603 in order to set LATCH 1604 which causes the entire AUXILIARY REGISTER to begin shifting right the A1 factor contained therein. Only positions 0 through 9, which contain the mantissa and exponent digits of the factor, are actually shifted. At the same time, zeros are inserted into position 0 of the AUXILIARY REGISTER by means of AND 1605. Since the factor in the AUXILIARY REGISTER must be subtracted from that in the ARITHMETIC REGISTER, position 9 of the AUXILIARY REGISTER must be connected to CHANNEL 2 of the ADDER which contains the complementing gate so that the 10's complement of that factor may be obtained. ST. ENTIRE AUX. R. SH. RT and COMPARE CODES switch at AND 1701 in order to set LATCH 1702 so that AND gates 1703–1707 are conditioned to transmit each digit to the CHANNEL 2 of the ADDER. These AND gates sample LATCHES 1708–1712 which in turn are set by each factor digit as it is read out of position 9 of the AUXILIARY REGISTER due to the presence of the auxiliary register advance signal which causes the shift right operation.

At the same time that the factor digits in the AUXILIARY REGISTER are being sent to the ADDER, the factor digits in the ARITHMETIC REGISTER must be transmitted to CHANNEL 1 of the adder. The scanning of the ARITHMETIC REGISTER position-by-position is under control of the FIELD RING which steps in sequence. As discussed in the above-identified APPLICATION A, there is no actual shifting right operation performed in the ARITHMETIC REGISTER. The FIELD RING operation is initiated at one of its latches in dependence upon the digit held in the units position of the FIELD REGISTER, and its operation is terminated at the latch governed by the digit held in the tens position of the FIELD REGISTER. C0 and ARITH CODES switch at AND 901 in order to generate the FIELD RING START PULSE which is directed to AND gates associated with all of the FIELD RING half time stages, such as FI–9, F9–8, etc. The other inputs to these AND gates are derived from the FIELD REGISTER units position latches which, at the beginning of the FAS 1 cycle, have had a digit 9 forced therein. Therefore, the field ring start pulse finds only AND gate 801 conditioned by a 6 bit and a 3 bit so that LATCH 802 is forced on, thus giving the FI–9 signal. The FI–9 signal samples ARITHMETIC REGISTER position 9 at AND gates 1301–1302 so as to allow the factor digit contained therein to be read out to LATCHES 1303–1307. COMP CODES and C1 switch at AND 1308 in order to set LATCH 1309 so that only AND gates 1310–1314 associated with ADDER CHANNEL 1 are conditioned to gate out the digit from LATCHES 1303–1307. Thus, the digit from position 9 of the ARITHMETIC REGISTER is only applied to CHANNEL 1 of the ADDER as long as LATCH 1309 remains set. THE FIELD RING steps in sequence so that signals F9–8, F8–7, etc., are used to successively sample positions 8, 7, etc., in order to serially withdraw factor digits from the ARITHMETIC REGISTER and send them to CHANNEL 1 of the ADDER, while the shifting right of the AUXILIARY REGISTER sends the corresponding position factor digits contained therein to CHANNEL 2 of the ADDER.

C01 and COMP CODES switch at AND 3301 in order to set LATCH 3302 so as to generate the COMP ADD signal. This allows the 9's complement of the factor on CHANNEL 2 to be obtained and added to the factor appearing on CHANNEL 1. The COMP ADD ON signal from OR 3303 also provides an initial carry insert via AND 3601 and AND 3602 so as to set the CARRY SECOND LATCH 3603 of the ADDER at the beginning of the addition in order that 10's complement of the factor on CHANNEL 2 may be obtained. The result digits from the ADDER, which represent the difference between the mantissas and exponents of the two factors, set the ADDER OUT FIRST LATCHES 3604–3608 which in turn shortly thereafter set the ADDER OUT SECOND LATCHES 3609–3613. ARITH OP FP1 and C01 also switch at AND 401 in order to set the adder zero LATCH 402.

It is now observed that the mantissa digits of the factor in AUXILIARY REGISTER are subtracted in sequence, beginning with the lowest order significant digit, from the mantissa digits of the factor in the ARITHMETIC REGISTER which are being scanned in sequence by the FIELD RING. The digits of the difference between the two mantissas appear in succession at the ADDER output latches. At F3–2 time, which corresponds with C7–8 time, the highest order mantissa digits, which reside in positions 2 of both the AUXILIARY REGISTER and the ARITHMETIC REGISTER, are withdrawn therefrom and added together in the adder. After the mantissa digits have been compared and their difference computed, it is necessary to compare the exponent digits of both factors in order to determine their difference. Thus, it is again necessary to insure that the 10's complement of the exponent digits of the AUXILIARY FACTOR is taken in order to perform a correct subtraction operation. Therefore, FAS 1 and C8–9 switch at AND 3304 in order to generate COMP ADD ON so as to insert a carry via AND 3601 and LATCH 3603 into CHANNEL 1 of the ADDER at the time that the units exponent digits are added together, so that the 10's complement of the exponent digits on CHANNEL 2 will be obtained. If the mantissa difference is positive, then such a carry also would normally be inserted, but cannot be counted upon in every case.

The exponent difference from the ADDER is inserted into the four digit address portion of the PROGRAM REGISTER, positions 6–9, in order that it might be available during a FAS 2 RECOMP cycle. ARITH OP FP1 switches with C9–10 at AND 2301 in order to set LATCH 2302 so that the PROGRAM REGISTER positions 6–9 may shift to the right in preparation for receiving the digits of the exponent difference. Time C9–10 occurs when the first (units) digit of the exponent difference appears at the adder output LATCHES 3609–3613. Also, ARITH OP FP1 and C9–10 switch at AND 2303 in order to set LATCH 2304 so as to cause position 6 of the PROGRAM REGISTER to accept the exponent difference digits from the ADDER. Thus, the exponent difference digits from the adder each enter position 6 of the PROGRAM REGISTER in sequence and are shifted right therein until positions 6 through 9 are filled, with the exponent difference units and tens digits occupying positions 9 and 8, respectively. Inasmuch as the exponent digits of the factors in the ARITHMETIC REGISTER and the AUXILIARY REGISTER only occupy positions 0 and 1 therein, it is necessary to insert zeros in the ADDER output latches after the two digits of the exponent difference have been formed, so that a four-digit exponent difference answer might be obtained from the ADDER which will fill completely the four positions of the PROGRAM REGISTER with which we are now concerned. FAS 1 and PRG CY LAST + switch at AND 3305 to reset LATCH 3302. This allows LATCH 3614 to be reset which causes the insertion of 1B and 2B into LATCHES 3605 and 3606. Since LATCHES 2302 and 2304 remain set for two more digit times, zero digits from the ADDER may enter position 6 of the PROGRAM REGISTER.

During the time that the AUXILIARY REGISTER and the ARITHMETIC REGISTER are being scanned out to the ADDER, ACCUMULATION REGISTER 2 is also shifted right and zeros are inserted into position 0 in order that any number contained therein may be erased so that it will not interfere with the formation of a sum therein during an FAS 3 cycle. C01 and ARITH OP FP1 at AND 1901 to set LATCH 1902 so as to generate the A2 SH. RT. signal. At the same time, C01 and FAS 1 switch at AND 1903 to set LATCH 1904 so that a 1 bit and a 2 bit may be inserted into position 0 of A2. Thus, if A2 did contain any non-zero digits at the beginning of the compare operation, this shifting right and insertion of zeros into position 0 will clear out such non-zero digits and replace the contents of A2 with all zeros.

At the same time that the exponent difference is being read from the adder to the PROGRAM REGISTER, the units digit thereof must be inserted into the appropriate position of the SINGLE CORE SHIFT REGISTER for purposes later to be described. The units digit of the exponent difference appears at the ADDER OUTPUT FIRST LATCHES 3604–3608 at C9–10 time. C9–10 and FAS 1 switch at AND 2701 to generate the shift register read-in from adder signal which conditions AND gates 2702–2706 to sample the state of the adder output first latches. A translator is provided which converts the 2 out of 5 code adder designation to a pure decimal indication, and which also performs a 9's complement translation. For example, if the units digit of the exponent difference is 5, then AND gate 2712 is energized by the 2 bit and 3 bit so as to generate an output therefrom. However, the output of AND 2712 is connected to position 4 of the SCSR. The ten AND gates 2707–2716 in the translator are respectively connected to stages of the single core shift register in the manner indicated.

In order to stop many of the shifting and other operations at the end of the compare cycle, the PROGRAM CYCLE RING must be turned on as well as the FP CYCLE RING. FAS 1 and CX0 switch at AND 701 at the beginning of the cycle to force on the A FIELD END LATCH 702. When the highest exponent digit held in the arithmetic register is scanned out therefrom at F1–0 time, F1–0 switches at AND 902 with the 2 and 1 bits held in the 10's position of the FIELD REGISTER to generate the field stop match signal at OR 903. The FLD STP MATCH signal switches with the FLD RING RUN from LATCH 904, with AP, and with a signal from INVERTER 905 so as to turn on LATCH 906 to generate the field ring last signal. FLD RING LAST in turn forces on the ARITHMETIC FIELD END LATCH 703 via OR 704. The switching of ATHR FLD END, A FLD END, and ARITH CODES at AND 705 turns on the PROGRAM CYCLE LAST + LATCH 706 in the PROGRAM CYCLE RING. FLD RING LAST also causes the eventual turn-on of the FIELD RING LAST + LATCH 907 in the FIELD CYCLE RING which continues to run so as to eventually stop the operation of the FIELD RING in a manner previously described in the above-identified APPLICATION A. Furthermore, PROGRAM CYCLE LAST + causes the eventual setting of the PROGRAM CYCLE TEST, PROGRAM CYCLE STOP, and PROGRAM CYCLE STOP + LATCHES 707, 708, and 709 in the PROGRAM CYCLE RING.

FP1 and PROGRAM CYCLE STOP switch at AND 1101 in order to set LATCH 1102 which generates the FP LAST + signal in the FP CYCLE RING. The next three LATCHES 1103, 1104, and 1105 are then successively turned on. The operation of the FIELD CYCLE RING, the PROGRAM CYCLE RING, and the FP CYCLE RING cause several events to occur. PROGRAM CYCLE LAST + switches with ARITH OP FP1 at AND 1905 to turn off the A2 SHIFT RIGHT LATCH 1902, while PROGRAM CYCLE LAST + switching with FAS 1 at AND 1906 turns off the A2 zero insert LATCH 1904. The shift right of the AUXILIARY REGISTER is discontinued when FP STOP switches with NOT FP5–6 and OP FAS at AND 1606 so as to reset LATCH 1604. The ARITHMETIC REGISTER is also prevented from reading out to CHANNEL 1 upon FLD RING LAST + resetting LATCH 1309. FP STOP switching with NOT FP6–7 turns off the PROGRAM REGISTER shift right LATCH 2302, while the same two signals at AND 2305 turn off LATCH 2304. PRG CY TEST switches with FP1 at AND 604 to set LATCH 605 and thus stop operation of the PROGRAM RING.

During the FAS 1 compare cycle, it is necessary to determine both the exponent difference range, and also to determine which of the two factors held in the arithmetic register and in A1 is the larger. The determination of the larger factor will first be explained. This function, and the related function of factor interchange, is necessary since no provision is made during the subsequent FAS 3 cycle and/or FAS 4 cycle for recomplementing an adder result in case such result were to be expressed in 10's complement notation. Since such results always occur when an absolute larger number is subtracted from an absolute smaller number, the present system must insure that the absolute larger factor is held in A1 since this register is always read out to CHANNEL 1 of the ADDER during the FAS 3 and/or FAS 4 cycles. If the mantissa of the factor held in A1, which is actually being read-out from the AUXILIARY REGISTER during the compare cycle, is equal to or less than the mantissa in the ARITHMETIC REGISTER, then a carry will be generated by the addition of the two highest order mantissa digits at C8–9 time. The carry first adder output LATCH 3615 switches with FP1 and C8–9 at AND 403 in order to set the A1 LOW LATCH 404. If, however, the mantissa of A1 is greater than that in the ARITHMETIC REGISTER, no carry will be generated and so LATCH 404 will remain reset. In like fashion, if the exponent of A1 is less than or equal to the exponent in the ARITHMETIC REGISTER, a carry will be generated during the addition of the two highest order exponent digits. The added zero latch 40 during the complete compare cycle is also sampling the output of the ADDER FIRST and SECOND output latches in order to determine if any of the difference digits from either the mantissa or the exponent compare is other than zero. This latch is set at the beginning of the mantissa compare by switching of C0–1 with ARITH OP FP1 at AND 401, and also it is set at the beginning of the exponent compare time by the switching of FAS 1 and C9 at AND 405..

If the exponent difference is not zero, LATCH 402 will be reset by a signal from 1408 in the absence of both the 1 bit and 2 bit in either one of the two digits in the exponent difference. The sampling for these two bits, which represent the zero digit, occurs at both AND gates 406 and 407, both of which are necessary to insure that LATCH 402 is not falsely reset by virtue of machine timing considerations.

If the exponents of the factors in A1 and in the ARITHMETIC REGISTER are not equal, it is obvious that their relative magnitude will be the controlling factor in determining the larger of the two factors and thus whether an interchange between ARITHMETIC REGISTER and A1 should occur. FAS 1, C9 and CP switch at AND 405 in order to set the ZERO LATCH 402 at the time when the exponent digits are to be compared in the ADDER. If the exponent difference subsequently is not zero, LATCH 402 is reset. The resetting of LATCH 402 raises the output of INVERTER 409 which thereby conditions AND 410 to sample the presence or absence of a carry at the end of the exponent digit compare time. This sampling time occurs at C10–11 at FAS 1 so that if a carry is generated from the ADDER at this time, the FP INTERCHANGE LATCH 411 will be set. This only occurs when the exponent difference is not zero and a carry is generated, thus indicating that the A1 exponent is less than the exponent in the ARITHMETIC REGISTER. On the other hand, if no carry is detected during C10–11 time, the FP INTERCHANGE LATCH remains reset. This, therefore, indicates that the exponent in A1 is greater than that in the ARITHMETIC REGISTER and thus A1 contains the larger of the two factors.

If, however, the exponents in A1 and in the ARITHMETIC REGISTER are equal, then the ZERO LATCH 402 will not be reset after having been set at C9 time. Therefore, the output of inverter 409 is down so that AND 410 is no longer conditioned to sample the output carry at the end of the exponent compare time. In such a case, where both exponents are equal, it is necessary to determine the relative magnitude of the mantissas of the factors in order to determine the larger of the two factors. C8–9 switches with FP1 and the CARRY FIRST signal from the ADDER in order to detect the presence or absence of a carry at the conclusion of the mantissa compare time. The absence of a carry at this time allows A1 LOW LATCH 404 to remain reset so that no signal appears therefrom. At C11 time, at which time it is now determined that the exponent difference is zero, AND 412 switches with the ZERO LATCH, C11, CP, and A1 LOW in order to determine the relative magnitude of the mantissas in case the exponent difference is zero. Thus, if A1 LOW LATCH remains reset, this indicates that the mantissa of A1 is higher than that of the ARITHMETIC REGISTER and, thus, since the exponents are equal, the larger of the two factors already resides in A1 and no interchange is required. The FP INTERCHANGE LATCH 411 is therefore not set. Conversely, if the A1 LOW LATCH is set at C8–9 by the detection of a carry, the FP INTERCHANGE LATCH will be set at C11 time. It should be noted that the FP INTERCHANGE LATCH must be set if the mantissa in A1 is lower than the mantissa in the ARITHMETIC REGISTER, with exponents equal. However, the FP INTERCHANGE LATCH is also set if both the exponents and the mantissas are equal, although an interchange would not be required. An interchange because of this condition, though, does not result in a complement answer being generated later in the FAS 3 or FAS 4 cycles.

In order to determine the range of the exponent difference, it is necessary to examine individually the digits of the exponent difference as they are generated by the ADDER. FAS 1 and C0 switch at AND 501 to set the EXPONENT DIFFERENCE LOW LATCH 502. All other latches in this circuitry are considered to be reset at the beginning of the compare cycle, by signals not shown. The units digit of the exponent difference arrives in the ADDER OUTPUT FIRST LATCHES at C9–10 time, during the FAS 1 cycle. During this time, then, FAS 1 and C9–10 are switched at AND gates 505, 504, and 503 in order to allow the EXPONENT DIFFERENCE ZERO LATCH 506, the EXPONENT DIFFERENCE 6 OR 7 LATCH 507, and the EXPONENT DIFFERENCE HIGH UNITS LATCH 508 to sample for certain ranges of the units digit. For example, if the units digit of the exponent difference is 0, as represented by a 1 bit and 2 bit in the ADDER OUT LATCHES, then the EXPONENT DIFFERENCE ZERO LATCH 506 will be set. If the units digit is 6 or 7, then the EXPONENT DIFFERENCE 6 OR 7 LATCH 507 will be set at this time. Further, if the units digit is 8 or 9, the EXPONENT DIFFERENCE HIGH UNITS LATCH 508 will come on. The setting of the EXPONENT DIFFERENCE HIGH UNITS LATCH immediately sets the EXPONENT DIFFERENCE HIGH LATCH 509. The setting of either the EXPONENT DIFFERENCE HIGH or the EXPONENT DIFFERENCE ZERO LATCHES will reset the EXPONENT DIFFERENCE LOW LATCH 502 via OR 510.

The 10's digit of the exponent difference is next sampled by the exponent range latches at C10–11 time during the FAS 1 cycle. The following may occur. The EXPONENT DIFFERENCE ZERO signal and EXPONENT DIFFERENCE LOW signal mix together at OR 511 to generate the EXPONENT DIFFERENCE 0 through 7 signal. FAS 1 and C10–11 switch at AND 512 to generate a further signal which switches with the EXPONENT DIFFERENCE 0 THROUGH 7 signal at AND 513 to condition it to recognize a 1 in the 10's position, then the EXPONENT DIFFERENCE HIGH LATCH 509 is set, via AND 513 and OR 521, thus indicating that the range of the exponent difference is between 10 and 17, inclusive. However, FAS 1 and C10–11 also switch at AND 514 so as to condition AND gate 515 to recognize the presence of a 1 in the 10's position of the exponent difference. The latter AND gate also requires that the EXPONENT DIFFERENCE 6 and 7 LATCH 507 be set. In such a case, the EXPONENT DIFFERENCE OUT OF RANGE LATCH 516 is set via OR 517 because the range is 16 or 17. Setting of the EXPONENT DIFFERENCE OUT OF RANGE LATCH 516 resets the EXPONENT DIFFERENCE HIGH LATCH 509 so that at the end of the compare cycle, the EXPONENT DIFFERENCE HIGH LATCH cannot be on for a range of 16 or 17. Furthermore, the EXPONENT DIFFERENCE OUT OF RANGE LATCH also is set if the 10's digit is 2 or greater by virtue of the sampling AND gates 518, 519, and 520. These gates look for the presence of a 6 bit or a 3 bit in the 10's digit, or the simultaneous presence of a 2 bit and 0 bit. Any one of these three indications signifies that the 10's digit is 2 or greater, which would then make the exponent difference range 20 or greater. Furthermore, if LATCH 508 had been previously set, the detection of a 1 digit in the 10's position also causes AND 522 to set LATCH 516. Conversely, if the 10's digit is a 0, then none of the latches are set or reset during this C10–11 time. Therefore, the exponent difference range would be determined merely by the value of the units digit. Thus, it is seen that at the end of C10–11 time in the FAS 1 cycle, only one of the four LATCHES 502, 509, 516 and 506 remains set, thus indicating the exponent difference range.

If the exponent in A1 is larger than the exponent in the ARITHMETIC REGISTER, its subtraction from the ARITHMETIC REGISTER exponent will result in a 10's complement difference being generated by the ADDER. In such a case, the exponent difference range latches will not give a correct indication of the true exponent difference since they are not equipped to distinguish between true and complement difference numbers. In the present embodiment, it is therefore necessary to recomplement the exponent difference so that the exponent difference range latches may operate on a true difference number. In order to determine whether a recomplementing operation is required, the presence or absence of a carry at the end of the exponent compare time is detected by the FP RECOMP latch 413. As mentioned previously, a carry resulting from the addition of the two highest order exponent digits indicates that the exponent in A1 is equal to or less than the exponent in the ARITHMETIC REGISTER, which would therefore result in a true difference being generated by the adder. However, the absence of a carry at this time indicates that the A1 exponent is larger than the ARITHMETIC REGISTER exponent which results in a complement difference being generated by the ADDER. FAS 1 and C10–11 switch at AND 414 to sample the signal from the NO CARRY FIRST ADDER OUTPUT LATCH 3616 and if such is present, then the FP RECOMP LATCH 413 is set. The setting of the FP RECOMP LATCH insures the resetting of the EXPONENT DIFFERENCE OUT OF RANGE LATCH 516, the EXPONENT DIFFERENCE HIGH LATCH 509, the EXPONENT DIFFERENCE 6 OR 7 LATCH 507, and LATCH 508 by means of AND gates 523 and 524 there shown. The EXPONENT DIFFERENCE ZERO LATCH 506 is not reset since it is impossible to set the FP RECOMP LATCH if the exponent difference is zero, inasmuch as a carry would have resulted from the addition of the high order exponent digits. The setting of the FP RECOMP LATCH causes the FAS 2 cycle to be subsequently performed.

The following Table II shows how the settings of the INTERCHANGE and RECOMP LATCHES are governed in accordance with the relative magnitudes of the A1 and ARITHMETIC REGISTER exponents and mantissas:

*Table II*

| Exponents | Mantissas | Interchange | Recomp. |
|---|---|---|---|
| 1. A1>Arith R. | | No. | Yes. |
| 2. A1<Arith R. | | Yes. | No. |
| 3. A1=Arith R. | A1>Arith R. | No. | No. |
| 4. A1=Arith R. | A1<Arith R. | Yes. | No. |
| 5. A1=Arigh R. | A1=Arith R. | Yes. | No. |

If the FP INTERCHANGE LATCH 411 is set on at the end of the compare cycle as above described, it is necessary to effectively interchange the factors now held in the arithmetic register and A1. FP INTERCHANGE, FAS 1, and FP LAST + switch at AND 1202 to read out the arithmetic register positions S, 0 through 9 to the ARITHMETIC BUS (AB). FAS 1, FP LAST +, and FP INTERCHANGE also switch at AND 1803 in order to allow A1 to read-in this factor, including sign, from the ARITHMETIC BUS. Although the factor formerly held by A1 has now been replaced by the factor from the ARITHMETIC REGISTER, it must be remembered that the A1 factor at the beginning of the compare cycle is transferred down to A3 where it has been preserved. Subsequent to the transfer of the factor from the ARITHMETIC REGISTER to A1, FAS 1, FP STOP, and FP INTERCHANGE switch at AND 2003 to generate the A3 AB RO signal which transfers the factor from A3 to the ARITHMETIC BUS. FP STOP and FP INTERCHANGE now switch at AND 1203 to set LATCH 1204 which reads in from the ARITHMETIC BUS this factor to the ARITHMETIC REGISTER. The interchange of factors between the ARITHMETIC REGISTER and A1 is now completed.

It is also necessary to change the sign indication in the sign analysis circuits if interchange has taken place. This is accomplished by switching FP LAST +, FAS 1, and FP INTERCHANGE at AND 3209 to allow the OP SIGN LATCHES 3202 and 3203 to sample the ARITHMETIC BUS sign position at the time when the ARITHMETIC REGISTER has read-out its factor thereto. In like fashion, FP STOP and FP INTERCHANGE switch at AND 3210 to allow the ADDRESS SIGN LATCHES 3207 and 3208 to sample the sign of the factor being transferred from A3 to the ARITHMETIC REGISTER while it is on the ARITHMETIC BUS. These latches are reset prior to the insertion of these new signs by the switching of FP INTERCHANGE and PROGRAM CYCLE STOP at AND 3211. Further in connection with the sign control circuits, a check is performed at FP LAST + time to determine if either of the two factor signs is an alphabetic sign. FP LAST + and FAS 1 switch at AND 3212 to detect the presence of an alpha sign, represented by the setting of either LATCHES 3213 or 3214. Since floating point add subtract is concerned exclusively with a numerical operation, the presence of an alpha sign in either one of the factors sets LATCH 3215 which turns on an error light on the operator's console.

One other operation is performed during PROGRAM CYCLE STOP time of the FAS 1 cycle. This is a transfer of the digit indication of the SINGLE CORE SHIFT REGISTER into a set of SHIFT REGISTER OUTPUT LATCHES 2801–2805. FAS 1 and PROGRAM CYCLE STOP switch at AND 2601 to generate the SHIFT REGISTER PARALLEL READ-OUT to OUTPUT LATCH signal which causes the marker representing the units digit of the exponent difference previously placed in the SCSR from the ADDER to be read therefrom onto translation buses 2806 which place the 9's complement of the SCSR indication into the output latches 2801–2805 in the 2 out of 5 code. For example, if position 2 of the SCSR had been set due to a 7 units digit in the exponent difference, it is read-out at PROGRAM CYCLE STOP time to the translator buses 2806 and causes a 6 bit and a 1 bit to be placed into the shift register output LATCHES 2805 and 2802. Since a 6 bit and a 1 bit represent a decimal 7, it is seen that a 9's complement operation has occurred with respect to the position number set in the SINGLE CORE SHIFT REGISTER. This operation is performed automatically during the FAS 1 cycle so that if no recomplementing of the exponent difference is required and if the exponent difference is in range, the beginning of the FAS 3 or FAS 4 cycle will find the FIELD REGISTER to be correctly set up as will subsequently be described. The SH REG PAR RO TO OL from OR 2602, besides allowing the SCSR to readout, also blanks that register via INVERTER 2603 so that the marker is effectively erased from the SCSR.

The FIELD REGISTER 10's and units positions are now set for the FAS 3 ADD TO A2 operation in the event that either the EXPONENT DIFFERENCE HIGH or EXPONENT DIFFERENCE LOW LATCHES 509, 502 is on, or they are set for the ADD TO A1 FAS 3 operation in the event that the EXPONENT DIFFERENCE ZERO LATCH 506 is set. The FIELD REGISTER LATCHES will also be set at the end of the FAS 2 operation if such a cycle occurs, however, they are presently set at the end of the FAS 1 operation since the FAS 2 operation may not occur.

The following Table III indicates the digits that must be forced into the FIELD REGISTER 10's and units positions for particular exponent difference values, which are determined by the digit held in the LATCHES 2801–2805 together with the condition of the exponent range LATCHES 502, 508, 516, and 506.

*Table III*

| Exp. Diff. | 10's | Units | Exp. Diff. | 10's | Units |
|---|---|---|---|---|---|
| 0 | 2 | 9 | 8 | 2 | 9 |
| 1 | 9 | 9 | 9 | 2 | 8 |
| 2 | 8 | 9 | 10 | 2 | 7 |
| 3 | 7 | 9 | 11 | 2 | 6 |
| 4 | 6 | 9 | 12 | 2 | 5 |
| 5 | 5 | 9 | 13 | 2 | 4 |
| 6 | 4 | 9 | 14 | 2 | 3 |
| 7 | 3 | 9 | 15 | 2 | 2 |

The above functions are accomplished as follows. In the event that the EXPONENT DIFFERENCE ZERO LATCH 506 is on, FAS 1, PROGRAM CYCLE STOP +, and EXPONENT DIFFERENCE ZERO switch together at AND gates 3005 and 3006 to insert a digit 9 (3B and 6B) into the units position latches 2219–2223 of the FIELD REGISTER and a digit 2 (2B and 0B) into the 10's position latches 2214–2218 of the FIELD REGISTER, via OR gates 3101, 3102, 3103 and 3104. Such a setting will allow the FIELD RING to scan the ARITHMETIC REGISTER during the FAS 4 ADD TO A1 cycle so as to transmit the entire mantissa of the factor held in the ARITHMETIC REGISTER beginning with position 9 and ending with position 2. If, however, the EXPONENT DIFFERENCE LOW LATCH 502 has been set at the end of the FAS 1 cycle, indicating a range of 1 through 7, EXPONENT DIFFERENCE LOW, PROGRAM CYCLE STOP +, and FAS 1 switch at AND 3007 to also force a digit 9 into the units position of the FIELD REGISTER. FAS 1 and EXPONENT DIFFERENCE LOW also switch at AND 3102 to condition AND gates 2901–2907 in the decimal translator of FIGURE 29 to obtain the 10's complement of the number contained in the shift register output LATCHES 2801–2805. FAS 1, EXPONENT DIFFERENCE LOW, and PROGRAM CYCLE STOP switch at AND 3103 in order to insert this 10's complement number via AND gates 3105–3109 into the 10's position of the field register. This setting of the FIELD REGISTER for the EXPONENT DIFFERENCE LOW indication will result in the FIELD RING withdrawing factor digits during the FAS 3 cycle beginning with position 9 of the ARITHMETIC REGISTER and ending with the position indicated by the digit held in the 10's position of the FIELD REGISTER, which will effectively accomplish the necessary right shift of the ARITHMETIC REGISTER MANTISSA a number of places according to the exponent difference.

Assuming that only the EXPONENT DIFFERENCE HIGH LATCH 509 is set, the switching of FAS 1, PROGRAM CYCLE STOP + and EXPONENT DIFFERENCE HIGH at AND 3008 inserts a 0 bit and 2 bit (digit 2) into the 10's position of the FIELD REGISTER. At approximately the same time, EXPONENT DIFFERENCE HIGH signal conditions AND gates 2908–2915 in the decimal translator to provide the 7's complement of the number in the SHIFT REGISTER OUTPUT LATCHES, while FAS 1, EXPONENT DIFFERENCE HIGH, and PROGRAM CYCLE STOP + switch at AND 3104 to transfer this number via AND gates 3110–3114 to the units position of the FIELD REGISTER. The setting of the field register under such conditions insures that during the ADD to A2 FAS 3 cycle, only those factor digits in the ARITHMETIC REGISTER which will actually contribute to the double precision result of 16 digits will be withdrawn from the ARITHMETIC REGISTER.

At the end of the FAS 1 compare cycle, it is now necessary to advance the FLOATING POINT RING in order to initiate another one of the previously described seven floating point cycles. ARITH OP FP1, FP LAST + and NO END FP switch at AND 1005 to set FP1–2 LATCH 1006 in the FLOATING POINT ring. No FP END signal is present because there are presently no conditions which would set the FP END LATCH 1006 whose output drives the INVERTER 1006 generating the NO FP END signal. FP TEST switches at AND 1008 with the output from INVERTER 1009 to rest the FP1 LATCH 1002. INVERTER 1009 output is up if either or both FP RECOMP or EXPONENT DIFFERENCE OUT OF RANGE are absent. The output of AND 1010 will always be down at the end of FAS 1 since if the FP RECOMP is on, it will have reset the EXPONENT DIFFERENCE OUT OF RANGE LATCH 516 prior to the generation of the FP TEST signal. Upon FP1 being reset, FP1–2 switches with its reset output signal at AND 1011 to generate the FP1 ADV signal.

The resetting of FP1 also terminates the FAS 1 signal. In the event that the EXPONENT DIFFERENCE OUT OF RANGE signal or the FP RECOMP signal is present, the FP1 ADVANCE signal will switch at AND 1012 or at AND 1013, respectively, to set the FP2 LATCH 1014 and so generate the FP2 output signal. In the event that neither the FP RECOMP LATCH, the EXPONENT DIFFERENCE OUT OF RANGE LATCH, or the EXPONENT DIFFERENCE ZERO LATCH are set, then the signals NO FP RECOMP and EXPONENT DIFFERENCE NON-ZERO signal switch with FP1 ADV at AND 1015 to set FP3 latch 1016, thereby skipping the FAS 2 cycle. The EXPONENT DIFFERENCE NON-ZERO SIGNAL is generated by OR 523 which receives inputs from the EXPONENT DIFFERENCE LOW LATCH and the EXPONENT DIFFERENCE HIGH LATCH. Further, if the exponent difference is zero, and no recomplementing is required, the FP1 advance signal switches with OP FAS, EXPONENT DIFFERENCE ZERO, and NO FP RECOMP at AND 1017 to set FP4 LATCH 1018, thereby skipping both the FAS 2 and FAS 3 cycles. After one of the FP2, FP3, or FP4 LATCHES is set, F1–2 is reset by the C1–2 pulse of the next following cycle.

FAS 2—RECOMPLEMENT AND/OR SIGN CHANGE

The first assumption to be made in considering the FAS 2 cycle is that the exponent in A1 is larger than the exponent in the ARITHMETIC REGISTER, but that the true exponent difference is within range, i.e., 00 through 15. Because the larger exponent in A1 is subtracted from the smaller exponent in the 10's complement form so that the FP RECOMP LATCH 413 has been set at the end of the FAS 1 cycle. Furthermore, this 10's complement different is greater than 15 and so the EXPONENT DIFFERENCES OUT OF RANGE LATCH 516 has also been set at the end of FAS 1 cycle. However, upon the FP RECOMP latch being set, the EXPONENT DIFFERENCE OUT OF RANGE LATCH is reset which thus allows the resetting of the FP1 LATCH 1002 as previously described. Since FP1 ADVANCE switches with FP RECOMP at AND 1013, the FP2 LATCH 1014 is set. Although the EXPONENT DIFFERENCE OUT OF RANGE LATCH had been turned on during the compare cycle, it is not certain that the true exponent difference is out of range, since there are many situations where the 10's complement of a true in-range difference results in an exponent difference out of range indication. Therefore, it is necessary during the FAS 2 cycle to recomplement this exponent difference and apply same to the exponent range latches.

FP2 switches with OP FAS at AND 1019 to generate the FAS 2 signal. FP STOP (generated at the end of the FAS 1 cycle) switches with NO FP END at AND 606 to set LATCH 607 which initiates the operation of the PROGRAM RING and generate a series of C pulses. Since the exponent difference is now stored in the address positions 6–9 of the PROGRAM REGISTER, it may be read out of the complementing circuitry of CHANNEL 2 of the ADDER where the 10's complement will be taken thereof in order to obtain the true exponent difference. CX switches with FP RECOMP at AND 2401 to set LATCH 2402 which will cause a digit from position 9 of the PROGRAM REGISTER to be directed to the CHANNEL 2 of the ADDER via AND gates 2403–2407. At the same time, FAS 1–2, FP RECOMP, and FP STOP switch at AND 2306 to set LATCH 2302 so as to initiate the right shift of the PROGRAM REGISTER digits in positions 6 to 9 which will successively present the exponent difference digits therein to the output LATCHES 2408–2412 and from there to CHANNEL 2 of the adder. FAS 2 also switches with CS–0 at AND 2307 to set the PROGRAM REGISTER READ-IN FROM ADDER LATCH 2304 so as to allow the true difference from the adder to be read back into the PROGRAM REGISTER via AND gates 2308–2312. FP RECOMP, FP STOP, FP2, and OP FAS switch at AND 3306 to set the COMP ADD LATCH 3302 which will thus cause the 9's complement being obtained of each exponent difference digit appearing on CHANNEL 2 to the ADDER. The COMP ADD ON signal from OR 3303 will automatically cause a carry insert to be applied to CHANNEL 1 of the adder via AND 3601 and the CARRY SECOND LATCH 3603 during the first digit add time so as to result in the 10's complement being taken of the first exponent difference digit and thus of the number of CHANNEL 2. FAS 1–2, FP RECOMP, and FP STOP switch at AND 3401 to set LATCH 3402 so as to cause zeros to be inserted on CHANNEL 1 of the adder which will be added to the 10's complement of the number now appearing in CHANNEL 2.

FAS 2, C0, and NO EXPONENT DIFFERENCE OUT OF RANGE switch at AND 524 to set the EXPONENT DIFFERENCE LOW LATCH 502. All other latches in the exponent range circuitry have presumably been reset at the end of the FAS 1 cycle by the FP RECOMP signal. Thus, the units digit of the true exponent difference now appearing at the output of the ADDER during FAS 2 time and the 10's digit of this true difference must be sequentially sampled by the exponent range latches in order to again determine the exponent difference range as was done during the FAS 1 cycle. FAS 2 switches with CX–0 at AND gates 526, 527, and 528 in order to allow the EXPONENT DIFFERENCE ZERO LATCH, EXPONENT DIFFERENCE HIGH UNITS LATCH, or the EXPONENT DIFFERENCE 6 OR 7 LATCH to determine the range of the units digit. The operation of these latches at the units digit sample time of CX–0 in the FAS 2 cycle is similar to their operation during the C9–10 time in the FAS 1 cycle. At C01-time in the FAS 2 cycle, the 10's digit of the now true exponent difference is stored in the ADDER OUT LATCHES and detected by AND gates 525, 529, which will eventually result in only one of the exponent difference range latches being set as was previously described in connection with the FAS 1 operation. The set condition of the exponent difference range latches now truly indicates the magnitude range of the exponent difference so that it may now be determined the successive floating point cycles to be initiated, if any.

The units digit of the true exponent difference appearing at the output of the adder during the FAS 2 cycle is also transferred to the SINGLE CORE SHIFT REGISTER as was done during FAS 1. FAS 2 and CX–0 switch at AND 2717 to direct the units digit of the exponent difference to the translator wherein the 9's complement is taken thereof and used to bring up one of the ten output lines leading to the respective stages of the SINGLE CORE SHIFT REGISTER. Thus, a position of the SCSR will be set whose number corresponds to the 9's complement of the units digit emerging from the ADDER. The position set in the SINGLE CORE SHIFT REGISTER will again be used in conjunction with the exponent difference range latches in order to determine the FIELD REGISTER settings. C1–2 subsequently switches with FAS 2 at AND 2604 to set the SH REG OUTPUT LATCHES 2801–2805 in accordance with the 9's complement of the set SCSR position, and also to clear that position via INVERTER 2603.

FAS 2 switches with CX–0 at AND 3115 to reset the FIELD REGISTER stages of the PROGRAM REGISTER preparatory to resetting them in accordance with the true exponent difference range which has now been determined by the recomplementing operation during FAS 2. Assuming that the true exponent difference is discovered to be low, i.e., that is, between 1 and 7, inclusive, the operation of ADD TO A2 will be performed during the FAS 3 cycle wherein a number of factor digits equal to the exponent difference will be withdrawn from the ARITHMETIC REGISTER beginning with the position 9 and add (or subtracted) to zeros with the result being contained in the higher order stages of A2. The transfer of the appropriate number of digits is accomplished under control of the FIELD RING whose starting and stopping positions are governed by the settings of the FIELD REGISTER. Therefore, a similar operation occurs during FAS 2 with regard to the setting of the FIELD REGISTERS as occurred during the end of FAS 1, previously described. Table II may again be consulted. Also, the condition of exponent difference high causes the same kind of field register setting as previously described. No detailed description need therefore be given of this particular operation, except to note that AND gate 3009, 3010, 3116, 3117, and 3118 conditioned at the appropriate times during the FAS 2 cycle.

FAS 2 and C2 now switch at AND 1106 to start the FP CYCLE RING by setting the FP LAST + LATCH 1102. This ring will continue to run until FP STOP + LATCH has been set and reset. During the FAS 2 cycle, however, PROGRAM CYCLE RING operation is not initiated. Under the present assumption that the exponent difference is within range, the FP2–3 LATCH 1020 in the FLOATING POINT RING is set by the switching of NO EXPONENT DIFFERENCE OUT OR RANGE, C1–2, and FP2 at AND 1021. In like fashion, FP TEST switches with the up signal from INVERTER 1009 at AND 1008 to reset FP2 and thus generate the FP2 ADVANCE signal from AND 1022. FP2 ADVANCE switches with EXPONENT DIFFERENCE NON-ZERO at AND 1023 to set FP3. In turn, FP3 switches with OP FAS at AND 1024 in order to generate FAS 3. FP STOP switches with NO FLOATING POINT END at AND 606 to start the PROGRAM RING for a new cycle which will commence during FAS 3 time, the program ring having previously been stopped by the presence of FP TEST which set PROGRAM RING STOP LATCH 605.

A brief description of the sign control operation during FAS 2 now follows. It must be observed that the mere placing of the larger factor (according to absolute value only) into A1 does not insure that the sign of the A1 factor is the correct sign of the result. This is because the factor from MEMORY, originally placed in the ARITHMETIC REGISTER, is always considered to be added or subtracted (according to the OP sign) from the factor originally held in A1. If interchange occurs, the original A1 factor is transferred to the ARITHMETIC REGISTER where it is always read out to ADDER CHANNEL 2 during the FAS 3 and FAS 4 cycles. If sign analysis calls for a COMPLEMENT ADD operation, then the original A1 factor is subtracted from the original MEMORY factor which is, after interchange, stored in A1. Although a true result will be obtained, the sign of the result is always that of the original A1 factor now stored in the ARITHMETIC REGISTER, and not that of the MEMORY factor stored in A1. Therefore, an opportunity is provided during the FAS 2 cycle to adjust the sign of A1 to that of the ARITHMETIC REGISTER if the latter sign is that of the result. In case FAS 2 cycle is not performed, the same sign adjust operation occurs during FAS 6. However, in the event that FAS 2 is the last FP cycle to be performed, then the A1 factor, representing the correct absolute value of the result, will also have the correct sign.

During FAS 1, an FP INTERCHANGE signal will set LATCH 3216. If an OP FS signal is also being generated, due to the presence of a minus instruction sign, then AND gate 3217 is up so as to only condition AND gates 3218 and 3219. The inputs to these gates are respectively associated with the OP A sign + latch 3204 and OP A SIGN − latch 3205, while their outputs are respectively associated with FAS SIGNS MINUS and FAS SIGNS PLUS. It can therefore be seen that, upon the two conditions of interchange and OFS being present, the FAS SIGN indications will be reversed from the indications of the OP A LATCHES 3204 and 3205. With either condition absent, however, FAS SIGNS are the same as the OP A signs.

FAS 2 and Cϕ–1 switch at AND 1205 to set LATCH 1206 which generates a SIGN CHANGE GATE signal. Thus signal allows the FAS sign indication from FIGURE 32 to be inserted into the ARITHMETIC REGISTER sign position via AND gates 1207, 1208, and 1209. These latter AND gages sample AND gates 1210 and 1211 for the FAS SIGNS indication during FAS 2. Next, FAS 2 and C1–2 switch at AND 1212 to read out all positions of the ARITHMETIC REGISTER to AB.

At the same times during FAS 2, C1 and FAS 2 switch at AND 1804 to generate FP SIGN ADJUST. This sets LATCH 1805 whose output switches with FAS 2 at AND 1806. The output of AND 1806 clears the sign position of A1 via INVERTER 1807. LATCH 1805 also turns on LATCH 1808 which subsequently allows A1 to read in only the sign from the AB. The sign on AB at this time is the sign of the ARITHMETIC REGISTER which has been forced accordingg to the FAS SIGNS signals.

For the purposes of continuing the description of the operation during FAS 2 cycle, it will now be assumed that upon recomplementing it is discovered that the true exponent difference is actually out of range. This results in the EXPONENT DIFFERENCE OUT OF RANGE LATCH 516 being set at C0–1 time of the FAS 2 cycle which in turn will reset all others. In such a case, it is not now necessary to step through the FAS 3–FAS 7 cycles of the floating point operation, inasmuch as the sum digits resulting from the addition of the ARITHMETIC REGISTER factor would be lost because of the limited 16-digit sum capacity of the A1 and A2 registers. Although a borrow condition would effect the sum digits held in A1, this is neglected in the present embodiment. Therefore, upon detecting a true exponent difference out of range during the recomplementing operation of the FAS 2 cycle, steps are taken to terminate the floating point operation at the end of the FAS 2 cycle so as to prevent the initiation of further FAS cycles. The procedure is as follows. Although the FIELD REGISTER latches will be reset during the beginning of the FAS 2 cycle as previously described, no digits will be inserted into the units and 10's positions under control of the shift register output latches, inasmuch as neither the EXPONENT DIFFERENCE HIGH nor the EXPONENT DIFFERENCE LOW LATCHES are set. The FP CYCLE ring is also forced on at C2 time of the FAS 2 cycle with the FP TEST signal setting on the PROGRAM RING STOP LATCH 605, thus inhibiting the operation of the PROGRAM RING. However, in the FLOATING POINT RING, FP2–3 LATCH 1020 cannot be set inasmuch as the NO EXPONENT DIFFERENCE OUT OF RANGE signal at AND gate 1021 is now absent by C1–2 time. Furthermore, inasmuch as both the FP RECOMP LATCH and the EXPONENT DIFFERENCE OUT OF RANGE LATCH are now set by the FP TEST time of the FAS 2 cycle, AND gate 1010 is up so as to prevent a reset pulse from being applied to the FP2 latch via AND 1008. FP STOP switches with no FP END at AND 606 to recycle the PROGRAM RING.

It is therefore observed that the PROGRAM RING begins to recycle for the second time with the FAS 2 signal still remaining. All PROGRAM RING C times referred to henceforth now occur during the second cycling of the program ring while the FAS 2 signal remains on. EXPONENT DIFFERENCE OUT OF RANGE switches with CX at AND 415 to reset the FP RECOMP LATCH 413. FAS 2 again switches with CX0 at AND 3115 to reset the FIELD REGISTER. FAS 2, C2, and EXPONENT DIFFERENCE OUT OF RANGE switch at AND 3011 to insert a 1 bit and 2 bit into both the 10's and units positions of the field register. EXPONENT DIFFERENCE OUT OF RANGE, NO FP RECOMP, and C1 switch at AND 1025 to set the FP END LATCH 1006. C2 again switches with FAS 2 at AND 1106 to start the FP CYCLE RING which eventually turns on the FP TEST LATCH 1103. FP TEST sets the PROGRAM RING STOP LATCH 605 and thus stops the PROGRAM RING for the second time. In the FLOATING POINT RING, FP2–3 LATCH 1020 still fails to be set at C1–2. However, because the FP RECOMP LATCH is now reset, AND gate 1010 is now down so that FP TEST switches at AND 1008 to reset the FP2 LATCH. This terminates the FAS 2 cycle signal. C2–3 switches with NO FP RECOMP and EXPONENT DIFFERENCE OUT OF RANGE at AND 1026 to generate the END DATA OPERATION signal which thus indicates to the control circuitry that the floating point operation for the particular instruction contained in the PROGRAM REGISTER has now terminated, and a new instruction cycle may be initiated. The EDO signal is also applied to reset the EXPONENT DIFFERENCE OUT OF RANGE LATCH 516.

When a true exponent difference out of range is detected, it is also necessary to force the sign of A2 to a plus indication, and insure that A2 positions 0–9 are filled with zeros. FAS 2, CX–0, and EXPONENT DIFF OUT OF RANGE switch at AND 1213 to generate the SIGN change gate for the ARITHMETIC REGISTER. At the same time, these three signals switch at AND 1214 to force a 6B and 3B via AND gates 1209 and 1208 into the ARITHMETIC REGISTER sign position. EX- PONENT DIFF OUT OF RANGE, NO FP RECOMP, and CX effectively switch at AND 1401 to allow the ZERO INSERT LATCHES 1402–1411 (all of which have been set at CX time) to insert zero digits into positions 0–9 of the ARITHMETIC REGISTER. Subsequently, Cφ–1, NO FP RECOMP, and EXPONENT DIFF OUT OF RANGE switch at AND 1215 to readout the complete ARITHMETIC REGISTER to AB. These same three signals also switch at AND 1907 to allow A2 to readin the plus sign and zero digits from AB.

To continue with the description of the FAS 2 operation, it is now necessary to return briefly to the FAS 1 operation previously described. It is now assumed that during the FAS 1 operation, a true difference is generated by the ADDER which results in the EXPONENT DIFFERENCE OUT OF RANGE LATCH being set. In such a situation, the FP RECOMP LATCH 413 is not set inasmuch as the true difference of the exponents has been obtained. As previously mentioned, whenever the true exponent difference is out of range, there is no need to continue with the FAS 3 to FAS 7 cycles. However, it is convenient to terminate the floating point operation by stepping to the FAS 2 cycle where certain housekeeping operations, such as forcing A2 to plus zeros and possible A1 sign change, may be accomplished such as have been previously described. Therefore, it is noted that the FP2 latch is set by switching of the FP1 ADVANCE signal with EXPONENT DIFFERENCE OUT OF RANGE at AND 1012. During this type of FAS 2 cycle, the PROGRAM RING will run only once inasmuch as EXPONENT DIFFERENCE OUT OF RANGE together with C1 and NO FP RECOMP switch at AND 1025 to set FP END LATCH 1006. The absence of NO FP END at AND 606 prevents subsequent recycling of the PROGRAM RING. At C2–3 time, an END DATA OP signal is generated which resets the EXPONENT DIFFERENCE OUT OF RANGE LATCH, and thus terminates the floating point operation so that a new instruction cycle may begin.

FAS 3 CYCLE (ADD TO A2)

In the event that the true exponent difference falls between 1 and 15, inclusive, an FAS 3 cycle will be initiated during which time one or more of the digits of the ARITHMETIC REGISTER factor will be added to zeros and the results therefrom placed in positions of ACCUMULATOR REGISTER 2. This operation is equivalent to shifting the smaller number, which is that now contained in the ARITHMETIC REGISTER, to the right with respect to the A1 factor a number of positions equal to the exponent difference. It has already been discussed how the FP3 LATCH 1016 is set from either the FP1 or the FP2 operation. The FAS 3 signal forces on the signals SET ADD SUBT, OP ADD SUBT, ARITHMETIC CODES, and OP A2 via OR gates 204, 205, 203 and LATCH 206, respectively. PROGRAM RING operation is initiated by FP STOP switching with no FP END at AND 606 so as to set CX LATCH 602. FP STOP is generated either at the end of the FAS 1 operation or at the end of the FAS 2 operation as previously described. FAS 3 and CX–0 switch at AND 1809 to readout the factor in A1 to the ARITHMETIC BUS. These two signals also switch at AND 2004 to set LATCH 2002 so that ACCUMULATOR 3 subsequently reads in this factor from the ARITHMETIC BUS. The transfer from A1 to A3 is here made in order to preserve the exponent of the larger factor which is contained in A1 by the end of the FAS 1 operation. This larger factor will be used during the FAS 6 operation in order to update the exponent of the sum digits then held in A1.

It is now necessary to withdraw the digits from the ARITHMETIC REGISTER beginning with position 9 and direct them to CHANNEL 2 of the ADDER at which time they will be either added to or subtracted from a series of zero digits appearing on channel 1. As previously described, the number of digits withdrawn from the ARITHMETIC REGISTER depends upon the digits held in the FIELD REGISTER which in turn depend upon the exponent difference previously obtained. ARITH CODES and C0 switch at AND 901 to generate a FIELD RING START PULSE which initiates the FIELD RING operation at a latch governed by the setting of the units position of the FIELD REGISTER. For an FAS 3 operation, the units position of the FIELD REGISTER has always been forced to a digit 9 in accordance with the circuitry explained previously. Therefore, FI–9 LATCH 802 of the FIELD RING is first set and allows AND gates 1301—1302 to sample position 9 of the ARITHMETIC REGISTER for the factor digit there contained. FAS 3 switches with C01 at AND 1315 to set LATCH 1316 so that the factor digits in the ARITHMETIC REGISTER will be read out to CHANNEL 2 of the ADDER. The sign analysis control circuitry of FIGURE 32 is also examined at this time in order to determine whether a TRUE ADD or a COMPLEMENT ADD operation should take place. The signs of the ARITHMETIC REGISTER factor and A1 factor are held in the ADDRESS SIGN and OP A SIGN LATCHES 3207, 3208, 3204, 3205, respectively while the sign of the instruction (OP sign) is sampled from the sign position of the PROGRAM REGISTER. The following Table IV indicates the operation to be followed when considering both the signs of the factors and the sign of the operation (instruction).

*Table IV*

| Arith. Factor | A1 Factor | Instruction | True Add | Comp. Add |
|---|---|---|---|---|
| + | + | + | Yes | -------- |
| + | + | − | -------- | Yes |
| − | − | + | Yes | -------- |
| − | − | − | -------- | Yes |
| + | − | + | -------- | Yes |
| + | − | − | Yes | -------- |
| − | + | + | -------- | Yes |
| − | + | − | Yes | -------- |

The above analysis is accomplished by means of AND gates 3220–3227 and OR gates 3228, 3229. In the event that both factor signs are equal, either AND 3220 or AND 3221 will be energized so that the TRUE ADD or COMPLEMENT ADD function depends upon the sign of the instruction, OP+ or OP−. Conversely, if signs of factors are unequal, then either AND 3222 or AND 3223 will be conditioned so that the final TRUE ADD or COMPLEMENT ADD operation is again determined by the sign of the instruction. Since the interchange operation during FAS 1 has insured that the larger factor is always in A1 by the beginning of FAS 3, there is never any need for a recomplementing operating during FAS 3 or FAS 4 cycle in order to obtain a true result. SIGNS TRUE ADD or SIGNS COMPLEMENT ADD may only be generated at the outputs of AND gates 3230 and 3231 upon the presence of OP ADD SUBT. They switch together with Cφ–1 at AND gates 3307 and 3308, respectively, so as to either set the COMPLEMENT ADD LATCH 3302 or the TRUE ADD LATCH 3309. Setting of the COMPLEMENT ADD LATCH automatically insures the insertion of an input carry during the first digit add time via AND 3601 so that the number appearing on CHANNEL 2, which is 9's complemented by the CHANNEL 2 gates, actually is transformed into the 10's complement. FAS 3 and C01 also switch at AND 3403 to set the CHANNEL 1 ZERO INSERT LATCH 3402 which provides zero digits on CHANNEL 1 to which the factor digits on CHANNEL 2 are to be added.

The sum digits resulting from the TRUE ADD or COMP ADD operation in FAS 3 will be successively inserted into position 0 of the A2 register and shifted toward the low order position 9 until the addition process ceases. FAS 3 switches with C1–2 at AND 1908 to set LATCH 1902 so as to allow digits contained in positions 0 through 9 of the A2 register to shift right. At the same time, these two signals switch at AND 1909 to set LATCH 1910, whose output in conjunction with LATCH 1902 conditions AND 1911 to allow position 0 of A2 to accept the sum digits from the ADDER OUTPUT FIRST LATCHES. This process continues at least until all of the ARITHMETIC FACTOR digits to be processed during the FAS 3 cycle have been directed to the CHANNEL 2 of the ADDER and added to the zeros now appearing in CHANNEL 1.

As previously mentioned, the withdrawal of digits from the ARITHMETIC REGISTER is under control of the FIELD RING which, when initiated, steps from position to position until a match is obtained with the digit held in the 10's position of the FIELD REGISTER. At this time a FIELD STOP MATCH signal is generated from one of the AND gates 902, 908–916 via OR 903 to set the FIELD RING LAST LATCH 906 and thus initiate termination of the FIELD RING operation. Operation of the FIELD CYCLE RING will terminate the FIELD RING operation as described in the above-identified APPLICATION A and FIELD RING LAST + switching with AP resets the ARITHMETIC REGISTER READ-OUT TO CHANNEL 2 LATCH 1316 so that no unspecified factor digits therein may be sent to the ADDER. FIELD RING LAST via OR 704 also sets the ARITHMETIC FIELD END LATCH 703; ARITHMETIC FIELD END SWITCHES with FAS 3 and OP FAS at AND 710 to set PROGRAM CYCLE LAST + in the PROGRAM CYCLE RING. When the PROGRAM CYCLE RING is once initiated, it will continue until PROGRAM CYCLE STOP + LATCH 709 has been set and reset. The exact time that the A2 register ceases shifting right and reading in from the ADDER depends upon the exponent difference range, i.e., whether the range is low (1–7) or high (8–15). Assume first that the exponent difference range is low so that the EXPONENT DIFFERENCE LOW LATCH 502 is set. In such a case, all sum digits resulting from the addition of the ARITHMETIC REGISTER factor digits must occupy the high order positions of A2 so that the most significant digit of this sum rests in position 0, with zeros occupying the low order positions of A2 to the right of the sum digit intially generated by the ADDER during this FAS 3 cycle. To perform this function, the SHIFT RIGHT operation of A2 and read-in from the ADDER must cease as soon as the most significant sum digit is placed into position 0 of A2. The setting of PROGRAM CYCLE LAST + LATCH 706 indicates the time when the FIELD RING has withdrawn the last ARITHMETIC REGISTER factor digit to be considered during FAS 3 cycle. Subsequently, the PROGRAM CYCLE STOP LATCH 708 is set and switches with FP3–4 and EXPONENT DIFFERENCE LOW at AND 1912 to reset LATCHES 1902 and 1910 which will prevent further shifting right in A2 and read-in from the ADDER. The slight delay between the PROGRAM CYCLE LAST + and PROGRAM CYCLE STOP signals compensate for the slight delay through the ADDER after insertion of factor digits on its two input channels. Since no further sum digits from the ADDER need be entered into A2, CHANNEL 1 ZERO INSERT LATCH 3402 is reset by the switching of FAS3, PROGRAM CYCLE LAST + and EXPONENT DIFFERENCE LOW at AND 3404. In like fashion, FP2 LATCH 1016 may now be reset by switching FP3–4, EXPONENT DIFFERENCE LOW, and PROGRAM CYCLE TEST at AND 1027. FP3–4 LATCH 1028 had previously been set by PROGRAM CYCLE LAST + at AND 1029. The termination of the FAS 3 operation in this manner will result in the A2 sum digits being positioned in the higher order positions of the A2 register, with zeros completing the lower order positions.

In the event that the exponent difference range is high, the termination of the FAS 3 operation is somewhat different in that the FP CYCLE RING is also turned on which governs the termination of the A2 shift right read-in from ADDER operation. When a shift right of 8 positions or more is called for, the sum digits produced by the addition of the ARITHMETIC REGISTER factor digits will be placed in A2 so that position 7 therein contains the lowest order sum digit produced by the ADDER. The sum digits from the ADDER must again enter position 0 of A2 and be shifted right until the lowest order sum digit resides in position 7. Since the PROGRAM CYCLE LAST + LATCH is set merely upon determination that the FIELD RING has withdrawn all of the desired factor digits from the ARITHMETIC REGISTER whether this be one or eight in number, it cannot be used to terminate the shift right of A2 since this would prevent the lowest order sum digit from being shifted down to position 7. Therefore, whenever EXPONENT DIFFERENCE HIGH LATCH 509 is set, the A2 shift right and read in from ADDER must always remain on for eight digit times to insure that the lowest order sum digit is placed in position 7. Therefore, FAS 3, C8, and EXPONENT DIFFERENCE HIGH switch at AND 1107 to set FP LAST + in the FP CYCLE RING. Since PROGRAM CYCLE LAST + has been set prior to this, or at the same time in case the exponent difference is exactly 8, FP3–4 is on by the time that FP TEST LATCH 1103 is set. FP TEST switches with the output of INVERTER 1009 at AND 1008 to reset FP3 LATCH 1016, indicating the end of the FAS 3 CYCLE. The shifting right of A2 and its receipt of sum digits from the ADDER will also continue until FP STOP switches with EXPONENT DIFFERENCE HIGH and FP3–4 at AND 1913 to reset LATCHES 1902 and 1910. In the event that the exponent difference is 9 or greater, then the CHANNEL 2 ZERO INSERT LATCH 3405 must also be set in order to insert zeros on CHANNEL 2 immediately following the highest order factor digit which is withdrawn by the FIELD RING from the ARITHMETIC REGISTER. FIELD RING LAST + therefore switches with Op ADD-SUBTRACT at AND 3406 to set LATCH 3405 so as to insert zeros on CHANNEL 2. If a COMPLEMENT ADD operation is occurring, then these zeros are also complemented so that the true difference will be maintained at the output of the ADDER. Both the CHANNEL 1 and CHANNEL 2 ZERO INSERT LATCHES 3402 and 3405 are reset by FP LAST +.

As soon as the FIELD RING has terminated its operation in accordance with the digit held in the 10's position of the FIELD REGISTER during the FAS 3 cycle, the FIELD REGISTER is reset and new digits forced into the 10's and units position thereof in order to prepare for the FAS 4 cycle if such is to be taken. It will be recalled that during the FAS 4 (ADD to A1) cycle, those higher order ARITHMETIC FACTOR digits which were not utilized during the FAS 3 cycle will be added to the factor digits in A1; therefore, during the FAS 4 cycle, the FIELD RING must initiate its operation so as to withdraw the next higher factor digit from the ARITHMETIC REGISTER following the highest factor digit used during the FAS 3 operation. The FIELD RING must terminate its operation at position 2 of the ARITHMETIC REGISTER wherein resides the highest factor digit of the ARITHMETIC REGISTER mantissa. The following Table V indicates the digits to be forced into the units and 10's positions of the FIELD REGISTER for use during the FAS 4 operation when the exponent differences are as indicated.

*Table V*

| Exponent Difference | Tens | Units |
|---|---|---|
| 0 | 2 | 9 |
| 1 | 2 | 8 |
| 2 | 2 | 7 |
| 3 | 2 | 6 |
| 4 | 2 | 5 |
| 5 | 2 | 4 |
| 6 | 2 | 3 |
| 7 | 2 | 2 |

The above functions are accomplished in the following manner. PROGRAM CYCLE LAST + switches with FP3–4 at AND 3119 to reset the FIELD REGISTER LATCHES. The SHIFT REGISTER OUTPUT LATCHES 2801–2805 retain the indication forced into them at the end of the FAS 1 or FAS 2 cycles. EXPONENT DIFFERENCE LOW switches with FAS 3–4 at AND 3120 to cause the decimal translator AND gates 2916–2922 to obtain the 9's complement of the digit held in the SHIFT REGISTER OUTPUT LATCHES. EXPONENT DIFFERENCE LOW, PROGRAM CYCLE TEST, and FP3–4 switch at AND 3121 to allow this 9's complemented digit to be inserted into the units position of the FIELD REGISTER. FAS 3–4, EXPONENT DIFFERENCE LOW, and PROGRAM CYCLE TEST also switch at AND 3012 to insert a digit 2 (coded in 0 bit) into the 10's position of the FIELD REGISTER.

If the exponent difference is high, a FAS 4 cycle will be initiated only if a COMPLEMENT ADD operation is being performed. During such an FAS 4 cycle, the A1 factor is transferred to the ARITHMETIC REGISTER for readout to CHANNEL 1 of the ADDER where the borrow is subtracted therefrom. In such a case, the digit 0 is forced into the 10's position of the FIELD REGISTER, while a digit 9 is forced into the units position of the FIELD REGISTER. This is accomplished during the FAS 3 cycle at AND gate 3013 and 3014 where PROGRAM CYCLE TEST and EXPONENT DIFFERENCE HIGH switch together to place the required bit configuration into the FIELD REGISTER positions.

If the EXPONENT DIFFERENCE LOW signal is on, then the switching of FP3 ADVANCE and EXPONENT DIFFERENCE LOW at AND 1030 sets FP4 LATCH 1018, which in turn gates with Op FAS at AND 1031 to generate FAS 4. This is the ADD to A1 floating point cycle, which is necessary to complete the addition of the ARITHMETIC FACTOR digits to the digits contained in A1. Conversely, for a TRUE ADD operation, no FAS 4 cycle is initiated if the exponent different is high. This is because no carry is ever generated due to the true addition of the factor digits in the ARITHMETIC REGISTER to zeros during FAS 3. However, if a COMPLEMENT ADD operation is performed in the FAS 3 cycle, then an FAS 4 ADD to A1 cycle must be executed because of the borrow into the low order stage of A1 resulting from the subtraction of the ARITHMETIC REGISTER factor digits from zero. In this case, COMPLEMENT ADD OP switches with FP3 ADVANCE at AND 1032 to set the FP4 latch. As mentioned before, if an exponent difference of zero is detected during the FAS 1 cycle, then FAS 4 is initiated directly after termination of the FAS 1 cycle by the switching of EXPONENT DIFFERENCE ZERO, OP FAS, NO FP RECOMP, and FP1 ADVANCE.

In the event that the EXPONENT DIFFERENCE HIGH LATCH is set, one other function is performed during FAS 3. An operation is undertaken to remove the two exponent digits from positions 0 and 1 of the A1 register and replace them with zero digits. In order to accomplish this objective, FAS 3, C1–2, and EXPONENT DIFFERENCE HIGH switch at AND 1810 to set LATCH 1811 which allows A1 to shift left and thus force the exponent digits out of position 0. This shift left operation of A1 continues for two digit times until LATCH 1811 is reset by the switching of FAS 3 and C3–4 at AND 1812. A shift right operation is now initiated in A1 by the switching of FAS 3, C4–5, and EXPONENT DIFFERENCE HIGH at AND 1813 which sets LATCH 1814. This shift right operation is terminated after two digit times by the switching of FAS 3 and C6–7 at AND 1815. During the time that the shift right operation is occurring, however, zero digits are inserted in position 0 of A1 via AND 1816. Thus, at the termination of this shift right operation, zero digits reside at the positions 0 and 1 of the A1 register. The reason for this operation will become apparent during the description of the FAS 5 cycle. It should be noted that the exponent digits originally residing in A1 are still retained in the A3 register to which they were transferred at the beginning of the FAS 3 cycle.

FAS 4 CYCLE (ADD TO A1)

It has previously been explained how FP4 LATCH 1018 may be set by any one of three conditions. The condition of exponent difference zero will first be described with respect to the FAS 4 cycle. In this case, the FAS 3 cycle will not have bene performed and consequently all of the ARITHMETIC FACTOR digits must be added to all of the factor digits held in A1, beginning with the digit in position 9 of each register. The sum digits emerging in sequence from the ADDER will be placed into the position 0 of A1 which is at this time shifting right so as to eventually place the lowest order sum digit in its position 9. During FAS 1, PROGRAM CYCLE STOP +, FAS 1, and EXPONENT DIFFERENCE ZERO switch together at AND gates 3005 and 3006 to place the digit 9 and the digit 2 into the units and 10's positions of the FIELD REGISTER, respectively. This is to insure that the FIELD RING will scan out all mantissa digits of the ARITHMETIC REGISTER which reside in positions 9 through 2, inclusive. FAS 4 and CX–0 now switch at AND 1817 to read-out the contents of A1 onto the ARITHMETIC BUS. FAS 4, EXPONENT DIFFERENCE 0 to 7, and CX–0 also switch at AND 1607 to set LATCH 1602 in order to allow the entire AUXILIARY REGISTER to read-in the A1 factor from the ARITHMETIC BUS. The AUXILIARY REGISTER will subsequently present the A1 factor to CHANNEL 1 of the ADDER. Subsequent to this first transfer of A1 to the AUXILIARY REGISTER, FAS 4, C01, and EXPONENT DIFFERENCE ZERO switch at AND 1818 to again read-out the A1 factor to the ARITHMETIC BUS. At the same time, FAS 4, C01, and EXPONENT DIFFERENCE ZERO switch at AND 2005 to allow A3 to read in the A1 factor. Thus, for the EXPONENT DIFFERENCE ZERO, transfers of the factor held in A1 are made first to the AUXILIARY REGISTER and subsequently to A3. The subsequent transfer of the factor to A3 must occur in order to allow the retention of the exponent of the A1 factor, inasmuch as no FAS 3 cycle occurred during which such transfer would also have been made.

The switching of FAS 4 and EXPONENT DIFFERENCE 0 TO 7 at AND 207 forces the signal OP ADD TO A which in turn forces the signal OP ADD-SUBTRACT and consequently ARITHMETIC CODES. FAS 4 also sets OP A1 LATCH 202. OP ADD-SUBTRACT conditions AND gates 3230 and 3231 in the sign analysis of FIGURE 32 to read-out either the SIGNS TRUE ADD or SIGNS COMPLEMENT ADD indication as was previously described in connection with the FAS 3 cycle. SIGNS COMPLEMENT ADD or SIGNS TRUE ADD switch with C01 at AND gates 3308 and 3307, respectively, in order to set either the COMP ADD LATCH 3302 or the TRUE ADD LATCH 3309. ARITH CODES and C0 switch at AND 901 to initiate operation of the FIELD RING wherein the F1–9 LATCH 802 is set in accordance with the digit 9 contained in the units position of the FIELD REGISTER. Op ADD TO A and C01 switch at AND 1317 to set LATCH 1316 which allows the transfer of digits from the ARITHMETIC REGISTER under control of the FIELD RING to CHANNEL 2 of the ADDER where they will either be added in true form or 9's complements form according to the settings of the COMP ADD or TRUE ADD LATCHES. Previous to this, CX and FAS 4 switch at AND 2503 in order to set the SDS CHECK LATCH 2502, whose output in turn switches with C01 and NO SHIFT CODES at AND 1603 to set LATCH 1604 so as to initiate the shift right operation of the entire AUXILIARY REGISTER. This signal also switches with Op ADD TO A at AND 1713 to set the read-out to CHANNEL 1 LATCH 1714 in order to allow each digit from position 9 of the AUXILIARY REGISTER to be transferred to CHANNEL 1 of the ADDER via AND gates 1715–1719. The circuitry is now conditioned to allow the digit-by-digit transfer of the factors contained in the ARITHMETIC REGISTER and in the AUXILIARY REGISTER to ADDER CHANNEL 2 and CHANNEL 1, respectively, for the addition operation.

FAS 4 and C1–2 switch at AND 1819 to initiate the shift right operation of A1. Simultaneously, FAS 4 and C1–2 switch at AND 1820 to set LATCH 1821 in order to allow position 0 of A1 to receive the sum digits from the ADDER OUTPUT as they are generated. Because of the shift right operation, each digit placed in position 0 will be shifted so that eventually the units digit of the sum generated during FAS 4 will reach position 9 of A1. During the shift right operation of the AUXILIARY REGISTER, zero digits are automatically inserted into its position 0 so as to prevent a blank condition of its stages after all of the significant factor digits have been shifted out therefrom.

When the FIELD RING matches with the digit 2 contained in the 10's position of the FIELD REGISTER, a FIELD STOP MATCH pulse is generated from AND 909 via OR 903 in order to initiate operation of the FIELD CYCLE RING which will subsequently terminate the FIELD RING operation in the normal fashion. FIELD RING LAST sets the ARITHMETIC FIELD END LATCH 703 which in turn switches with FAS 4 and Op FAS at AND 710 to set PROGRAM CYCLE LAST + LATCH 706 of the PROGRAM CYCLE RING. FIELD RING LAST + also resets LATCH 1316 which terminates the read-out of the ARITHMETIC REGISTER to CHANNEL 2 of the ADDER. However, only the eight mantissa digits of the factor from the ARITHMETIC REGISTER have been transmitted to the ADDER by this time. In order to provide addition time for any possible overflow carries due to the addition of the two highest order mantissa digits, which may result during a TRUE ADD operation, zeros are now inserted on CHANNEL 2. This is automatically accomplished by the switching of FIELD RING LAST + and Op ADD-SUBT at AND 3406 which sets the CHANNEL 2 ZERO INSERT LATCH 3405, thus providing at least two successive zero digits following the highest order mantissa digit from the ARITHMETIC REGISTER. Since the read-out of the highest order mantissa digit in the ARITHMETIC REGISTER occurs at the same time as does the read-out of the highest order mantissa digit in the AUXILIARY REGISTER, CHANNEL 1 zeros are also inserted in order to provide addition time for any overflow carries resulting from this highest order digit addition. FAS 4 and C8–9 switch at AND 3403 to set the CHANNEL 1 ZERO INSERT LATCH 3402 for this purpose. At the same time, FAS 4 and C9 switch at AND 1720 to reset LATCH 1714 which thereby prevents any further read-out from the AUXILIARY REGISTER position 9 to CHANNEL 1 of the ADDER. This prevents the two exponent digits from being inserted onto CHANNEL 1 at this time. However, the AUXILIARY REGISTER shift right LATCH 1604 is not reset until two digit times later by the switching of FP STOP, Op FAS, and NOT FP5–6 at AND 1606 so that the two exponent digits will be completely shifted out of the AUXILIARY REGISTER and replaced with zeros.

At the same time, A1 remains shifting right for two digit times longer in order to receive any overflow carries from the ADDER, and thus LATCH 1814 is not reset until Op FAS, FP STOP, and FP4–5 switch at AND 1822. This therefore insures that A1 register positions 1 through 9 contain the sum digits generated during the FAS 4 cycle, including any overflow carries which reside in position 1. Position 0 of A1 at the end of FAS 4 should always contain a digit 0 which is placed therein by the ADDER, inasmuch as an overflow carry only occupies one order position to the left of the position 2 which held highest order mantissa digits. In order to obtain the FP stop signal, FAS 4 and C10 switch together at AND 1107 to initiate operation of the FP CYCLE RING.

Under the assumption that the exponent difference range is low, the operation during the FAS 4 cycle is very similar to that when the exponent difference is zero. However, since only those ARITHMETIC REGISTER mantissa digits are utilized which were not withdrawn during FAS 3 cycle, the setting of the FIELD REGISTER differs in that a digit 2 is forced into the 10's position while a variable number is forced into the units position under control of the SHIFT REGISTER OUTPUT LATCHES 2801–2805 as previously explained during the FAS 3 cycle. Upon generating a FIELD RING START pulse from AND 901, the FIELD RING initiates operation of a LATCH determined by the setting of the units position of the FIELD REGISTER, and subsequently withdraws digits until position 2 of the ARITHMETIC REGISTER is scanned. The FIELD CYCLE RING operation is thereby initiated by generation of FIELD STOP MATCH, and transmission of digits from the ARITHMETIC REGISTER to CHANNEL 2 of the ADDER is terminated as previously discussed. However, since significant mantissa digits in the AUXILIARY REGISTER must still be sent to the ADDER via CHANNEL 1, the CHANNEL 2 ZERO INSERT LATCH is now set by AND 3406 as before. CHANNEL 2 zero digits are thus available to be added to the remaining significant mantissa digits of the AUXILIARY REGISTER.

The operation of most of the circuits and registers during the exponent difference low situation is as was discussed with the exponent difference zero situation. However, when performing a COMPLEMENT ADD operation, a difference does exist between the two conditions as regards the insertion of a carry or no carry at the beginning of the addition time. As noted previously, the generation of a COMP ADD ON signal from OR 3303, which is used to set the COMP ADD latch 3302, normally is allowed to pass through AND 3601 in order to initially set the ADDER OUT CARRY SECOND LATCH 3603 so that a 1 is added to the first digit entering on CHANNEL 1 in order that a true 10's complement of the number of CHANNEL 2 may be obtained. This is so since LATCH 3617 is normally reset for all previous FAS 1, FAS 2, and FAS 3 cycles. If COMP ADD operation occurs during the FAS 3 cycle, whether this be for an exponent difference low or exponent difference high condition, it must be remembered that, in order to obtain the 10's complement of a complete number, only the 10's complement need be taken of the lowest order digit of that number, while the 9's complement may be taken of all succeeding high order digits. Therefore, at the beginning of the FAS 3 cycle, the COMPLEMENT ADD ON signal automatically inserts a carry into the CHANNEL 1 line to effectively obtain the 10's complement of the digit residing in position 9 of the ARITHMETIC REGISTER. However, all succeeding high order digits of the ARITHMETIC REGISTER mantissa factor must only require the 9's complement to be taken thereof, including those mantissa digits which are operated upon during the FAS 4 cycle. It will be noted that the COMPLEMENT ADD ON signal is always generated at the beginning of the FAS 4 cycle, when exponent difference is 0 to 7, due to the fact that the Op ADD-SUBTRACT signal samples the COMPLEMENT ADD SIGN control gate 3231. Therefore, the 10's complement would normally be taken of the first digit sent to the ADDER via CHANNEL 2 at the beginning of FAS 4 time. This is not desirable, however, since the ARITHMETIC REGISTER mantissa digits operated upon during the FAS 4 cycle are a portion of the same number whose lower order digits were operated upon during the FAS 3 cycle. There is only one condition whereby a carry insert is desired during the first addition time in the FAS 4 cycle and this is when the mantissa digits of the ARITHMETIC REGISTER operated upon during the FAS 3 cycle have been all zeros. In such a case, the 10's complement of all zeros during FAS 3 results in a carry being produced at the last addition time of the FAS 3 cycle. Such a carry must obviously be considered during the FAS 4 cycle. Therefore, in order to detect the presence or absence of a carry at the last addition time of FAS 3, PROGRAM CYCLE LAST + and FAS 3 switch at AND 3618 to set LATCH 3618 only if a NO CARRY FIRST signal is detected at this time. The setting of LATCH 3617 prevents the gating through of the COMPLEMENT ADD ON signal during the beginning of the FAS 4 cycle and so avoids the automatic insertion of a carry. The output from OR 3619 also inserts a NO CARRY indication. On the other hand, if a carry is generated during the last addition time of the FAS 3 cycle, LATCH 3617 is not set and the COMPLEMENT ADD ON signal generated at the beginning of the FAS 4 cycle may properly set the CARRY INSERT LATCH 3603 of the ADDER. It must be observed that PROGRAM CYCLE LAST + always occurs in time to detect the presence or absence of such a carry for the exponent difference low condition. PROGRAM CYCLE LAST + will also correctly detect the absence of the carry during an exponent difference high condition even though the adding time during FAS 3 may not have been completed when the PROGRAM CYCLE LAST + LATCH is set. This is because a carry at this sample time continues to propagate because it is being added to a series of 9 digits which are introduced into CHANNEL 2 by the complement gates.

With the assumption that the EXPONENT DIFFERENCE HIGH LATCH 509 is set, with a COMPLEMENT ADD operation being performed, the circuit operation during FAS 4 is as follows. As noted previously, the FAS 4 operation is necessary in this case since the factor digits in A1 must be modified in view of the borrow which is obtained as a result of the subtraction from zero of nonzero digits residing in the ARITHMETIC REGISTER mantissa. The factor in A1 is initially transferred to ARITHMETIC REGISTER from which it is then transferred to the ADDER via CHANNEL 1, while zeros are inserted on CHANNEL 2 with the 9's complement being taken thereof. FAS 4 therefore switches with CX–0 at AND 1817 in order to transfer the factor in A1 onto the ARITHMETIC BUS. FAS 4, CX–0, and EXPONENT DIFFERENCE HIGH switch at AND 1216 to set LATCH 1204 and allow the ARITHMETIC REGISTER to read-in this A1 factor from AB. As previously noted in the description of FAS 3, the switching of FAS 3–4, PROGRAM CYCLE TEST, and EXPONENT DIFFERENCE HIGH at AND 3013 causes the insertion of a zero digit into the 10's position of the FIELD REGISTER, while the switching of FAS 3, PROGRAM CYCLE TEST, and EXPONENT DIFFERENCE HIGH at AND 3014 causes the insertion of a digit 9 in the units position of the FIELD REGISTER. Thus, upon initiation of the FIELD RING operation during FAS 4, the A1 factor digits residing in positions 9 through 0 of the ARITHMETIC REGISTER are successively withdrawn. FAS 4, C0–1, and EXPONENT DIFFERENCE HIGH switch at AND 1318 to set LATCH 1309 which allows the read-out of these digits from the ARITHMETIC REGISTER to CHANNEL 1 of the ADDER. FAS 4, EXPONENT DIFFERENCE HIGH, and C0–1 switch at AND 3407 to set the CHANNEL 2 ZERO READ-IN LATCH 3405 which allows the insertions of zeros on CHANNEL 2. FAS 4, EXPONENT DIFFERENCE HIGH, and Cϕ–1 switch at AND 3310 to set COMP ADD LATCH 3302. As mentioned before, the setting of LATCH 3617 prohibits the insertion of a carry at the beginning of this addition operation unless a carry resulted from the addition during the FAS 3 cycle. The modified A1 factor (from which 1 has been effectively subtracted) is reinserted back into A1 during the shift right operation previously discussed. It will be appreciated that although the two exponent positions 1 and 0 of the ARITHMETIC REGISTER are read out at this time, they had previously been set to zero during the FAS 3 operation so that they will not interfere with the setting of the CHANNEL 1 ZERO LATCH 3402 at FAS 4 and C8–9 time which switch at AND 3405.

An error check is provided during the FAS 4 cycle. FAS 4, PROGRAM CYCLE LAST +, NO CARRY ADDER FIRST, and COMPLEMENT ADD switch at AND 3232 to set FP ERROR LATCH 3215, which in turn energizes the error light on the console. The detection of NO CARRY from the ADDER at this particular time during a complement add operation indicates that a complement number has been obtained. Since no recomplementing cycle is provided during the FAS 3 and FAS 4 operations, there is no way to obtain the true difference in such a situation. Such an error might occur when the larger of the two factors does not reside in the A1 register, or if one of the factors is not normalized. FP ERROR will set FP END LATCH 1006 and thus generate an EDO signal.

FAS 4 and C9 switch at AND 1033 to set FP4–5 LATCH 1034. FP TEST then resets FP4 and thus generates the FP4 ADVANCE from AND 1035. This signal sets the FP5 LATCH 1036 in order to initiate the NORMALIZATION FAS 5 cycle.

FAS 5 CYCLE (NORMALIZATION)

The addition during FAS 3 and/or FAS 4 most often results in the highest order non-zero digit of the sum being held in a position other than position 2 of A1. Before exponents can be generated for the sum digits held in A1 and A2, some test must be performed to ascertain the number of shifts required of the sum digits in order to normalize the number, i.e., place the most significant nonzero digit of the sum in position 2 of the A1 register. This function is performed during the FAS 5 cycle.

The setting of FP5 LATCH 1036 forces on the SHIFT LEFT COUNT DOUBLE signal at OR 208 which in turn forces on the following signals: TWO CYCLE SHIFT CODES, SHIFT CYCLE 1, SHIFT CODES, and SHIFT LEFT COUNT CYCLE 1 at OR gates 209–212, respectively. The PROGRAM RING is recycled by generation of a start pulse from AND 606. SHIFT CYCLE 1, SHIFT LEFT COUNT DOUBLE, CX, and NO DOUBLE COUNT 10 OR UP switch at AND 213 to set LATCH 202 to generate the OP A1 signal. SHIFT CODE CYCLE 1, OP A1, and CX0 switch at AND 1823 to transfer the sum digits in A1 onto the ARITHMETIC BUS. At the same time, SHIFT LEFT COUNT CYCLE 1, and CX0 switch at AND 2504 to generate SDS ON signal from OR 2505 which allows the SIGNIFICANT DIGIT SCANNER to simultaneously scan each of the A1 digits in positions 0 through 9 on the ARITHMETIC BUS in order to ascertain in which position resides the highest order non-zero digit. This function is performed by conditioning AND gates 2506–2515 to scan for either the 6B, 3B, or 0B in each of the positions 0–9. Detection of any of these three bits indicates the presence of a nonzero digit which thus attempts to set the corresponding position of the SIGNIFICANT DIGIT SCANNER are more fully explained in copending IBM Docket 6259. The setting of the SDS position corresponding to the most significant non-zero digit on AB, however, inhibits the setting of all lower order SDS positions. SHIFT CYCLE 1 and CX0 also switch at AND 2101 to set LATCH 2102 which allows the WORD BUFFER REGISTER to read-in the A1 sum from the ARITHMETIC BUS.

It is presently assumed that the A1 sum contains a non-zero digit in one of its nine positions 1–9, so that one of the corresponding positions 1–9 of the SIGNIFICANT DIGIT SCANNER is set. CX switches with SHIFT LEFT COUNT CYCLE at AND 2516 to set the SDS CHECK ON LATCH 2502. SHIFT LEFT COUNT CYCLE 1, C0–1, NO SDS ZERO SHIFT COUNT, and SDS CHECK ON now switch at AND 2517 to allow the setting of one position of the SINGLE CORE SHIFT REGISTER in accordance with the particular set position of the SIGNIFICANT DIGIT SCANNER. As has previously been described, the physical connections between the SIGNIFICANT DIGIT SCANNER positions and the SINGLE CORE SHIFT REGISTER positions are such that a signal emanating from a set position N of the SIGNIFICANT DIGIT SCANNER is transferred, at AP time, to the capacitor of SCSR position N–1, where it is used at CP time to set the N–1 position core. For example, the read-out from position 2 of the SIGNIFICANT DIGIT SCANNER is used to set position 1 of the SINGLE CORE SHIFT REGISTER. Therefore, under the above assumption, one of the SCSR positions 0–8 will be set.

The sum digits contained in A2 are next transferred to A1 following the transfer of A1 to the WORD BUFFER REGISTER. SHIFT LEFT COUNT DOUBLE, NO DOUBLT COUNT 10 OR UP, NO SHIFT STOP, and C1–2 switch at AND 1914 to transfer the A2 sum onto the ARITHMETIC BUS. The same four signals switch at AND 1824 to provide a transfer of the A2 sum from the ARITHMETIC BUS into A1. The WORD BUFFER REGISTER now contains the eight higher order digits of the sum, while A1 contains the eight lower order digits of the sum.

NO SHIFT, STOP, SHIFT LEFT COUNT CYCLE 1, C1–2, and NO SDS ZERO SHIFT COUNT switch at AND 2605 to transfer the indication now held in the SINGLE CORE SHIFT REGISTER into the SHIFT REGISTER OUTPUT LATCHES 2801–2805 via the 9's complement translation bus 2806. This signal from OR 2602 also blanks (resets) the set position of the SCSR via INVERTER 2603. However, SHIFT LEFT COUNT CYCLE 1 switches with C2–3 at AND 2718 to allow AND gates 2719–2723 to now sample latches 2801–2805 in order to set again the same SINGLE CORE SHIFT REGISTER position that was reset by the signal from OR 2602.

FAS 5 MULTIPLY-ADD, NO A FIRST, and C–2 now switch at AND 2806 to generate a signal for reading out the shift register output latch digit to CHANNEL 2 of the ADDER via AND gates 2807–2811. FP5 MULTIPLY-ADD and C1–2 switch at AND 3311 to set COMPLEMENT ADD LATCH 3302 so that the 9's complement will be taken of this digit, and a carry insert is automatically provided via AND 3601. FAS 5 and C2 switch at AND 3406 to force a digit 8 onto CHANNEL 1 at the same time that the digit from the SHIFT REGISTER OUTPUT LATCHES is sent to CHANNEL 2. Thus, the digit contained in the shift register output latches is subtracted from a value of 8. Subsequent to the addition time of these two digits, FP5 MPY ADD, C2–3, and NO DOUBLE COUNT 10 OR UP switch at AND 3407 to set CHANNEL 1 ZERO INSERT LATCH 3402, while FP5 MULTIPLY-ADD and C2–3 switch at AND 3504 to set the CHANNEL 2 ZERO INSERT LATCH 3501. These two latches remain set for three digit times so that a four-digit difference appears at the ADDER output. This four-digit difference is inserted into the AUXILIARY REGISTER 2 in the following manner. FP5 MULTIPLY-ADD and C2–3 switch at AND 1501 to set LATCH 1502 which causes the shifting right of digits in positions 2, 3, 4, and 5 of the AUXILIARY REGISTER 2 section only. At the same time, FP5 MULTIPLY-ADD and C2–3 switch at AND 1503 to set LATCH 1504 which allows position 2 of AUXILIARY REGISTER 2 to receive the difference digits emanating from the ADDER output. LATCH 1504 and LATCH 1502 are both reset at C6–7 time by AND gates 1505 and 1506, respectively, so that all four difference digits from the ADDER may be inserted therein. The number thus generated and inserted into AUXILIARY REGISTER 2 will be used during the FAS 6 cycle in order to generate the exponent for the sum digits contained in A1. The significance of this four digit difference is that it represents the number of times that the sum digits in A1 must be shifted left in order to place the most significant non-zero digit in position 2, resulting in a normalized number.

It is now necessary to shift the sum digits contained in the WORD BUFFER REGISTER to the left until the highest order non-zero digit contained therein resides in position 0. At the same time, the sum digits now contained in A1 must also be shifted out of position 0 of A1 into position 9 of the WORD BUFFER REGISTER. SHIFT LEFT COUNT, SHIFT CYCLE 1, and C3–4 now switch at AND 2103 to set LATCH 2104 which initiates the shift left operation in the WORD BUFFER REGISTER. SHIFT LEFT COUNT DOUBLE, WBR SERIAL SHIFT LEFT, and NO DOUBLE COUNT 10 OR UP switch at AND 2105 to set LATCH 2106 so as to allow position 9 of the WORD BUFFER REGISTER to accept digits being pushed out of position 0 of A1. Simultaneously, SHIFT LEFT COUNT DOUBLE, SHIFT LEFT COUNT CYCLE 1, NO DOUBLE COUNT 10 OR UP, NO SHIFT STOP, and C3–4 switch at AND 1825 to set LATCH 1811 which allows A1 to shift left also. Therefore, digits being transferred out of position 0 of A1 during each digit time will be gated into position 9 of the WORD BUFFER REGISTER which in turn is also having its digits shifted left. Meanwhile, SHIFT LEFT COUNT CYCLE 1, NO SHIFT STOP, and C2–3 switch at AND 2606 to set LATCH 2607 which causes the SINGLE CORE SHIFT REGISTER to shift its marker left simultaneously with the shifting of the digits in the WORD BUFFER REGISTER and A1. As previously explained, this marker has been placed in the N–1 position of the SINGLE CORE SHIFT REGISTER from the N position of the SIGNIFICANT DIGIT SCANNER. The timing is now such that the highest order non-zero digit in the WORD BUFFER REGISTER is transferred from position 1 to position 0 therein, while the marker in the SINGLE CORE SHIFT REGISTER is transferred out of position X therein and causes the setting of the A FIRST LATCH 711 via AND 712. It will be remembered that position X of the SCSR is to the immediate left of position 0, as previously explained. A FIRST switches with SHIFT LEFT COUNT DOUBLE at AND 713 to generate SHIFT STOP. SHIFT STOP thereupon switches with DP at AND 2107 to reset LATCH 2104 so as to discontinue the shift left operation and so prevent the most significant non-zero digit therein from being transferred out of position 0. At the same time, SHIFT STOP switches with AP at AND 2108 to reset LATCH 2106. SHIFT STOP also resets LATCH 1811 via OR 1826 to discontinue the shift left operation of A1.

A FIRST also switches with the up signal from AND 714 at AND 715 to set A FIELD END LATCH 702. Previously, SHIFT CODES and C0 switched at AND 716 to force on ARITHMETIC FIELD END LATCH 703. ARITHMETIC FIELD END, A FIELD END, and SHIFT CODES now switch at AND 705 to set PRO- GRAM CYCLE LAST + LATCH 706. The initiation of the PROGRAM CYCLE RING will terminate the FAS 5 cycle. It should be noted, however, that A FIRST cannot set LATCH 702 while the output from AND 714 is down. At the beginning of FAS 5, FAS 5 and C1 switch at AND 530 to set LATCH 531, whose inverted output thereby prevents an output from AND 714. C6 resets LATCH 531 so that AND 714 may come on. The reason for LATCH 531 is to insure that the modifying number from the ADDER is generated and placed into AUXILIARY REGISTER 2 before PROGRAM CYCLE RING operation is initiated, since a C6–7 signal is required to halt the shifting and readin functions of AUXILIARY REGISTER 2. Otherwise, an early setting of A FIRST might stop PROGRAM RING operation before the C6–7 signal is generated.

The sum digits in the WORD BUFFER REGISTER are now transferred back to A1 and the contents of A1 are transferred back to A2. SHIFT LEFT COUNT DOUBLE, NO DOUBLE COUNT 10 OR UP, PROGRAM CYCLE LAST +, and NO C1–2 switch at AND 1827 to transfer the sum digits, including sign, from A1 to the ARITHMETIC BUS. SHIFT LEFT COUNT DOUBLE, PROGRAM CYCLE LAST +, and NO C1–2 switch at AND 1915 to set LATCH 1916 so that A2 reads these sum digits in from the ARITHMETIC BUS. Subsequently FAS 5, SHIFT LEFT COUNT DOUBLE, and PROGRAM CYCLE STOP switch at AND 2109 to transfer the WORD BUFFER REGISTER sum digits onto the ARITHMETIC BUS. PROGRAM CYCLE STOP, OP A1, and SHIFT LEFT COUNT DOUBLE next switch at AND 1828 to allow A1 to read-in from the ARITHMETIC BUS these sum digits, including sign, from the WORD BUFFER REGISTER.

PROGRAM CYCLE LAST + also switches with switches with SHIFT LEFT COUNT DBL at AND 716 to reset A FIRST LATCH 711. With regard to the FP CYCLE RING, FP5 and PROGRAM CYCLE LAST + switch at AND 1108 to initiate the ring operation by setting FP TEST LATCH 1103 instead of FP LAST + as is normally done. FP TEST will set PROGRAM RING STOP LATCH 605 to discontinue PROGRAM RING operation. FP STOP and NO FP END at AND 606 will recycle the PROGRAM RING for the FAS 6 cycle. At C3 time during FAS 5, FP5 switches with NO SDS ZERO SHIFT COUNT at AND 1037 to set FP5–6 LATCH 1038. At FP TEST, then, LATCH FP5 is reset so that AND 1039 generates a set pulse for FP6 LATCH 1040.

During FAS 5, the following events also normally occur. FP5 MPY ADD and CX–0 switch at AND 1226 to force a plus sign into the ARITHMETIC REGISTER when a SIGN CHANGE signal is generated by AND 1227. Previously, FP5 MPY ADD switches with CX at AND 1401 to force zero digits into positions 0–9 of the ARITHMETIC REGISTER. This forced setting of ARITHMETIC REGISTER to plus zero digits is necessary in case both A1 and A2 have all zero digits therein at the beginning of FAS 5, as will subsequently be described. However, in the event that this latter condition does not exist, the ARITHMETIC REGISTER will subsequently be set with the number held in A3 in order that the exponent digits of the larger factor may be placed in positions 0 and 1 of ARITHMETIC REGISTER for use during the FAS 6 cycle. To accomplish this, FAS 5 and C4–5 switch at AND 2006 to read out A3 to A*b* while NO SDS ZERO SH CNT switches with FAS 5 and C4–5 at AND 1228 to allow ARITHMETIC REGISTER to read in from AB. Further in connection with this, the FIELD REGISTER is reset by FAS 5 switching with CX–0 at AND 3122. FAS 5 and C0 switch at AND 3015 to insert a digit 0 into the 10's position of the FIELD REGISTER, while at the same time inserting a digit 1 into the units position. Thus, during FAS 6, the FIELD RING may scan only positions 0 and 1 of the ARITHMETIC REGISTER so as to only send the larger exponent digits to the ADDER.

A variation on the above described operation occurs when the highest order non-zero sum digit is in position 1 of A1 at the beginning of FAS 5. This condition is the result of an overflow carry during the FAS 4 cycle. Therefore, when transferring A1 to the WORD BUFFER REGISTER, position 1 of the SIGNIFICANT DIGIT SCANNER is set which in turn sets position 0 of the SINGLE CORE SHIFT REGISTER. This setting of the SCSR results in a digit 9 being inserted into the output LATCHES 2801–2805, which is then subtracted from the digit 8 forced onto CHANNEL 1. Since a larger number is subtracted from a smaller number, a complement answer is obtained having no overflow carry. This condition is detected as follows.

At the beginning of the FAS 5 cycle, FAS 5 and CX switch at AND 416 to reset FP RECOMP LATCH 413 if such had been set during the FAS 1 cycle. Upon subtraction of the digit 9 contained in the shift register output latches from the forced digit 8 on CHANNEL 1 of the adder during FAS 5 time, the detection of a NO CARRY FIRST from the ADDER is made at AND 417 by the switching of FAS 5, NO DBL COUNT 10 OR UP, and C2–3 which causes the FP RECOMP LATCH to be set. The set condition of FP RECOMP LATCH will be used during FAS 6 to cause the addition of 1 to the larger factor exponent.

If the assumption is now made that there is no non-zero digit residing in any of the positions 0–9 in the A1 register at the beginning of FAS 5, then the above-described operations vary in the following manner. Upon reading out the sum digits from A1 to the WORD BUFFER REGISTER, the SIGNIFICANT DIGIT SCANNER detects the absence of any non-zero digits and so sets its ZERO position, which is to the right of its position 9, previously described. The setting of the ZERO position subsequently causes the setting of LATCH 2518 when AND 2517 reads out SDS to SCSR. LATCH 2518 generates an SDS REG ZERO signal at AP time and is reset at the following DP time by AND 2519. No position of SCSR is set, however, since there is no connection between the SDS ZERO position and the SCSR.

Since A1 contains all zeros, it is now necessary to transfer the A2 sum digits into the WORD BUFFER REGISTER before shifting left. SDS REGISTER ZERO, C1, and SHIFT LEFT COUNT DBL switch at AND 2519 to set LATCH 2520 which generates SDS ZERO SHIFT COUNT. SDS REGISTER ZERO, SHIFT LEFT COUNT DOUBLE, and NO DOUBLE COUNT 10 OR UP also switch at AND 608 to set PROGRAM RING STOP LATCH 605 via AND 609 which stops the PROGRAM RING at C1. This gate also generates recycle pulse which initiates operation of the PROGRAM RING AGAIN beginning at CX time. All C pulses hereafter referred to occur during the second recycle time. SDS ZERO SHIFT COUNT now switches with PROGRAM RING RECYCLE from LATCH 607 at AND 2521 to set the DOUBLE SHIFT COUNT 10 OR UP LATCH 2522. DOUBLE SHIFT COUNT 10 OR UP and CX switch at AND 214 to set LATCH 206, this generating the OP A2 signal. SDS ZERO SHIFT COUNT and DOUBLE SHIFT COUNT 10 OR UP switch at AND 214 to reset the OP *a*1 LATCH 202.

During this second recycle time of the PROGRAM RING OPA A2, CX0, and SHIFT CYCLE 1 switch at AND 1917 to read-out the sum digits in A2 onto the AB. SHIFT CYCLE 1 and CX0 also switch at AND 2101 to allow the WORD BUFFER REGISTER to read-in this number thus transferred from A2, which replaces the A1 sum digits. It will be noted that at this time A1 cannot read-out to AB at CX0 time inasmuch as the OP *a*1 signal to AND 1823 is down. Therefore, during the second recycle time of the PROGRAM RING in the FAS 5 cycle, A2 is transferred to the WORD BUFFER REGISTER at CX0 time instead of A1. DOUBLE SHIFT COUNT 10 OR UP and C1 switch at AND 216 to reset the OP A2 LATCH 206, while SHIFT LEFT COUNT DOUBLE, C2, and DOUBLE SHIFT COUNT 10 OR UP switch at AND 217 to again set the OP LATCH 202. Also, CP and CX switch at AND 2523 to reset the SDS ZERO SHIFT COUNT LATCH 2520.

During the time that A2 is being transferred to the WORD BUFFER REGISTER, the SIGNIFICANT DIGIT SCANNER scans the A2 digit positions in order to determine the position containing the highest order non-zero digit. Assume now that such a digit is present in one of the positions 1 to 9. The SINGLE CORE SHIFT REGISTER N–1 position is set by the set N position of the SIGNIFICANT DIGIT SCANNER at the following CO–1 time by AND 2517. A read-out of the SHIFT REGISTER OUTPUT LATCHES 2801–2805 to CHANNEL 2 of the ADDER is again initiated at C2 time by AND 2806, together with the forcing of a digit 8 on CHANNEL 1. However, the digit on CHANNEL 2 must now be subtracted from a total of 18 instead of 8. This is so since the A2 non-zero most significant digit requires shifting through the ten positions (0–9) of A1 before it arrives in position 0 of A1. In order to insert a digit 1 onto CHANNEL 1 directly following the digit 8 insertion, FP5 MULTIPLY-ADD, C3, and DOUBLE COUNT 10 OR UP switch at AND 3408 to insert a 1 bit and 0 bit onto CHANNEL 1. The CHANNEL 1 ZERO INSERT LATCH set time must therefore be delayed one digit time. FP5 MULTIPLY-ADD switches with C3–C4 at AND 3409 to set the CHANNEL 1 ZERO LATCH 3402. It should be noted that LATCH 3402 cannot be set at C2–3 time because INVERTER 3410 is now down due to the presence of the DOUBLE COUNT 10 or UP signal. A four digit difference is again generated by the ADDER which is placed into the AUXILIARY REGISTER 2 portion as previously described. This number indicates the left shift necessary to normalize the sum digits in A2. The WORD BUFFER REGISTER shift left controls are initiated at C3–4 time by AND 2103. A1 is not shifted left, however, since the NO DOUBLE COUNT 10 or UP SIGNAL is missing from AND 1825.

The WORD BUFFER REGISTER continues to shift left until the highest order non-zero significant digit comes to rest in position 0 as indicated by the setting of the A FIRST LATCH when the marker is shifted from position X of the SCSR. This in turn generates a SHIFT STOP signal from AND 713 and terminates the shift left operation of the WORD BUFFER REGISTER. A FIRST also sets A FIELD END LATCH 702 via AND 715 so that PROGRAM CYCLE LAST + LATCH 706 may be set.

Since the assumption has been made that a non-zero digit resides in at least one of the A2 sum positions 1–9, the SDS ZERO position was not set and consequently LATCH 2518 remained reset upon the transfer of SDS to the SCSR. Therefore, LATCH 2520 is not set at the time that the PROGRAM CYCLE LAST + signal comes on. LATCH 2522, however, is already set at this time because of the prior detection that A1 contained all zero digits. FP5 MULTIPLY-ADD, PROGRAM CYCLE LAST +, DOUBLE COUNT 10 or UP, and NO SDS ZERO SHIFT COUNT now switch at AND 1839 to read out A1 (containing all zeros) to AB. SHIFT LEFT COUNT DOUBLE, PROGRAM CYCLE LAST +, and NO (C1–2 switch at AND 1915 to set LATCH 1916 so as to enable A2 to read in from AB this A1 number, including sign. FAS 5 and PROGRAM CYCLE STOP switch at AND 2109 to next read out the WORD BUFFER REGISTER to AB while the signals OP A1, PROGRAM CYCLE STOP, and SHIFT LEFT COUNT DOUBLE at AND 1828 allow A1 to read in from AB the number from the WORD BUFFER REGISTER. Thus, at the end of FAS 5, the sum digits originally inserted into A2 during FAS 3 now reside in A1 with the highest order non-zero digit resting in position 0. A2 now has zero digits in positions 0–9.

A slight variation on the above operation occurs if a non-zero digit resides in position 0 of A2, while A1 contains all zeros at the beginning of FAS 5. When A2 is transferred to the WORD BUFFER REGISTER via AB during the second recycle time of the PROGRAM RING, SDS position 0 is thus set. Upon transferring SDS to the SINGLE CORE SHIFT REGISTER, a voltage is sent from SDS position 0 to the capacitor of SCSR position X (left of SCSR position 0). This occurs at C0–1 time, see AND gate 2517. Since A FIRST LATCH 711 is also directly connected to the SCSR position X capacitor via AND 712, it is immediately set at C0–1 AP time. Thus, AND 2806 cannot be raised at C2 time so that there can be no read out from the output LATCHES 2801–2805 to CHANNEL 2. The particular digit contained therein is therefore immaterial. Instead, DOUBLE COUNT 10 OR UP, C2, A FIRST, and FP MULTIPLY-ADD switch at AND 3509 to insert a digit 9 onto CHANNEL 2. FP 5 MULTIPLY-ADD and C1–2 also switch at AND 3311 to set COMP ADD LATCH 3302. However, the COMP ADD ON signal from OR 3303 does not at this time set CARRY SECOND LATCH 3606 via AND 3601. Instead, C1–2, A FIRST, FP 5 MULTIPLY-ADD, and DOUBLE COUNT 10 OR UP switch at AND 3626 to provide a NO CARRY insert and simultaneously block AND 3601 via INVERTER 3627. Thus, the digit 9 inserted on CHANNEL 2 by AND 3509 has only the 9's complement taken thereof, which is added to 18 being inserted onto CHANNEL 1. The difference, 8 (neglecting the overflow carry) correctly represents the number of left shifts necessary for the A2 non-zero digit to be placed in position 2 of A1. Since the setting of A FIRST immediately generates SHIFT STOP from AND 713, no shift left operation occurs in the WORD BUFFER REGISTER since the non-zero digit in position 0 therein must not be lost.

If both A1 and A2 registers contain zero digits in all of their positions 0–9, then the following operation occurs. It is necessary to force the signs of both registers to a plus indication, and then terminate the floating point operation at the end of FAS 5. When transferring A2 to the WORD BUFFER REGISTER, the SDS ZERO position will be set since there are no non-zero digits in positions 0–9 of A2. Therefore, LATCH 2518 will be subsequently set and in turn LATCH 2510 will be set. It should be noted that LATCH 2520 was previously reset at the beginning CX time of the second PROGRAM RING recycle. However, because LATCH 2522 is also on at this time, AND 608 will be down due to the absence of NO DOUBLE COUNT 10 OR UP. The PROGRAM RING thereby remains in operation. SDS ZERO SHIFT COUNT and DOUBLE SHIFT COUNT 10 OR UP switch at AND 215 to prevent OP A1 LATCH 202 from being set by AND 217. SDS ZERO SHIFT COUNT and C1–2 switch at AND 2812 to reset LATCHES 2801–2805 at OP time, then to insert a 6B and a 3B therein, representing the digit 9. An output from AND 2718 then allows the output latch digit 9 to be sent via 9's complement gate 2716 to set position 0 of the SCSR. LATCH 2607 is now set to cause the SINGLE CORE SHIFT REGISTER to shift left, which results in A FIRST being set as above-described. PROGRAM CYCLE LAST + is thereby generated, which in turn sets FP TEST LATCH 1103. FP 5 MULTIPLY-ADD, PROGRAM CYCLE LAST +, and SDS ZERO SHIFT COUNT switch at AND 1229 to read out the ARITHMETIC REGISTER, which now contains plus zeros, to AB. SHIFT LEFT COUNT DOUBLE, PROGRAM CYCLE LAST +, and NO (C1–2) switch at AND 1915 to cause A2 to accept this number from AB. Subsequently, SDS ZERO SHIFT COUNT and FP STOP switch at AND 1230 to again read the plus zero digits from ARITHMETIC REGISTER to AB. SDS ZERO SHIFT COUNT and FP STOP switch at AND 1840 to enable A1 to be set from AB with this number. Thus, both A1 and A2 now contain plus signs and all zero digits in positions 0–9. Because the signal NO SDS ZERO SHIFT COUNT is absent, FP 5 switching at AND 1037 with C3 cannot set FP 5–6 LATCH 1038, thus preventing the setting of FP 6 LATCH 1040. SDS ZERO SHIFT COUNT, FP5 MULTIPLY-ADD, and C3 switch at AND 1047 to set FP END LATCH 1006. An EDO signal will then be generated via AND 1048, which terminates the floating point operation.

FAS 6 CYCLE (UPDATE A1 EXPONENT)

In order to generate the correct exponent for the sum digits contained in A1, it is necessary to subtract from the original larger factor exponent the modifying number now contained in the AUXILIARY REGISTER, but only under the condition that the FP RECOMP LATCH 413 had not been set during the FAS 5 cycle. The correct exponent digits thus generated at the output of the ADDER are inserted into positions 0 and 1 of A1 whose contents are shifted two digits to the right so that the most significant non-zero mantissa digit resides in position 2 of A1. At the same time, the newly generated A1 exponent is also inserted into address positions 6–9 of the PROGRAM REGISTER for later use during the FAS 7 cycle in generating the correct exponent for the A2 sum digits.

As mentioned during discussion of the FAS 5 cycle, the A1 factor stored in A3 is transferred to the ARITHMETIC REGISTER in order to preserve the exponent. Also during the FAS 5 cycle, a digit 0 is forced into the FIELD REGISTER 10's position and a 1 digit is forced into the FIELD REGISTER units position so as to allow the two exponent digits stored in the ARITHMETIC REGISTER to be withdrawn during the FAS 6 cycle by the FIELD RING.

FP5–6, ARITH OP, NO FP RECOMP, and FP STOP switch at AND 3312 to set COMP ADD LATCH 3302. FP5–6 and FP TEST switch at AND 917 to initiate operation of the FIELD RING which begins by setting LATCH F2–1 in accordance with the 1 digit contained in the units position of the FIELD REGISTER. OP FAS, FP STOP, and FP5–6 switch at AND 1317 to set LATCH 1309 which allows the two exponent digits in the ARITHMETIC REGISTER to be read onto CHANNEL 1 of the ADDER. At the same time, FP5–6, FP STOP, and FP MULTIPLY-ADD switch at AND 1507 to set LATCH 1502 which causes the modifying number in positions 2 through 5 to begin shifting right. FP5–6, FP STOP, FP MULTIPLY-ADD, and NO FP RECOMP also switch at AND 1508 to set LATCH 1509 which allows the digits coming from position 5 of AUXILIARY REGISTER 2 to be transferred to CHANNEL 2 of the ADDER, where the complement will be taken thereof. This exponent modification number from AUXILIARY 2 register is therefore subtracted from the exponent of the larger original factor in order to obtain the correct exponent for the sum digits held in A1. Since all four digits of AUXILIARY REGISTER 2 are read-out, zeros are inserted on CHANNEL 1 immediately following the two exponent digits read from the ARITHMETIC REGISTER. FAS 6 switches with C0–1 at AND 3411 which sets the CHANNEL 1 ZERO INSERT LATCH 3402 at the proper time to accomplish this function.

The units and tens digits of the sum from the adder during FAS 6 are now placed in positions 0 and 1 of A1. CX–0 and ARITH OP FP6 switch at AND 1829 to set the A1 SHIFT RIGHT LATCH 1814 in order to move the sum digits in A1 two places to the right so as to provide space in positions 0 and 1 thereof for the exponent digits from the adder. CX–0 and ARITH OP FP6 also switch at AND 1830 to set the A1 read-in from adder LATCH 1821 which inserts the each exponent digit into position 0 from the adder. At this time also, digits from position 9 of the A1 register must be shifted right into position 0 of the A2 register so that none will be lost. CX–0 and ARITH OP FP6 switch at AND 1918 to set the A2 SHIFT RIGHT LATCH 1902 which allows the sum digits in A2 to shift right. At the same time, ARITH OP FP6 and CX–0 switch at AND 1919 to set the A2 read-in FROM A1 LATCH 1920 which allows each A1 digit from position 9 therein to be placed in position 0 of A2 during the shift right operation. The shift operation for both A1 and A2 registers ceases when ARITH OP FP6 and C1–2 switch at AND gates 1831, 1832, 1921 and 1922, which respectively reset these four latches.

The two pertinent exponent digits from the adder are also inserted into the address portion of the PROGRAM REGISTER for use during the FAS 7 cycle when the A2 exponent is generated. Since this portion of the PROGRAM REGISTER occupies positions 6 through 9, the four-digit number from the adder may be contained therein, with the digits being inserted successively at position 6 after which they are shifted right until the units digit of the A1 exponent resides in position 9. FP STOP, ARITH OP, and FP5–6 switch at AND 213 to set the PROGRAM REGISTER SHIFT RIGHT LATCH 2302, while CX–0 and ARITH OP FP6 switch at AND 2314 to set LATCH 2304 to allow the digits from the adder to enter position 6 thereof. The shift right operation of the PROGRAM REGISTER is not stopped after four digit times, however, because of the absence of the signal NO FP6–7 at AND gates 2315 and 2305. Shifting need not be stopped here because the FAS 7 cycle begins immediately following the short FAS 6 cycle, and the units exponent digit emerging from position 9 of the PROGRAM REGISTER is used at once for updating the A2 exponent.

Other terminating operations in the FAS 6 cycle are as follows. C01 and FAS 6 switch at AND 1319 to reset the ARITHMETIC REGISTER read-out to CHANNEL 1 LATCH 1309 after the two exponent digits residing in positions 0 and 1 therein have been withdrawn by the operation of the FIELD RING. A FIELD STOP MATCH signal at this time also initiates operation of the FIELD CYCLE RING which eventually terminates the FIELD RING operation. FAS 6 and C2–3 also switch at AND 1510 to reset LATCH 1509 which disconnects the AUXILIARY REGISTER 2 from CHANNEL 2. ARITH OP FP6 and C2–3 also switch at AND 1511 to terminate the shift right operation of AUXILIARY REGISTER 2.

It is now assumed that a carry over resulted during the FAS 4 cycle due to the addition of two highest order mantissa digits. In this case, the FP RECOMP LATCH 413 is set during the FAS 5 cycle as previously explained. This indicates that the exponent of the sum digits in A1 should be 1 greater than the larger factor exponent. A 1 digit is therefore added to the larger exponent during the FAS 6 cycle, instead of the operation explained above where the number in AUXILIARY REGISTER 2 was subtracted. LATCH 1509 cannot be set from AND 1508. This results in none of the digits in the AUXILIARY REGISTER 2 being transferred to CHANNEL 2 of the adder. In place of this number, FAS 6, CX, and FP recomp switch at AND 3505 to insert a 0 bit and a 1 bit onto CHANNEL 2, which represents the digit 1. FP recomp, OP FAS, FP stop, and FP5–6 also switch at AND 3313 to set the TRUE ADD LATCH 3309 in order to add the digit 1 now appearing in CHANNEL 2 to the units digit of larger exponent appearing on CHANNEL 1 from the ARITHMETIC REGISTER. The A1 exponent digits generated thusly are again inserted into the A1 register and into the program register address section as previously described. In connection with the insertion of a digit 1 onto CHANNEL 2, this must be followed by three zero digits so as to form a four-digit sum at the output of the adder as was previously explained. FAS 6, CX–0 and FP RECOMP therefore switch at AND 3506 so as to set the CHANNEL 2 ZERO INSERT LATCH 3501 in order to accomplish this function.

During the FAS 6 cycle, a sign adjust operation also occurs. Specifically, this operation is the same as was performed during the FAS 2 time in that the correct sign of the result is set into the sign position of the ARITHMETIC REGISTER according to the condition of the FAS SIGNS PLUS or MINUS SIGNALS. This sign is then transferred from the ARITHMETIC REGISTER to the sign position of A1. This is to insure that the sign of the sum digits in A1 is correct in case no FAS 2 cycle were performed or if the A2 sum digits eventually reside in A1 after FAS 5 cycle. Therefore, although the sign adjust cycle during FAS 6 might be redundant in that the sign already held in A1 is the correct one, this operation might be necessary in lieu of the above-mentioned conditions. FAS 6 switches with either FAS SIGNS PLUS or FAS SIGNS MINUS at AND gates 1217 or 1218, respectively, to set the ARITHMETIC REGISTER sign plus or minus when conditioned to do so by AND 1219. FAS 6 mixes at OR 1832 to generate the A1 READ-IN SIGN AB signal. FAS 6 and C1 switch at AND gate 1833 to generate FP SIGN ADJUST which in turn sets the REGISTER READ-OUT GATE SIGN ADJUST LATCH 1805 at CP time. This in turn sets the REGISTER READ-IN GATE SIGN ADJUST LATCH 1808 at AP time. C1–2 and FAS 6 thereupon switch at AND 1220 to cause the complete contents of the ARITHMETIC REGISTER, including its sign, to be transferred to AB. At AP time of this transfer, the A1 READ-IN SIGN AB signal switches with the REG READ-OUT GATE SIGN ADJUST signal at AND 1806 in order to blank the sign then contained in the A1 sign position. At CP time of the same cycle, A1 READ-IN SIGN AB switches with the REGISTER READ-IN GATE SIGN ADJUST signal at AND 1833 to allow only the sign to be read from the ARITHMETIC BUS into the sign position of A1. It should be noted that although the entire contents of the ARITHMETIC REGISTER are transferred to AB, only the sign is actually read into A1 at this particular time.

Overflow and underflow tests are also made upon the updated A1 exponent during the FAS 6 cycle. An overflow condition causes a digit 1 to appear in the adder output latches at C1–2 time of the FAS 6 cycle which corresponds to the third digit time of the sum which is being generated. This condition is so because the highest possible exponent is 99 which, if overflow occurs, would result in a 1 being added to the 9 in the 10's position and thus generating a 1 in the hundreds position which is detected. ARITH OP FP6, C1–2, ADDER OUT FIRST 0 bit and ADDER OUT FIRST 1 bit switch at AND 3620 to set LATCH 3621 if such an overflow is detected. LATCH 3621 sets on a light on the console.

An underflow condition during the FAS 6 cycle exists when the adder output latches contain a 9 during the third digit time of C1–2. This may be explained as follows: AUXILIARY REGISTER 2 contains at most two non-zero digits prior to the updating A1 exponent subcycle with the third digit to be entered into CHANNEL 2 being a zero. Therefore, a digit 9 is actually inserted into the ADDER from CHANNEL 2 because a COMP ADD operation is occurring. During all cases except when an A1 exponent less than 00 is generated, a carry is produced which adds to this 9 thus producing a 0. An attempt to produce an exponent less than 00 fails to generate the carry, and a 9 digit appears in the adder output latches indicating an underflow. Therefore, ARITH OP FP6, C1–2, adder out first 3 bit and adder out first 6 bit switch at AND 3622 to set the FLOATING POINT UNDERFLOW LATCH 3623 which indicates that an exponent underflow occurred the updating of the A1 exponent. The setting of LATCH 3623 will result in both A1 and A2 registers being set to zeros with plus signs during the FAS 7 cycle, subsequently to be described.

FP6 and C2 switch at AND 1109 to set FP last + in the FLOATING POINT CYCLE RING. FP6 and C2–3 also switch at AND 1041 to set FP6–7 LATCH 1042. Subsequently, FP TEST via AND 1008 resets FP6 LATCH 1040 to generate FP6 ADVANCE at AND 1043. FP6 ADVANCE immediately sets FP7 LATCH 1044 to initiate the FAS 7 cycle.

FAS 7 CYCLE (UPDATE A2 EXPONENT)

The updated A1 exponent now contained in the PROGRAM REGISTER positions 8 and 9 is reduced by 8 and inserted into the A2 positions 0–1 during the FAS 7 cycle. ARITH OP, FP STOP and FP6–7 switch at AND 3313 to set the COMPLEMENT ADD LATCH 3302. FAS 7 and CX switch at AND 3507 in order to insert a 6 bit and a 2 bit onto CHANNEL 2 which represent the digit 8. FP MULTIPLY-ADD and FP6–7 switch with CX at AND 2412 to set LATCH 2413 which allows the A1 exponent held in the PROGRAM REGISTER to be read-out to CHANNEL 1 of the adder. As noted previously, the shift right operation of the PROGRAM REGISTER is not stopped at the end of the FP6. FAS 7 and CX–0 also switch at AND 3508 to set the CHANNEL 2 ZERO INPUT LATCH 3501 so that zero digits will be inserted on CHANNEL 2 immediately following the digit 8. CX–0 and ARITH OP FP7 switch at AND 1923 to set the A2 SHIFT RIGHT LATCH 1902 which causes the A2 sum to move two digit positions in order to provide room in positions 0 and 1 for the A2 exponent. At the same time, ARITH OP FP7 and CX–0 switch at AND 1924 to set LATCH 1910 whose output in turn switches with the A2 SHIFT RIGHT signal so as to allow position 0 of A2 to accept the exponent digits from the output of the adder. This shift right and read-in from adder operation of A2 ceases upon the switching of ARITH OP FP7 and C1–2 at AND gates 1925 and 1926. The A2 exponent for the sum digits held therein has therefore been updated by subtracting 8 from the A1 exponent. This procedure is correct since the most significant sum digit in position 2 of A2 is displaced eight digit positions to the right of the most significant non-zero sum digit in position 2 of A1.

If no underflow condition is detected during the FAS 6 cycle with respect to the A1 exponent, the sign of A2 is now set to correspond to the sign of A1. FAS 7, NO FP UFL, and C1 switch at AND 1834 to set LATCH 1805 which subsequently sets LATCH 1808. FAS 7 and NO FP UFL also switch at AND 1835 to generate SET A2 SIGN to A1. Set A2 SIGN TO A1 switches with REGISTER READ-OUT GATE SIGN ADJUST at AND 1836 to read-out the sign position of A1 onto the AB. At the same time, these two signals also switch at AND 1927 to blank sign position in A2. At CP time following this operation, SET A2 SIGN TO A1 switches with REGISTER READ-IN GATE SIGN ADJUST at AND 1928 to allow A2 to read-in the sign of A1 now present on the ARITHMETIC BUS. This insures that the sign of the lower order sum digits in A2 corresponds to the sign of the higher order sum digits found in A1.

During the FAS 7 cycle, the A2 exponent being generated at the output of the ADDER is also sampled for an underflow condition in the same manner that the A1 exponent was sampled during the FAS 6 cycle. C1–2, ARITH OP FP7, ADDER OUT FIRST 3 bit, and ADDER OUT FIRST 6 bit switch at AND 3624 to set the FP A2 UFL LATCH 3625 upon detection of a 9 as the third digit of the adder sum. However, if an underflow condition had been detected during the FAS 6 cycle, the inverted output of LATCH 3623 would prevent the FP A2 UFL LATCH 3625 from being set.

In the event that an underflow detection occurs during the FAS 7 cycle with respect to the updated A2 exponent, the A2 register positions 0 through 9 have zeros inserted therein and its sign is forced to plus. This is accomplished in the following manner. FAS 7 and CX-0 switch at AND 1221 to generate the arithmetic SIGN CHANGE GATE which forces a plus sign into the sign position of the ARITHMETIC REGISTER by virtue of the FAS 7 signal being present at OR 1222. At approximately the same time, FP7 MULTIPLY-ADD switches with CX at AND 1401 to force zero digits into positions 0 through 9 of the ARITHMETIC REGISTER. At the end of the FAS 7 cycle, FP A2 UFL switches with FP LAST + at AND 1223 to read-out the ARITHMETIC REGISTER including its sign position onto the ARITHMETIC BUS. FP A2 UFL also switches with C2-3 and FP 7 at AND 1929 to set LATCH 1916 which allows A2 to read-in this number from the ARITHMETIC BUS. In this manner, A2 is set to zero and its sign forced to plus upon underflow detection of its exponent. In the event that an underflow detection occurred during the FAS 6 cycle with respect to the A1 exponent, both the A1 and A2 registers are forced to zero and their signs set to plus during the FAS 7 cycle. With respect to A1, FP UFL switches with FP7 MULTIPLY-ADD and C0-1 at AND 1224 to transfer the ARITHMETIC REGISTER onto the ARITHMETIC BUS. By this time, the ARITHMETIC REGISTER has been set to zeros and its sign forced to plus as above described. FP7 MULIPLY-ADD, FP UFL, and C0-1 also switch at AND 1837 to set LATCH 1838 to allow A1 to read-in from the ARITHMETIC BUS these zero digits and the plus sign. Subsequently, FP UFL, FP 7 MULTIPLY-ADD, and C1-2 switch at AND 1225 to again transfer the ARITHMETIC REGISTER onto the AB. FP UFL, C1-2, and FP 7 switch at AND 1930 to allow A2 to read-in from the AB. In this manner, both A1 and A2 are set to zeros and their signs forced to plus in the event that an underflow detection occurs when updating the A1 exponent.

In order to terminate the FAS 7 operation as well as terminate the floating point add-subtract operation, the following steps are taken. FP7 switches with C2 at AND 1110 to set FP LAST + LATCH 1102 of the FP CYCLE RING. FP7 also switches with C1 at AND 1045 to set the FP END LATCH 1006. FP END AND FP LAST + switch at AND 1046 to generate the END DATA OP signal which allows the computer to initiate an instruction cycle in order to withdraw a new instruction from MEMORY. FP TEST resets FP7 LATCH 1044, while also stopping operation of the PROGRAM RING. Since NO FP END is no longer present, FP STOP at AND 606 cannot restart the PROGRAM RING. A subsequent instruction may now call for the transfer of the sum in A1 and A2 to MEMORY.

While only one representative embodiment of the invention has been outlined in detail, there will be obvious to those skilled in the art many modifications and variations accomplishing the foregoing objects and realizing many or all of the advantages, but which do not depart essentially from the spirit of the invention as expressed in the appended claims.

What is claimed is:

1. In a floating point decimal system for performing a floating point add-subtract operation on first and second normalized operands, each operand being represented by an N digit mantissa and an M digit exponent indicating the true decimal location thereof, first and second M+N digit registers for storing said operands, respectively, a third M+N digit register, said first register also storing the exponent of the result of said operation in the M digit positions thereof and the N most significant digits thereof in the N digit positions thereof, said third register storing the N least significant digits of said result in the N digit positions thereof and an exponent equal to said exponent in said first register less N in the M digit positions thereof, an adder for performing said operation, means to compare said operands to determine the larger and smaller of the absolute values thereof and the true exponent difference ED therebetween, means responsive to said comparison means for always storing prior to said operation the larger operand in said first register and the smaller operand in said second register, first control means to add in said adder ED least significant mantissa digits of said smaller operand to zeros and to store the result thereof in said third register, second control means to add in said adder the mantissa digits of said larger operand and the remaining mantissa digits of said smaller operand, third control means to store the results of said last operation in said first register, said first and third registers storing said resultant mantissa, means to normalize said resultant mantissa, means to modify said larger exponent responsive to said normalization, means to store said modified exponent in said M digit positions of said first register, and means to store an exponent in said M digit positions of said third register equal to said modified exponent less N.

2. A system according to claim 1 in which means are provided to inhibit the operation of said second and third control means in response to an exponent difference range of N to 2N-1 when a true add operation is performed by said first control means, and means responsive to the latter two conditions for storing said larger factor mantissa digits in said first register.

3. A floating point decimal system as claimed in claim 1 wherein said normalization means includes means to serially connect the most significant result digit position of said third register to the least significant result digit of said first register, means to shift the digits in said registers in a direction of more significance until a non-zero result digit occupies the most significant result digit position in said first register, means to obtain a count of the number of digit positions thus shifted, means to subtract said number from said larger exponent to obtain said modified exponent, means to shift said result digits in said first and third registers a number of positions in a direction of less significance to accommodate said modified exponent in said first register, means to store said modified exponent in said digit positions thus vacated, means to shift said digits in said third register in a direction of less significance to accommodate said exponent therefor, and means to store said exponent therefor in said digit positions thus vacated.

4. In a floating point decimal system for performing an arithmetic operation on first and second normalized operands and to provide a double precision result of said operation, each of said operands being represented by N digit mantissas and an exponent indicating the true decimal location thereof, an adder, a first register to store the N most significant digits of an addition in said adder to comprise the first portion of said double precision result, a second register to store the N least significant digits of an addition in said adder to comprise the second portion of said double precision result, means to compare in said adder said operands to determine the larger and smaller of the absolute values thereof and a true exponent difference therebetween, a third and a fourth register, means responsive to said comparison means for always storing prior to an addition the smaller of said operands in said third register and the larger of said operands in said fourth register to store the exponent of said larger operand, means responsive to a true exponent difference of zero for adding said mantissas of said operands in said adder, storing the resultant mantissa, normalizing said resultant mantissa and storing said larger exponent in said first register, means responsive to a true exponent difference ED between 1 and N-1 of effectively equalizing said exponents, adding said mantissas with equalized exponents in said adder, storing ED least significant digits of the resultant mantissa in said second register and the most significant digits of said resultant mantissa in said first register, normalizing said resultant mantissa, modifying said larger exponent responsive to said normalization and storing said modified exponent in said first register, means responsive to a true exponent difference between N and 2N-1 for effectively equalizing said exponents, adding said mantissas with equalized exponents in said adder, storing N most significant digits of said resultant mantissa in said first register and the N—ED least significant digits of said resultant mantissa in said second register, normalizing said resultant mantissa, modifying said larger exponent responsive to said normalization and storing said modified exponent in said first register and storing an exponent equal to said modified exponent less N in said second register, and means responsive to a true exponent difference greater than 2N—1 for storing said larger operand in said first register.

5. A system as claimed in claim 4 wherein said means to obtain said true exponent difference includes means conditioned by a complement exponent difference resulting from said comparison for recomplementing said exponent difference to obtain said true exponent difference.

References Cited in the file of this patent

UNITED STATES PATENTS

| | | |
|---|---|---|
| 2,538,636 | Williams | Jan. 16, 1951 |
| 3,056,550 | Horrell | Oct. 2, 1962 |

UNITED STATES PATENT OFFICE

CERTIFICATE OF CORRECTION

Patent No. 3,131,293 April 28, 1964

Grant H. Bush et al.

It is hereby certified that error appears in the above numbered patent requiring correction and that the said Letters Patent should read as corrected below.

Column 5, lines 33 to 36, strike out "Inputs to CHANNEL 1 and CHANNEL 2 may be derived from the ARITHMETIC REGISTER, the AUXILIARY REGISTER, or the PROGRAM REGISTER."; column 7, line 19, for "have" read -- save --; line 34, for "results" read -- result --; column 13, line 62, for "ACCUMULATION" read -- ACCUMULATOR --; line 67, after "FP1" insert -- switch --; column 15, line 28, for "added zero latch 40" read -- adder zero latch 402 --; column 18, Table II, first column, line 5 thereof, for "Arigh" read -- Arith --; column 20, line 37, for "rest" read -- reset --; column 21, line 7, for "different" read -- difference --; column 22, line 60, for "gate" read -- gates --; line 61, after "3118" insert -- are --; column 23, line 30, after "case" insert -- an --; column 37, line 37, strike out "switches with"; column 39, line 32, for "C3-C4" read -- C3-4 --; column 40, line 49, for "2510" read -- 2520 --.

Signed and sealed this 29th day of September 1964.

(SEAL)
Attest:

ERNEST W. SWIDER
Attesting Officer

EDWARD J. BRENNER
Commissioner of Patents